US011336418B2

(12) United States Patent
Gao et al.

(10) Patent No.: US 11,336,418 B2
(45) Date of Patent: May 17, 2022

(54) METHOD AND DEVICE FOR AVOIDING UPLINK COLLISIONS WITH OVERLAPPING TTI

(71) Applicant: CHINA ACADEMY OF TELECOMMUNICATIONS TECHNOLOGY, Beijing (CN)

(72) Inventors: Xuejuan Gao, Beijing (CN); Xueming Pan, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 0 days.

(21) Appl. No.: 16/338,440

(22) PCT Filed: Aug. 21, 2017

(86) PCT No.: PCT/CN2017/098340
§ 371 (c)(1),
(2) Date: Mar. 29, 2019

(87) PCT Pub. No.: WO2018/059160
PCT Pub. Date: Apr. 5, 2018

(65) Prior Publication Data
US 2020/0036501 A1 Jan. 30, 2020

(30) Foreign Application Priority Data
Sep. 29, 2016 (CN) .......................... 201610865972.6

(51) Int. Cl.
H04L 5/00 (2006.01)
H04L 1/00 (2006.01)
(Continued)

(52) U.S. Cl.
CPC .......... H04L 5/0082 (2013.01); H04L 1/0013 (2013.01); H04L 1/0026 (2013.01);
(Continued)

(58) Field of Classification Search
None
See application file for complete search history.

(56) References Cited

U.S. PATENT DOCUMENTS

2015/0305016 A1* 10/2015 Dai ................. H04L 5/0053 370/280
2015/0327243 A1* 11/2015 Yin ................. H04L 5/001 370/329
2018/0192418 A1* 7/2018 Chen ................. H04L 1/1861

FOREIGN PATENT DOCUMENTS

CN 103379074 A 10/2013
CN 105594150 A 5/2016
(Continued)

OTHER PUBLICATIONS

The International Preliminary Report on Patentability for PCT Application No. PCT/CN2017/098340 dated Apr. 2, 2019, 4 pages.
(Continued)

Primary Examiner — Ayanah S George
(74) Attorney, Agent, or Firm — Womble Bond Dickinson (US) LLP

(57) ABSTRACT

The present invention discloses a data transmission method and apparatus. The method comprises: determining on a terminal side whether there is an overlap between a transmission time of an uplink channel which transmits using a first transmission time interval length and a transmission time of an uplink channel which transmits using a second transmission time interval length; when there is an overlap, then selecting a part of the uplink channel for transmission according to a predetermined rule, and abandoning the remaining uplink channel for transmission or puncturing the transmission of the remaining uplink channel. On a network side, determining that the terminal selects one type of uplink channel for transmission according to the predetermined rule, and abandons another type of uplink channel for (Continued)

Determine whether a transmission period of time of an uplink channel with a first TTI length for transmission overlaps with a transmission period of time of an uplink channel with a second TTI length for transmission — 401

If so, then determine that a UE selects an uplink channel from the uplink channels for transmission, under a preset method, and drops a remaining uplink channel, or transmits the remaining uplink channel using puncturing — 402 transmission or punctures the transmission of another type of uplink channel. With the present invention, correct transmission of the terminal can be achieved even when channels with different transmission time intervals overlap.

24 Claims, 4 Drawing Sheets

(51) Int. Cl.
    *H04L 1/16*     (2006.01)
    *H04W 72/04*     (2009.01)
    *H04W 72/14*     (2009.01)
    *H04W 74/08*     (2009.01)

(52) U.S. Cl.
    CPC .......... *H04L 1/1671* (2013.01); *H04L 5/0055* (2013.01); *H04W 72/0413* (2013.01); *H04W 72/0446* (2013.01); *H04W 72/0493* (2013.01); *H04W 72/14* (2013.01); *H04W 74/0833* (2013.01)

(56) References Cited

FOREIGN PATENT DOCUMENTS

| | | |
|---|---|---|
| WO | 2015/179136 A1 | 11/2015 |
| WO | 2016/048593 A1 | 3/2016 |
| WO | 2016/048597 A1 | 3/2016 |
| WO | 2016/069379 A1 | 5/2016 |
| WO | 2016/093981 A1 | 6/2016 |

OTHER PUBLICATIONS

The Office Action for Japanese Application No. 2019517431 dated Feb. 14, 2020, 7 pages.

Panasonic, "UL simultaneous transmission between sTTI and TTI," 3GPP TSG RAN Meeting #86, Aug. 22-26, 2016, 2 pages, R1-166968, Gothenburg, Sweden.

Nokia, et al., "Simultaneous Transmissions of UL Signals for Shortened TTI Operation," 3GPP TSG RAN WG1 Meeting #86, Aug. 22-26, 2016, 5 pages, R1-167019, Gothenburg, Sweden.

NTT DOCOMO, INC., "sPUSCH for shortened TTI," 3GPP TSG RAN WG1 Meeting #86, Aug. 22-26, 2016, 7 pages, R1-167371, Gothenburg, Sweden.

Ericsson, "Handling overlapping allocations with short and 1 ms TTI," 3GPP TSG-RAN WG1 #86, Aug. 22-26, 2016, 2 pages, R1-167503, Goteborg, Sweden.

Chinese language and an English translation of the International Search Report for International Application No. PCT/CN2017/098340 dated Nov. 21, 2017.

Chinese language Written Opinion of the International Searching Authority for international Application No. PCT/CN2017/098340 dated Nov. 21, 2017.

* cited by examiner

METHOD AND DEVICE FOR AVOIDING UPLINK COLLISIONS WITH OVERLAPPING TTI

CROSS REFERENCE TO RELATED APPLICATIONS

This patent application is a U.S. National Stage Application Under 35 U.S.C. § 371 of International Application No. PCT/CN2017/098340, filed on Aug. 21, 2017, entitled "Data Transmission Method and Device," which claims the benefit of Chinese Patent Application No. 201610865972.6, filed with the Chinese Patent Office on Sep. 29, 2016, and entitled "Method and apparatus for transmitting data", which was incorporated by reference in the entirety.

FIELD

The present invention relates to the field of communications, and particularly to a method and apparatus for transmitting data.

BACKGROUND

FIG. 1 is a schematic diagram of the frame structure type 1 for a Long Term Evolution (LTE) Frequency Division Duplex (FDD) system. The Frame Structure type 1 (FS1) is used in the existing LTE FDD system, and a structural diagram of the FS1 is as illustrated in FIG. 1. In the FDD system, there are different carrier frequencies for uplink and downlink transmission, and there is the same frame structure for both uplink and downlink transmission. On each carrier, a radio frame with the length of 10 ms includes ten 1 ms sub-frames, and each sub-frame includes two timeslots each with the length of 0.5 ms. The length of time for a transmission Time Interval (TTI) for transmitting uplink and downlink data is 1 ms.

FIG. 2 illustrates a schematic diagram of the frame structure type 2 for an LTE Time Division Duplex (TDD) system. The Frame Structure type 2 (FS2) is used in the existing LTE TDD system, and a structure diagram of the FS2 is as illustrated in FIG. 2. In the TDD system, there are different sub-frames or timeslots, on the same frequency, for uplink and downlink transmission. In the FS2, each 10 ms radio frame includes two 5 ms half-frames, and each half-frame includes five sub-frames each with the length of 1 ms. The sub-frames in the FS2 are categorized into three kinds of sub-frames, i.e., downlink sub-frames, uplink sub-frames, and special sub-frames, and each special sub-frame includes a Downlink Pilot Time Slot (DwPTS), a Guard Period (GP), and an Uplink Pilot Time Slot (UpPTS). Each half-frame includes at least one downlink sub-frame, at least one uplink sub-frame, and at most one special sub-frame.

A typical operating mode of short-TTI transmission is that: there are a plurality of short-TTI transmission instances shorter than 1 ms in a sub-frame structure defined in the existing LTE mechanism. A shortened Physical Uplink Shared CHannel (sPUSCH) and a shortened Physical Uplink Control CHannel (sPUCCH) are supported in the uplink, where the sPUCCH can be at least configured to carry Acknowledgement/Negative Acknowledgement (ACK/NACK) feedback information for downlink transmission with a short TTI. The length of a short TTI can be two, three, four, or seven Orthogonal Frequency Division Multiplex (OFDM) or Single-Carrier Frequency-Division Multiple Access (SC-FDMA) symbols. Of course, the length of the short TTI can alternatively be another number of symbols no more than 14, or a length of time no longer than 1 ms.

There is the same TTI length of an sPUCCH and an sPUSCH as defined in the existing TTI transmission. A UE scheduled to transmit in a sub-frame with a legacy TTI (1 ms) may be further scheduled to transmit with a short TTI, and for example, there are both an sPUCCH and a PUSCH/PUCCH (transmission in a 1 ms TTI) in the same sub-frame, or there are an sPUSCH and a PUSCH/PUCCH in the same sub-frame, in this case, there has been absent so far a definite transmission solution.

SUMMARY

The invention provides a method and apparatus for transmitting data so as to transmit data on overlapping channels with different TTI lengths.

In a first aspect, an embodiment of the invention provides a method for transmitting data. The method includes: determining whether a transmission period of time of an uplink channel with a first TTI length for transmission overlaps with a transmission period of time of an uplink channel with a second TTI length for transmission; and if so, then selecting at least one uplink channel from the uplink channels for transmission, under a preset method, and dropping a remaining uplink channel of the uplink channels, or transmitting the remaining uplink channel of the uplink channels using puncturing.

In an implementation, the first TTI length is longer than the second TTI length.

In an implementation, the uplink channels include an uplink control channel and/or an uplink shared channel.

In an implementation, the preset method is one or a combination of the following methods:

an uplink control channel is selected, and an uplink shared channel is dropped or transmitted using puncturing;

the uplink channel with the second TTI length for transmission is selected, and the uplink channel with the first TTI length for transmission is dropped or transmitted using puncturing; or an uplink channel carrying Uplink Control Information (UCI) is selected, and when there are a plurality of uplink channels carrying UCI, an uplink channel carrying UCI with a high priority is selected, and when there are a plurality of uplink channels carrying UCI with the high priority, an uplink channel is selected under any of the above methods; and a remaining uplink channel is dropped or transmitted using puncturing.

In an implementation, the method further includes: transferring UCI in an unselected uplink channel to the selected uplink channel under a preset rule 1, and transmitting the UCI on the selected uplink channel.

In an implementation, when the uplink channel with the first TTI length for transmission overlaps with an uplink control channel with the second TTI length for transmission, at least one of the following schemes is applied, wherein the uplink channel with the first TTI length for transmission includes at least one of an uplink shared channel or an uplink control channel:

in a first scheme, the uplink control channel with the second TTI length for transmission is selected for transmission, the uplink channel with the first TTI length for transmission is dropped, or information in a symbol, in the uplink channel with the first TTI length for transmission which overlaps with the symbol in the uplink control channel with the second TTI length for transmission is punctured;

in a second scheme, the uplink channel with the first TTI length for transmission is selected, and the uplink control channel with the second TTI length for transmission is dropped; or in a third scheme, an uplink channel carrying UCI is selected, and when there are a plurality of uplink channels carrying UCI, an uplink channel carrying UCI with a high priority is selected, and a remaining uplink channel is dropped, or information in a symbol, in the remaining uplink channel, which overlaps with the symbol in the selected uplink channel, is punctured; and when there are a plurality of uplink channels carrying UCI with the same high priority, an uplink channel is selected from the plurality of uplink channels carrying the UCI with the same high priority as in the first scheme or the second scheme.

In an implementation, when the first scheme is applied, UCI carried on the uplink channel with the first TTI length for transmission is transferred to and transmitted on the uplink control channel with the second TTI length for transmission under a preset rule 1 or a preset rule 2; when the second scheme is applied, UCI carried on the uplink control channel with the second TTI length for transmission is transferred to and transmitted on the uplink channel with the first TTI length for transmission, under the preset rule 1 or a preset rule 3; and when the third scheme is applied, UCI in an unselected uplink channel is transferred to and transmitted on the selected uplink channel under the preset rule 1.

In an implementation, when the first scheme is applied, the preset rule 2 includes one or a combination of the following schemes: all the UCI carried on the uplink channel with the first TTI length for transmission is transferred to and transmitted on the uplink control channel with the second TTI length for transmission;

when the UCI carried on the uplink channel with the first TTI length for transmission is ACK/NACK and/or a Scheduling Request (SR), the UCI is transferred to and transmitted on the uplink control channel with the second TTI length for transmission; and when the UCI carried on the uplink channel with the first TTI length for transmission comprises Periodical Channel State Information (P-CSI), the P-CSI carried on the uplink channel with the first TTI length for transmission is dropped, or when the uplink control channel with the second TTI length for transmission carries P-CSI, the P-CSI carried on the uplink channel with the first TTI length for transmission is dropped, and when the uplink control channel with the second TTI length for transmission does not carry any P-CSI, the P-CSI carried on the uplink channel with the first TTI length for transmission is transferred to and transmitted on the uplink control channel with the second TTI length for transmission; or when there are a plurality of uplink control channels with the second TTI length for transmission, in a transmission period of time of the uplink channel with the first TTI length for transmission, then:

the first or last one of the uplink control channels with the second TTI length for transmission is selected to carry the UCI; or an uplink control channel with the second TTI length for transmission, which carries P-CSI, is selected to carry P-CSI in the uplink channel with the first TTI length for transmission, and when there is no uplink control channel with the second TTI length for transmission, which carries P-CSI, the first or last one of the uplink control channels with the second TTI length for transmission is selected to carry the P-CSI in the uplink channel with the first TTI length for transmission; and an uplink control channel with the second TTI length for transmission, which carries ACK/NACK and/or an SR, is selected to carry ACK/NACK and/or an SR in the uplink channel with the first TTI length for transmission; and when there is no uplink control channel with the second TTI length for transmission, which carries ACK/NACK and/or an SR, the first or last one of the uplink control channels with the second TTI length for transmission is selected to carry the ACK/NACK and/or the SR in the uplink channel with the first TTI length for transmission; and when there are a plurality of channels satisfying the above conditions, the first or last one of the plurality of channels satisfying the conditions is selected to carry the UCI in the uplink channel with the first TTI length for transmission;

When the second scheme is applied, the preset rule 3 comprises one or a combination of the following schemes:

all the UCI carried on the uplink control channel with the second TTI length for transmission is transferred to and transmitted on the uplink channel with the first TTI length for transmission;

when the UCI carried on the uplink control channel with the second TTI length for transmission is ACK/NACK and/or an SR, the UCI is transferred to and transmitted on the uplink channel with the first TTI length for transmission; and when the UCI carried on the uplink control channel with the second TTI length for transmission comprises P-CSI, the P-CSI carried on the uplink control channel with the second TTI length for transmission is dropped, or if P-CSI is carried on the uplink channel with the first TTI length for transmission, then the P-CSI carried on the uplink control channel with the second TTI length for transmission is dropped, and if no P-CSI is carried on the uplink channel with the first TTI length for transmission, then the P-CSI carried on the uplink control channel with the second TTI length for transmission is transferred to and transmitted on the uplink channel with the first TTI length for transmission; or when there are both an uplink shared channel with the first TTI length for transmission, and an uplink control channel with the first TTI length for transmission, one of the uplink shared channel with the first TTI length for transmission, and the uplink control channel with the first TTI length for transmission, is selected to carry the UCI, or a part of the UCI is carried on the uplink shared channel with the first TTI length for transmission, and the other part of the UCI is carried on the uplink control channel with the first TTI length for transmission; and/or when there are a plurality of uplink shared channels with the first TTI length for transmission, if there is an uplink shared channel with the first TTI length for transmission on a Primary Carrier Component, PCC, then the uplink shared channel with the first TTI length for transmission on the PCC is selected to carry the UCI, or if there is no uplink shared channel with the first TTI length for transmission on the PCC, an uplink shared channel with the first TTI length for transmission on an Secondary Carrier Component, SCC, with a lowest carrier index is selected to carry the UCI; wherein when the selected uplink shared channel is an uplink shared channel corresponding to a Radom Access Response (RAR) grant, the UCI is not transmitted.

When the third scheme is applied, when the selected uplink channel is the uplink control channel with the second TTI length for transmission, and when there are a plurality of uplink control channels with the second TTI length for transmission, in a transmission period of time of the uplink channel with the first TTI length for transmission, an uplink channel to carry the UCI is selected in the same scheme as in the preset rule 2; and when the selected uplink channel is the uplink channel with the first TTI length for transmission, and when there are both an uplink shared channel with the first TTI length for transmission, and an uplink control channel, with the first TTI length for transmission, or there are a plurality of uplink shared channels with the first TTI length for transmission, a channel to carry the UCI is selected in the same scheme as in the preset rule 3.

In an implementation, when an uplink shared channel with the first TTI length for transmission overlaps with an uplink shared channel with the second TTI length for transmission, at least one of the following schemes is applied:

in a fourth scheme, the uplink shared channel with the second TTI length for transmission is selected for transmission, and the uplink shared channel with the first TTI length for transmission is dropped, or information, in a symbol in the uplink shared channel with the first TTI length for transmission, which overlaps with the symbol in the uplink shared channel with the second TTI length for transmission is punctured;

in a fifth scheme, the uplink shared channel with the first TTI length for transmission is selected for transmission, and the uplink shared channel with the second TTI length for transmission is dropped; or in a sixth scheme, an uplink channel carrying UCI is selected, and when there are a plurality of uplink channels carrying UCI, an uplink channel carrying UCI with a high priority is selected, and a remaining uplink channel is dropped, or information, in a symbol, in the remaining uplink channel, which overlaps with the symbol in the selected uplink channel, is punctured; and when the plurality of channels carry the UCI with a same priority, an uplink channel is selected from the plurality of channels carrying the UCI with the same priority as in the third scheme or the fourth scheme.

In an implementation, when the fourth scheme is applied, UCI carried on the uplink shared channel with the first TTI length for transmission is transferred to and transmitted on the uplink shared channel with the second TTI length for transmission under a preset rule 1 or a preset rule 4; when the fifth scheme is applied, UCI carried on the uplink shared channel with the second TTI length for transmission is transferred to and transmitted on the uplink shared channel with the first TTI length for transmission under the preset rule 1 or a preset rule 5; and when the sixth scheme is applied, UCI in an unselected uplink channel is transferred to and transmitted on the selected uplink channel under the preset rule 1.

In an implementation, when the fourth scheme is applied, the preset rule 4 includes one or a combination of the following schemes:

all the UCI carried on the uplink shared channel with the first TTI length for transmission is transferred to and transmitted on the uplink shared channel with the second TTI length for transmission;

when the UCI carried on the uplink shared channel with the first TTI length for transmission is ACK/NACK and/or an SR, the UCI is transferred to and transmitted on the uplink shared channel with the second TTI length for transmission, and when the UCI carried on the uplink shared channel with the first TTI length for transmission comprises P-CSI, the P-CSI carried on the uplink shared channel with the first TTI length for transmission is dropped, or if P-CSI is carried on the uplink shared channel with the second TTI length for transmission, then the P-CSI carried on the uplink shared channel with the first TTI length for transmission is dropped; and if no P-CSI is carried on the uplink shared channel with the second TTI length for transmission, then the P-CSI carried on the uplink shared channel with the first TTI length for transmission is transferred to and transmitted on the uplink shared channel with the second TTI length for transmission; or when there are a plurality of uplink shared channels with the second TTI length for transmission, in a transmission period of time of the uplink shared channel with the first TTI length for transmission, the first or last one of the uplink shared channels with the second TTI length for transmission is selected to carry the UCI; or when a plurality of carriers are aggregated for a UE, if there is an uplink shared channel with the second TTI length for transmission on a Primary Component Carrier, PCC, then the uplink shared channel with the second TTI length for transmission on the PCC is selected to carry the UCI; if there is no uplink shared channel with the second TTI length for transmission on the PCC, then an uplink shared channel with the second TTI length for transmission on a Secondary Component Carrier, SCC, with the lowest carrier index among SCCs comprising the uplink shared channels with the second TTI length for transmission is selected to carry the UCI; and if there are a plurality of uplink shared channels with the second TTI length for transmission on the selected carrier, then the first or last one of the uplink shared channels with the second TTI length for transmission is selected to carry the UCI; wherein when the selected uplink shared channel with the second TTI length for transmission is an uplink shared channel corresponding to an RAR grant, the UCI is not transmitted.

when the fifth scheme is applied, the preset rule 5 includes one or a combination of the following schemes:

all the UCI carried on the uplink shared channel with the second TTI length for transmission is transferred to and transmitted on the uplink shared channel with the first TTI length for transmission;

when the UCI carried on the uplink shared channel with the second TTI length for transmission is ACK/NACK and/or an SR, the UCI is transferred to and transmitted on the uplink shared channel with the first TTI length for transmission; and when the UCI carried on the uplink shared channel with the second TTI length for transmission comprises P-CSI, the P-CSI carried on the uplink shared channel with the second TTI length for transmission is dropped, or if P-CSI is carried on the uplink shared channel with the first TTI length for transmission, then the P-CSI carried on the uplink shared channel with the second TTI length for transmission is dropped, and if no P-CSI is carried on the uplink shared channel with the first TTI length for transmission, then the P-CSI carried on the uplink shared channel with the second TTI length for transmission is transferred to and transmitted on the uplink shared channel with the first TTI length for transmission; or when there are a plurality of uplink shared channels with the first TTI length for transmission, and if there is an uplink shared channel with the first TTI length for transmission on a PCC, then the uplink shared channel with the first TTI length for transmission on the PCC is selected to carry UCI in the Short Physical Uplink Shared Channel (sPUSCH); if there is no uplink shared channel with the first TTI length for transmission on the PCC, then an uplink shared channel with the first TTI length for transmission on an SCC with the lowest carrier index among SCCs comprising the uplink shared channels with the first TTI length for transmission is selected to carry the UCI in the sPUSCH; wherein when the selected uplink shared channel with the first TTI length for transmission is an uplink shared channel corresponding to an RAR grant, the UCI is not transmitted.

when the sixth scheme is applied, when the selected uplink channel is the uplink shared channel with the second TTI length for transmission, and when there are a plurality of uplink shared channels with the second TTI length for transmission, in a transmission period of time of the uplink shared channel with the first TTI length for transmission, a channel to carry the UCI is selected as in the scheme as in the preset rule 4; or when the selected uplink channel is the uplink shared channel with the first TTI length for transmission, and when there are a plurality of uplink shared channels with the first TTI length for transmission, a channel to carry the UCI is selected as in the scheme as in the preset rule 5.

In an implementation, when an uplink control channel with the first TTI length for transmission overlaps with an uplink shared channel with the second TTI length for transmission, at least one of the following schemes is applied:

in a seventh scheme, the uplink shared channel with the second TTI length for transmission is selected for transmission, and the uplink control channel with the first TTI length for transmission is dropped, or information in a symbol in the uplink control channel with the first TTI length for transmission, which overlaps with the symbol in the uplink shared channel with the second TTI length for transmission is punctured;

in an eighth scheme, the uplink control channel with the first TTI length for transmission is selected for transmission, and the uplink shared channel with the second TTI length for transmission is dropped; or in a ninth scheme, an uplink channel carrying UCI is selected, and when there are a plurality of uplink channels carrying UCI, an uplink channel carrying UCI with a high priority is selected, and a remaining uplink channel is dropped, or information in a symbol, in the remaining uplink channel, which overlaps with the symbol in the selected uplink channel, is punctured; and when the plurality of channels carry the UCI with a same priority, an uplink channel is selected from the plurality of channels carrying the UCI with the same priority as in the seventh scheme or the eighth scheme.

In an implementation, when the seventh scheme is applied, UCI carried on the uplink control channel with the first TTI length for transmission is transferred to and transmitted on the uplink shared channel with the second TTI length for transmission under a preset rule 1 or a preset rule 6; when the eighth scheme is applied, when the uplink shared channel with the second TTI length for transmission carries UCI, the UCI is transferred to and transmitted on the uplink control channel with the first TTI length for transmission under the preset rule 1 or a preset rule 7; and when the ninth scheme is applied, UCI in an uplink channel which is not selected is transferred to and transmitted on the selected uplink channel under the preset rule 1.

In an implementation, when the seventh scheme is applied, the preset rule 6 includes one or a combination of the following schemes:

all the UCI carried on the uplink control channel with the first TTI length for transmission is transferred to and transmitted on the uplink shared channel with the second TTI length for transmission;

when the UCI carried on the uplink control channel with the first TTI length for transmission is ACK/NACK and/or an SR, the UCI is transferred to and transmitted on the uplink shared channel with the second TTI length for transmission; when the UCI carried on the uplink control channel with the first TTI length for transmission comprises P-CSI, the P-CSI carried on the uplink control channel with the first TTI length for transmission is dropped, or if P-CSI is carried on the uplink shared channel with the second TTI length for transmission, then the P-CSI carried on the uplink control channel with the first TTI length for transmission is dropped; and if no P-CSI is carried on the uplink shared channel with the second TTI length for transmission, then the P-CSI carried on the uplink control channel with the first TTI length for transmission is transferred to and transmitted on the uplink shared channel with the second TTI length for transmission; or when there are a plurality of uplink shared channels with the second TTI length for transmission, in a transmission period of time of the uplink control channel with the first TTI length for transmission, the first or last one of the uplink shared channels with the second TTI length for transmission is selected to carry the UCI; or when a plurality of carriers are aggregated for a UE, if there is an uplink shared channel with the second TTI length for transmission on a PCC, then the uplink shared channel with the second TTI length for transmission on the PCC is selected to carry the UCI; if there is no uplink shared channel with the second TTI length for transmission on the PCC, then an uplink shared channel with the second TTI length for transmission, on an SCC with the lowest carrier index among SCCs comprising the uplink shared channels with the second TTI length for transmission, is selected to carry the UCI, and if there are a plurality of uplink shared channels with the second TTI length for transmission, on the selected carrier, then the first or last one of the uplink shared channels with the second TTI length for transmission is selected to carry the UCI; wherein when the selected uplink shared channel with the second TTI length for transmission is an uplink shared channel corresponding to an RAR grant, the UCI is not transmitted.

When the eighth scheme is applied, the preset rule 7 includes one or a combination of the following schemes:

all the UCI carried on the uplink shared channel with the second TTI length for transmission is transferred to and transmitted on the uplink control channel with the first TTI length for transmission; or when the UCI carried on the uplink shared channel with the second TTI length for transmission is ACK/NACK and/or an SR, the UCI is transferred to and transmitted on the uplink control channel with the first TTI length for transmission; when the UCI carried on the uplink shared channel with the second TTI length for transmission comprises P-CSI, the P-CSI carried on the uplink shared channel with the second TTI length for transmission is dropped, or if P-CSI is carried on the uplink control channel with the first TTI length for transmission, then the P-CSI carried on the uplink shared channel with the second TTI length for transmission is dropped, and if no P-CSI is carried on the uplink control channel with the first TTI length for transmission, then the P-CSI carried on the uplink shared channel with the second TTI length for transmission is transferred to and transmitted on the uplink control channel with the first TTI length for transmission.

When the ninth scheme is applied, when the selected uplink channel is the uplink shared channel with the second TTI length for transmission, and when there are a plurality of uplink shared channels with the second TTI length for transmission, in a transmission period of time of the uplink control channel with the first TTI length for transmission, a channel to carry the UCI is selected as in the scheme in the preset rule 7.

In an implementation, priorities of UCI are as follows: a priority of an SR is higher than or equal to that of ACK/NACK, and a priority of ACK/NACK is higher than that of P-CSI.

In an implementation, the preset rule 1 includes one or a combination of the following schemes:

UCI in the uplink channel which is not selected is transferred to and transmitted on the selected uplink channel;

when the UCI in the uplink channel which is not selected is ACK/NACK and/or an SR, the UCI is transferred to and transmitted on the selected uplink channel; when the UCI in the uplink channel which is not selected comprises P-CSI, the P-CSI in the uplink channel which is not selected is dropped, or if P-CSI is carried on the selected uplink channel, then the P-CSI in the uplink channel which is not selected is dropped, or if no P-CSI is carried on the selected uplink channel, then the P-CSI in the uplink channel which is not selected is transferred to and transmitted on the selected uplink channel;

when the selected uplink channel is an uplink channel with the first TTI length for transmission, if there are both an uplink shared channel with the first TTI length for transmission, and an uplink control channel with the first TTI length for transmission, then the uplink shared channel with the first TTI length for transmission or the uplink control channel with the first TTI length for transmission is selected to carry the UCI, or a part of the UCI is carried on the uplink shared channel with the first TTI length for transmission, and the other part of the UCI is carried on the uplink control channel with the first TTI length for transmission; when there are a plurality of uplink shared channels with the first TTI length, and when there is an uplink shared channel with the first TTI length for transmission on a PCC, the uplink shared channel with the first TTI length for transmission on the PCC is selected to carry the UCI; when there is no uplink shared channel with the first TTI length for transmission on the PCC, an uplink shared channel with the first TTI length for transmission, on an SCC with the lowest carrier index among SCCs comprising the uplink shared channels with the first TTI length for transmission is selected to carry the UCI; wherein when the selected uplink shared channel is an uplink shared channel corresponding to an RAR grant, the UCI is not transmitted;

when the selected uplink channel is the uplink control channel with the second TTI length for transmission, if there are a plurality of uplink control channels with the second TTI length for transmission, in the first TTI length, then the first or last uplink control channel with the second TTI length for transmission is selected to carry the UCI, or an uplink control channel with the second TTI length for transmission, which carries P-CSI is selected to carry P-CSI in the uplink channel which is not selected; if there is no uplink control channel with the second TTI length for transmission, which carries P-CSI, then the first or last uplink control channel with the second TTI length for transmission is selected to carry the P-CSI in the uplink channel which is not selected; an uplink control channel with the second TTI length for transmission, which carries ACK/NACK and/or an SR is selected to carry ACK/NACK and/or an SR in the uplink channel which is not selected; if there is no uplink control channel with the second TTI length for transmission, which carries ACK/NACK and/or an SR, then the first or last uplink control channel with the second TTI length for transmission is selected to carry the ACK/NACK and/or the SR in the uplink channel which is not selected; wherein when there are a plurality of channels satisfying the condition above, the first or last one of the plurality of channels satisfying the condition above is selected to carry the corresponding UCI in the uplink channel which is not selected; or when the selected uplink channel is the uplink shared channel with the second TTI length for transmission, if there are a plurality of uplink shared channels with the second TTI length for transmission, in the first TTI length, then the first or last one of the uplink shared channels with the second TTI length for transmission is selected to carry the UCI; or when a plurality of carriers are aggregated for a UE, and if there is an uplink shared channel with the second TTI length for transmission on the PCC, then the uplink shared channel with the second TTI length for transmission on the PCC is selected to carry the UCI; if there is no uplink shared channel with the second TTI length for transmission on the PCC, then an uplink shared channel with the second TTI length for transmission, on an SCC with the lowest carrier index among SCCs comprising the uplink shared channels with the second TTI length for transmission is selected to carry the UCI; and when there are a plurality of uplink shared channels with the second TTI length for transmission on the selected carrier, the first or last one of the uplink shared channels with the second TTI length for transmission is selected to carry the UCI; wherein when the selected uplink shared channel with the second TTI length for transmission is an uplink shared channel corresponding to an RAR grant, the UCI is not transmitted.

In an implementation, the method further includes:

determining whether a sum of transmission power of the uplink channel with the first TTI length for transmission, and transmission power of the uplink channel with the second TTI length for transmission exceeds a highest transmission power allowed for a UE, and when the sum of transmission powers exceeds the highest transmission power, determining whether the transmission period of time of the uplink channel with the first TTI length for transmission overlaps with the transmission period of time of the uplink channel with the second TTI length for transmission; and when the transmission period of time of the uplink channel with the first TTI length for transmission overlaps with the transmission period of time of the uplink channel with the second TTI length for transmission, selecting at least one uplink channel from the uplink channels for transmission, under the preset method, and dropping the remaining uplink channel of the uplink channels, or transmitting the remaining uplink channel using puncturing; and/or determining whether there is a support of simultaneous transmission of the uplink channel with the first TTI length for transmission, and the uplink channel with the second TTI length for transmission, and when there is no support, determining whether the transmission period of time of the uplink channel with the first TTI length for transmission overlaps with the transmission period of time of the uplink channel with the second TTI length for transmission; and when the transmission period of time of the uplink channel with the first TTI length for transmission overlaps with the transmission period of time of the uplink channel with the second TTI length for transmission, selecting at least one uplink channel from the uplink channels for transmission, under the preset method, and dropping the remaining uplink channel, or transmitting the remaining uplink channel using puncturing; and/or determining whether there is a support of simultaneous transmission of an uplink control channel with the first TTI length for transmission, and an uplink shared channel with the second TTI length for transmission, and/or simultaneous transmission of an uplink shared channel with the first TTI length for transmission, and an uplink control channel with the second TTI length for transmission, and when there is no support, determining whether the transmission period of time of the uplink channel with the first TTI length for transmission overlaps with the transmission period of time of the uplink channel with the second TTI length for transmission; and when the transmission period of time of the uplink channel with the first TTI length for transmission overlaps with the transmission period of time of the uplink channel with the second TTI length for transmission, selecting at least one uplink channel from the uplink channels for transmission, under the preset method, and dropping the remaining uplink channel, or transmitting the remaining uplink channel using puncturing.

In a second aspect, an embodiment of the invention provides a method for transmitting data, the method including: determining whether a transmission period of time of an uplink channel with a first TTI length for transmission overlaps with a transmission period of time of an uplink channel with a second TTI length for transmission; and if so, then determining that a UE selects an uplink channel from the uplink channels for transmission, under a preset method, and drops a remaining uplink channel or transmitting the remaining uplink channel using puncturing.

In an implementation, the first TTI length is longer than the second TTI length.

In an implementation, the uplink channels include an uplink control channel and/or an uplink shared channel.

In an implementation, the preset method is one or a combination of the following methods:
an uplink control channel is selected, and an uplink shared channel is dropped or transmitted using puncturing;
the uplink channel with the second TTI length for transmission is selected, and the uplink channel with the first TTI length for transmission is dropped or transmitted using puncturing; or
an uplink channel carrying UCI is selected, and when there are a plurality of uplink channels carrying UCI, an uplink channel carrying UCI with a high priority is selected, and when there are a plurality of uplink channels carrying UCI with the high priority, an uplink channel is selected under any of the above methods, and a remaining uplink channel is dropped or transmitted using puncturing.

In an implementation, the method further includes: determining that the UE transfers UCI in an uplink channel which is not selected to the selected uplink channel under a preset rule 1, and transmits the UCI on the selected uplink channel.

In an implementation, when the uplink channel with the first TTI length for transmission overlaps with an uplink control channel with the second TTI length for transmission, at least one of the following schemes is applied, wherein the uplink channel with the first TTI length for transmission comprises at least one of an uplink shared channel or an uplink control channel:
in a first scheme, it is determined that the uplink control channel with the second TTI length for transmission is selected by the UE for transmission, the uplink channel with the first TTI length for transmission is dropped, or information in a symbol in the uplink channel with the first TTI length for transmission, which overlaps with the symbol in the uplink control channel with the second TTI length for transmission is punctured;
in a second scheme, it is determined that that the uplink channel with the first TTI length for transmission is selected by the UE, and the uplink control channel with the second TTI length for transmission is dropped; or
in a third scheme, it is determined that an uplink channel carrying UCI is selected, and when there are a plurality of uplink channels carrying UCI, an uplink channel carrying UCI with a high priority is selected, and a remaining uplink channel is dropped, or information in a symbol, in the remaining uplink channel, which overlaps with the symbol in the selected uplink channel, is punctured; and when there are a plurality of uplink channels carrying UCI with the same high priority, an uplink channel is selected from the plurality of uplink channels carrying UCI with the same high priority as in the first scheme or the second scheme.

In an implementation, when the first scheme is applied, it is determined that UCI carried on the uplink channel with the first TTI length for transmission is transferred by the UE to and transmitted on the uplink control channel with the second TTI length for transmission under a preset rule 1 or a preset rule 2; when the second scheme is applied, it is determined that UCI carried on the uplink control channel with the second TTI length for transmission is transferred by the UE to and transmitted on the uplink channel with the first TTI length for transmission, under the preset rule 1 or a preset rule 3; and when the third scheme is applied, it is determined that UCI in an unselected uplink channel is transferred by the UE to and transmitted on the selected uplink channel under the preset rule 1.

In an implementation, when the first scheme is applied, the preset rule 2 includes one or a combination of the following schemes:
all the UCI carried on the uplink channel with the first TTI length for transmission is transferred to and transmitted on the uplink control channel with the second TTI length for transmission;
when the UCI carried on the uplink channel with the first TTI length for transmission, is ACK/NACK and/or an SR, the UCI is transferred to and transmitted on the uplink control channel with the second TTI length for transmission;
when the UCI carried on the uplink channel with the first TTI length for transmission comprises P-CSI, the P-CSI carried on the uplink channel with the first TTI length for transmission is dropped, or if the uplink control channel with the second TTI length for transmission carries P-CSI, then the P-CSI carried on the uplink channel with the first TTI length for transmission is dropped, and if the uplink control channel with the second TTI length for transmission does not carry any P-CSI, then the P-CSI carried on the uplink channel with the first TTI length for transmission is transferred to and transmitted on the uplink control channel with the second TTI length for transmission; or
when there are a plurality of uplink control channels with the second TTI length for transmission, in a transmission period of time of the uplink channel with the first TTI length for transmission, then:
the first or last one of the uplink control channels with the second TTI length for transmission is selected to carry the UCI; or
an uplink control channel with the second TTI length for transmission, which carries P-CSI is selected to carry P-CSI in the uplink channel with the first TTI length for transmission, and if there is no uplink control channel with the second TTI length for transmission, which carries P-CSI, the first or last one of the uplink control channels with the second TTI length for transmission is selected to carry the P-CSI in the uplink channel with the first TTI length for transmission; and an uplink control channel with the second TTI length for transmission, which carries ACK/NACK and/or an SR is selected to carry ACK/NACK and/or an SR in the uplink channel with the first TTI length for transmission; and if there is no uplink control channel with the second TTI length for transmission, which carries ACK/NACK and/or an SR, then the first or last one of the uplink control channels with the second TTI length for transmission is selected to carry the ACK/NACK and/or the SR in the uplink channel with the first TTI length for transmission; wherein when there are a plurality of channels satisfying the above condition, the first or last one of the plurality of channels satisfying the condition is selected to carry the UCI in the uplink channel with the first TTI length for transmission.

When the second scheme is applied, the preset rule 3 includes one or a combination of the following schemes:

all the UCI carried on the uplink control channel with the second TTI length for transmission is transferred to and transmitted on the uplink channel with the first TTI length for transmission;

when the UCI carried on the uplink control channel with the second TTI length for transmission is ACK/NACK and/or an SR, the UCI is transferred to and transmitted on the uplink channel with the first TTI length for transmission; and when the UCI carried on the uplink control channel with the second TTI length for transmission comprises P-CSI, the P-CSI carried on the uplink control channel with the second TTI length for transmission is dropped, or if P-CSI is carried on the uplink channel with the first TTI length for transmission, then the P-CSI carried on the uplink control channel with the second TTI length for transmission is dropped, and if no P-CSI is carried on the uplink channel with the first TTI length for transmission, then the P-CSI carried on the uplink control channel with the second TTI length for transmission is transferred to and transmitted on the uplink channel with the first TTI length for transmission; or when there are both an uplink shared channel with the first TTI length for transmission, and an uplink control channel with the first TTI length for transmission, one of the uplink shared channel with the first TTI length for transmission, and the uplink control channel with the first TTI length for transmission, is selected to carry the UCI, or a part of the UCI is carried on the uplink shared channel with the first TTI length for transmission, and the other part of the UCI is carried on the uplink control channel with the first TTI length for transmission; and/or when there are a plurality of uplink shared channels with the first TTI length for transmission, and if there is an uplink shared channel with the first TTI length for transmission on a PCC, then the uplink shared channel with the first TTI length for transmission on the PCC is selected to carry the UCI, and if there is no uplink shared channel with the first TTI length for transmission on the PCC, then an uplink shared channel with the first TTI length for transmission on an SCC with the lowest carrier index among SCCs comprising the uplink shared channels with the first TTI length for transmission is selected to carry the UCI, wherein if the selected uplink shared channel is an uplink shared channel corresponding to an RAR grant, then the UCI is not transmitted.

When the third scheme is applied, when the selected uplink channel is the uplink control channel with the second TTI length for transmission, if there are a plurality of uplink control channels with the second TTI length for transmission, in a transmission period of time of the uplink channel with the first TTI length for transmission, then an uplink channel to carry the UCI is selected in the same scheme as in the preset rule 2; and when the selected uplink channel is the uplink channel with the first TTI length for transmission, if there are both an uplink shared channel with the first TTI length for transmission and an uplink control channel with the first TTI length for transmission, or there are a plurality of uplink shared channels with the first TTI length for transmission, then a channel to carry the UCI is selected in the same scheme as in the preset rule 3.

In an implementation, when an uplink shared channel with the first TTI length for transmission overlaps with an uplink shared channel with the second TTI length for transmission, at least one of the following schemes is applied:

in a fourth scheme, it is determined that the uplink shared channel with the second TTI length for transmission is selected by the UE for transmission, and the uplink shared channel with the first TTI length for transmission is dropped, or information, in a symbol in the uplink shared channel with the first TTI length for transmission, which overlaps with the symbol in the uplink shared channel with the second TTI length for transmission, is punctured;

in a fifth scheme, it is determined that the uplink shared channel with the first TTI length for transmission is selected by the UE for transmission, and the uplink shared channel with the second TTI length for transmission is dropped; or in a sixth scheme, it is determined that an uplink channel carrying UCI is selected by the UE, and when there are a plurality of uplink channels carrying UCI, an uplink channel carrying UCI with a high priority is selected, and a remaining uplink channel is dropped, or information in a symbol, in the remaining uplink channel, which overlaps with the symbol in the selected uplink channel is punctured; and when there are a plurality of channels carrying the UCI with the same high priority, an uplink channel is selected from the plurality of channels carrying the UCI with the same high priority as in the third scheme or the fourth scheme.

In an implementation, when the fourth scheme is applied, it is determined that UCI carried on the uplink shared channel with the first TTI length for transmission is transferred by the UE to and transmitted on the uplink shared channel with the second TTI length for transmission under a preset rule 1 or a preset rule 4; when the fifth scheme is applied, it is determined that UCI carried on the uplink shared channel with the second TTI length for transmission is transferred by the UE to and transmitted on the uplink shared channel with the first TTI length for transmission under the preset rule 1 or a preset rule 5; and when the sixth scheme is applied, it is determined that UCI in an unselected uplink channel is transferred by the UE to and transmitted on the selected uplink channel under the preset rule 1.

In an implementation, when the fourth scheme is applied, the preset rule 4 includes one or a combination of the following schemes:

all the UCI carried on the uplink shared channel with the first TTI length for transmission is transferred to and transmitted on the uplink shared channel with the second TTI length for transmission;

when the UCI carried on the uplink shared channel with the first TTI length for transmission is ACK/NACK and/or an SR, the UCI is transferred to and transmitted on the uplink shared channel with the second TTI length for transmission, and when the UCI carried on the uplink shared channel with the first TTI length for transmission comprises P-CSI, the P-CSI carried on the uplink shared channel with the first TTI length for transmission is dropped, or if P-CSI is carried on the uplink shared channel with the second TTI length for transmission, then the P-CSI carried on the uplink shared channel with the first TTI length for transmission is dropped; and if no P-CSI is carried on the uplink shared channel with the second TTI length for transmission, then the P-CSI carried on the uplink shared channel with the first TTI length for transmission is transferred to and transmitted on the uplink shared channel with the second TTI length for transmission; or when there are a plurality of uplink shared channels with the second TTI length for transmission, in a transmission period of time of the uplink shared channel with the first TTI length for transmission, the first or last one of the uplink shared channels with the second TTI length for transmission is selected to carry the UCI; or when a plurality of carriers are aggregated for the UE, if there is an uplink shared channel with the second TTI length for transmission on a PCC, then the uplink shared channel with the second TTI length for transmission on the PCC is selected to carry the UCI; if there is no uplink shared channel with the second TTI length for transmission on the PCC, then an uplink shared channel with the second TTI length for transmission on an SCC with the lowest carrier index among SCCs comprising the uplink shared channels with the second TTI length for transmission is selected to carry the UCI; and if there are a plurality of uplink shared channels with the second TTI length for transmission on the selected carrier, then the first or last one of the uplink shared channels with the second TTI length for transmission is selected to carry the UCI; and when the selected uplink shared channel with the second TTI length for transmission is an uplink shared channel corresponding to an RAR grant, the UCI is not transmitted.

When the fifth scheme is applied, the preset rule 5 includes one or a combination of the following schemes:

all the UCI carried on the uplink shared channel with the second TTI length for transmission is transferred to and transmitted on the uplink shared channel with the first TTI length for transmission;

when the UCI carried on the uplink shared channel with the second TTI length for transmission is ACK/NACK and/or an SR, the UCI is transferred to and transmitted on the uplink shared channel with the first TTI length for transmission; and when the UCI carried on the uplink shared channel with the second TTI length for transmission comprises P-CSI, the P-CSI carried on the uplink shared channel with the second TTI length for transmission is dropped, or if P-CSI is carried on the uplink shared channel with the first TTI length for transmission, then the P-CSI carried on the uplink shared channel with the second TTI length for transmission is dropped, and if no P-CSI is carried on the uplink shared channel with the first TTI length for transmission, then the P-CSI carried on the uplink shared channel with the second TTI length for transmission is transferred to and transmitted on the uplink shared channel with the first TTI length for transmission; or when there are a plurality of uplink shared channels with the first TTI length for transmission, if there is an uplink shared channel with the first TTI length for transmission on a PCC, then the uplink shared channel with the first TTI length for transmission on the PCC is selected to carry UCI in the sPUSCH; if there is no uplink shared channel with the first TTI length for transmission on the PCC, then an uplink shared channel with the first TTI length for transmission on an SCC with the lowest carrier index among SCCs comprising the uplink shared channels with the first TTI length for transmission is selected to carry the UCI in the sPUSCH; and when the selected uplink shared channel with the first TTI length for transmission is an uplink shared channel corresponding to an RAR grant, then the UCI is not transmitted.

When the sixth scheme is applied, when the selected uplink channel is the uplink shared channel with the second TTI length for transmission, and when there are a plurality of uplink shared channels with the second TTI length for transmission, in a transmission period of time of the uplink shared channel with the first TTI length for transmission, then a channel to carry the UCI is selected as in the scheme as in the preset rule 4; and when the selected uplink channel is the uplink shared channel with the first TTI length for transmission, and when there are a plurality of uplink shared channels with the first TTI length for transmission, then a channel to carry the UCI is selected as in the scheme as in the preset rule 5.

In an implementation, wherein when an uplink control channel with the first TTI length for transmission overlaps with an uplink shared channel with the second TTI length for transmission, at least one of the following schemes is applied:

in a seventh scheme, it is determined that the uplink shared channel with the second TTI length for transmission is selected by the UE for transmission, and the uplink control channel with the first TTI length for transmission is dropped, or information in a symbol in the uplink control channel with the first TTI length for transmission, which overlaps with the symbol in the uplink shared channel with the second TTI length for transmission is punctured;

in an eighth scheme, it is determined that the uplink control channel with the first TTI length for transmission is selected by the UE for transmission, and the uplink shared channel with the second TTI length for transmission is dropped; or in a ninth scheme, it is determined that an uplink channel carrying UCI is selected by the UE, and when there are a plurality of uplink channels carrying UCI, an uplink channel carrying UCI with a high priority is selected, and a remaining uplink channel is dropped, or information in a symbol, in the remaining uplink channel, which overlaps with the symbol in the selected uplink channel is punctured; and when there are a plurality of channels carrying the UCI with the same high priority, an uplink channel is selected from the plurality of channels carrying the UCI with the same high priority as in the seventh scheme or the eighth scheme.

In an implementation, when the seventh scheme is applied, it is determined that UCI carried on the uplink control channel with the first TTI length for transmission is transferred by the UE to and transmitted on the uplink shared channel with the second TTI length for transmission under a preset rule 1 or a preset rule 6; when the eighth scheme is applied, when the uplink shared channel with the second TTI length for transmission carries UCI, then it is determined that the UCI is transferred by the UE to and transmitted on the uplink control channel with the first TTI length for transmission under the preset rule 1 or a preset rule 7; and when the ninth scheme is applied, it is determined that UCI in an unselected uplink channel is transferred by the UE to and transmitted on the selected uplink channel under the preset rule 1.

In an implementation, when the seventh scheme is applied, the preset rule 6 includes one or a combination of the following schemes:

all the UCI carried on the uplink control channel with the first TTI length for transmission is transferred to and transmitted on the uplink shared channel with the second TTI length for transmission;

when the UCI carried on the uplink control channel with the first TTI length for transmission is ACK/NACK and/or an SR, the UCI is transferred to and transmitted on the uplink shared channel with the second TTI length for transmission; when the UCI carried on the uplink control channel with the first TTI length for transmission comprises P-CSI, the P-CSI carried on the uplink control channel with the first TTI length for transmission is dropped, or if P-CSI is carried on the uplink shared channel with the second TTI length for transmission, then the P-CSI carried on the uplink control channel with the first TTI length for transmission is dropped; and if no P-CSI is carried on the uplink shared channel with the second TTI length for transmission, then the P-CSI carried on the uplink control channel with the first TTI length for transmission is transferred to and transmitted on the uplink shared channel with the second TTI length for transmission; or when there are a plurality of uplink shared channels with the second TTI length for transmission, in a transmission period of time of the uplink control channel with the first TTI length for transmission, the first or last one of the uplink shared channels with the second TTI length for transmission is selected to carry the UCI; or when a plurality of carriers are aggregated for the UE, if there is an uplink shared channel with the second TTI length for transmission on a PCC, then the uplink shared channel with the second TTI length for transmission on the PCC is selected to carry the UCI; if there is no uplink shared channel with the second TTI length for transmission on the PCC, then an uplink shared channel with the second TTI length for transmission on an SCC with the lowest carrier index among SCCs comprising the uplink shared channels with the second TTI length for transmission is selected to carry the UCI, and if there are a plurality of uplink shared channels with the second TTI length for transmission on the selected carrier, then the first or last one of the uplink shared channels with the second TTI length for transmission is selected to carry the UCI; and if the selected uplink shared channel with the second TTI length for transmission is an uplink shared channel corresponding to an RAR grant, then the UCI is not transmitted.

When the eighth scheme is applied, the preset rule 7 includes one or a combination of the following schemes:

all the UCI carried on the uplink shared channel with the second TTI length for transmission is transferred to and transmitted on the uplink control channel with the first TTI length for transmission; or when the UCI carried on the uplink shared channel with the second TTI length for transmission is ACK/NACK and/or an SR, the UCI is transferred to and transmitted on the uplink control channel with the first TTI length for transmission; and when the UCI carried on the uplink shared channel with the second TTI length for transmission comprises P-CSI, the P-CSI carried on the uplink shared channel with the second TTI length for transmission is dropped, or if P-CSI is carried on the uplink control channel with the first TTI length for transmission, then the P-CSI carried on the uplink shared channel with the second TTI length for transmission is dropped, and if no P-CSI is carried on the uplink control channel with the first TTI length for transmission, then the P-CSI carried on the uplink shared channel with the second TTI length for transmission is transferred to and transmitted on the uplink control channel with the first TTI length for transmission.

When the ninth scheme is applied, when the selected uplink channel is the uplink shared channel with the second TTI length for transmission, if there are a plurality of uplink shared channels with the second TTI length for transmission, in a transmission period of time of the uplink control channel with the first TTI length for transmission, then a channel to carry the UCI is selected as in the scheme in the preset rule 7.

In an implementation, the priorities of UCI are as follows: a priority of an SR is higher than or equal to that of ACK/NACK, and a priority of ACK/NACK is higher than that of P-CSI.

In an implementation, the preset rule 1 includes one or a combination of the following schemes:

UCI in the uplink channel which is not selected is transferred to and transmitted on the selected uplink channel;

when the UCI in the uplink channel which is not selected is ACK/NACK and/or an SR, the UCI is transferred to and transmitted on the selected uplink channel; and when the UCI in the uplink channel which is not selected comprises P-CSI, the P-CSI in the uplink channel which is not selected is dropped, or if P-CSI is carried on the selected uplink channel, then the P-CSI in the uplink channel which is not selected is dropped, and if no P-CSI is carried on the selected uplink channel, then the P-CSI in the uplink channel which is not selected is transferred to and transmitted on the selected uplink channel;

when the selected uplink channel is an uplink channel with the first TTI length for transmission, if there are both an uplink shared channel with the first TTI length for transmission, and an uplink control channel with the first TTI length for transmission, then the uplink shared channel with the first TTI length for transmission or the uplink control channel with the first TTI length for transmission is selected to carry the UCI, or a part of the UCI is carried on the uplink shared channel with the first TTI length for transmission, and the other part of the UCI is carried on the uplink control channel with the first TTI length for transmission; if there are a plurality of uplink shared channels with the first TTI length, then when there is an uplink shared channel with the first TTI length for transmission, on a PCC, the uplink shared channel with the first TTI length for transmission, on the PCC is selected to carry the UCI, and when there is no uplink shared channel with the first TTI length for transmission, on the PCC, an uplink shared channel with the first TTI length for transmission, on an SCC with the lowest carrier index among SCCs comprising the uplink shared channels with the first TTI length for transmission is selected to carry the UCI, wherein if the selected uplink shared channel is an uplink shared channel corresponding to an RAR grant, then the UCI is not transmitted;

when the selected uplink channel is the uplink control channel with the second TTI length for transmission, if there are a plurality of uplink control channels with the second TTI length for transmission, in the first TTI length, then the first or last uplink control channel with the second TTI length for transmission is selected to carry the UCI, or an uplink control channel with the second TTI length for transmission, which carries P-CSI is selected to carry P-CSI in the uplink channel which is not selected; if there is no uplink control channel with the second TTI length for transmission, which carries P-CSI, then the first or last uplink control channel with the second TTI length for transmission is selected to carry the P-CSI in the uplink channel which is not selected, and an uplink control channel with the second TTI length for transmission, which carries ACK/NACK and/or an SR is selected to carry ACK/NACK and/or an SR in the uplink channel which is not selected; if there is no uplink control channel with the second TTI length for transmission, which carries ACK/NACK and/or an SR, then the first or last uplink control channel with the second TTI length for transmission is selected to carry the ACK/NACK and/or the SR in the uplink channel which is not selected; and if there are a plurality of channels satisfying the condition above, then the first or last one of the plurality of channels satisfying the condition above is selected to carry the corresponding UCI in the uplink channel which is not selected; or when the selected uplink channel is the uplink shared channel with the second TTI length for transmission, if there are a plurality of uplink shared channels with the second TTI length for transmission, in the first TTI length, then the first or last one of the uplink shared channels with the second TTI length for transmission is selected to carry the UCI; or when a plurality of carriers are aggregated for the UE, if there is an uplink shared channel with the second TTI length for transmission, on the PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs comprising the uplink shared channels with the second TTI length for transmission is selected to carry the UCI, and if there are a plurality of uplink shared channels with the second TTI length for transmission, on the selected carrier, then the first or last one of the uplink shared channels with the second TTI length for transmission is selected to carry the UCI; and if the selected uplink shared channel with the second TTI length for transmission is an uplink shared channel corresponding to an RAR grant, then the UCI is not transmitted.

In an implementation, the method further includes: determining that the UE operates in the following steps of:

determining whether a sum of transmission power of the uplink channel with the first TTI length for transmission, and transmission power of the uplink channel with the second TTI length for transmission exceeds a highest transmission power allowed for the UE, and when the sum of transmission powers exceeds the highest transmission power, determining whether the transmission period of time of the uplink channel with the first TTI length for transmission overlaps with the transmission period of time of the uplink channel with the second TTI length for transmission; and when the transmission period of time of the uplink channel with the first TTI length for transmission overlaps with the transmission period of time of the uplink channel with the second TTI length for transmission, selecting an uplink channels for transmission, under the preset method, and dropping the remaining uplink channel or transmitting the remaining uplink channel using puncturing; and/or determining whether there is a support of simultaneous transmission of the uplink channel with the first TTI length for transmission, and the uplink channel with the second TTI length for transmission, and when there is no support, determining whether the transmission period of time of the uplink channel with the first TTI length for transmission overlaps with the transmission period of time of the uplink channel with the second TTI length for transmission; and when the transmission period of time of the uplink channel with the first TTI length for transmission overlaps with the transmission period of time of the uplink channel with the second TTI length for transmission, selecting an uplink channel for transmission under the preset method, and dropping the remaining uplink channel or transmitting the remaining uplink channel using puncturing; and/or determining whether there is a support of simultaneous transmission of an uplink control channel with the first TTI length for transmission, and an uplink shared channel with the second TTI length for transmission, and/or simultaneous transmission of an uplink shared channel with the first TTI length for transmission, and an uplink control channel with the second TTI length for transmission, and when there is no support, determining whether the transmission period of time of the uplink channel with the first TTI length for transmission overlaps with the transmission period of time of the uplink channel with the second TTI length for transmission; and when the transmission period of time of the uplink channel with the first TTI length for transmission overlaps with the transmission period of time of the uplink channel with the second TTI length for transmission, selecting an uplink channel for transmission under the preset method, and dropping the remaining uplink channel or transmitting the remaining uplink channel using puncturing.

In a third aspect, an embodiment of the invention provides an apparatus for transmitting data, the apparatus including: a first determining module configured to determine whether a transmission period of time of an uplink channel with a first TTI length for transmission overlaps with a transmission period of time of an uplink channel with a second TTI length for transmission; and a transmitting module configured, if so, to select at least one uplink channel for transmission, under a preset method, and to drop a remaining uplink channel, or to transmit the remaining uplink channel using puncturing.

In an implementation, the first TTI length is longer than the second TTI length.

In an implementation, the uplink channels include an uplink control channel and/or an uplink shared channel.

In an implementation, the preset method is one or a combination of the following methods:

an uplink control channel is selected, and an uplink shared channel is dropped or transmitted using puncturing;

the uplink channel with the second TTI length for transmission is selected, and the uplink channel with the first TTI length for transmission is dropped or transmitted using puncturing; or an uplink channel carrying UCI is selected, if there are a plurality of uplink channels carrying UCI, then an uplink channel carrying UCI with a high priority is selected, and if there are a plurality of uplink channels carrying UCI with the high priority, then an uplink channel is selected under any of the above methods; and a remaining uplink channel is dropped or transmitted using puncturing.

In an implementation, the transmitting module is further configured: to transfer UCI in an unselected uplink channel to the selected uplink channel under a preset rule 1, and to transmit the UCI on the selected uplink channel.

In an implementation, when the uplink channel with the first TTI length for transmission overlaps with an uplink control channel with the second TTI length for transmission, at least one of the following schemes is applied, wherein the uplink channel with the first TTI length for transmission comprises at least one of an uplink shared channel or an uplink control channel:

in a first scheme, the uplink control channel with the second TTI length for transmission is selected for transmission, the uplink channel with the first TTI length for transmission is dropped, or information in a symbol, in the uplink channel with the first TTI length for transmission, which overlaps with the symbol in the uplink control channel with the second TTI length for transmission, is punctured;

in a second scheme, the uplink channel with the first TTI length for transmission is selected, and the uplink control channel with the second TTI length for transmission is dropped; or in a third scheme, an uplink channel carrying UCI is selected, and when there are a plurality of uplink channels carrying UCI, an uplink channel carrying UCI with a high priority is selected, and a remaining uplink channel is dropped, or information in a symbol, in the remaining uplink channel, which overlaps with the symbol in the selected uplink channel, is punctured; and when the plurality of uplink channels carry the UCI with a same high priority, then an uplink channel is selected from the plurality of uplink channels carrying the UCI with the same priority as in the first scheme or the second scheme.

In an implementation, when the first scheme is applied, UCI carried on the uplink channel with the first TTI length for transmission is transferred to and transmitted on the uplink control channel with the second TTI length for transmission under a preset rule 1 or a preset rule 2; when the second scheme is applied, UCI carried on the uplink control channel with the second TTI length for transmission is transferred to and transmitted on the uplink channel with the first TTI length for transmission, under the preset rule 1 or a preset rule 3; and when the third scheme is applied, UCI in an uplink channel which is not selected is transferred to and transmitted on the selected uplink channel under the preset rule 1.

In an implementation, when the first scheme is applied, the preset rule 2 includes one or a combination of the following schemes:

all the UCI carried on the uplink channel with the first TTI length for transmission is transferred to and transmitted on the uplink control channel with the second TTI length for transmission;

when the UCI carried on the uplink channel with the first TTI length for transmission is ACK/NACK and/or an SR, the UCI is transferred to and transmitted on the uplink control channel with the second TTI length for transmission; and when the UCI carried on the uplink channel with the first TTI length for transmission comprises P-CSI, the P-CSI carried on the uplink channel with the first TTI length for transmission is dropped, or if the uplink control channel with the second TTI length for transmission carries P-CSI, then the P-CSI carried on the uplink channel with the first TTI length for transmission is dropped, and if the uplink control channel with the second TTI length for transmission does not carry any P-CSI, the P-CSI carried on the uplink channel with the first TTI length for transmission is transferred to and transmitted on the uplink control channel with the second TTI length for transmission; or when there are a plurality of uplink control channels with the second TTI length for transmission, in a transmission period of time of the uplink channel with the first TTI length for transmission, then:

the first or last one of the uplink control channels with the second TTI length for transmission is selected to carry the UCI; or an uplink control channel with the second TTI length for transmission, which carries P-CSI is selected to carry P-CSI in the uplink channel with the first TTI length for transmission, and when there is no uplink control channel with the second TTI length for transmission, which carries P-CSI, then the first or last one of the uplink control channels with the second TTI length for transmission is selected to carry the P-CSI in the uplink channel with the first TTI length for transmission; and an uplink control channel with the second TTI length for transmission, which carries ACK/NACK and/or an SR is selected to carry ACK/NACK and/or an SR in the uplink channel with the first TTI length for transmission; and when there is no uplink control channel with the second TTI length for transmission, which carries ACK/NACK and/or an SR, then the first or last one of the uplink control channels with the second TTI length for transmission is selected to carry the ACK/NACK and/or the SR in the uplink channel with the first TTI length for transmission; and when there are a plurality of channels satisfying the condition, then the first or last one of the plurality of channels satisfying the condition is selected to carry the UCI in the uplink channel with the first TTI length for transmission.

When the second scheme is applied, the preset rule 3 includes one or a combination of the following schemes:

all the UCI carried on the uplink control channel with the second TTI length for transmission is transferred to and transmitted on the uplink channel with the first TTI length for transmission;

when the UCI carried on the uplink control channel with the second TTI length for transmission is ACK/NACK and/or an SR, the UCI is transferred to and transmitted on the uplink channel with the first TTI length for transmission; and when the UCI carried on the uplink control channel with the second TTI length for transmission comprises P-CSI, the P-CSI carried on the uplink control channel with the second TTI length for transmission is dropped, or if P-CSI is carried on the uplink channel with the first TTI length for transmission, then the P-CSI carried on the uplink control channel with the second TTI length for transmission is dropped, and if no P-CSI is carried on the uplink channel with the first TTI length for transmission, then the P-CSI carried on the uplink control channel with the second TTI length for transmission is transferred to and transmitted on the uplink channel with the first TTI length for transmission; or when there are both an uplink shared channel with the first TTI length for transmission, and an uplink control channel, with the first TTI length for transmission, one of the uplink shared channel with the first TTI length for transmission, and the uplink control channel with the first TTI length for transmission, is selected to carry the UCI, or a part of the UCI is carried on the uplink shared channel with the first TTI length for transmission, and the other part of the UCI is carried on the uplink control channel with the first TTI length for transmission; and/or when there are a plurality of uplink shared channels with the first TTI length for transmission if there is an uplink shared channel with the first TTI length for transmission, on a PCC, then the uplink shared channel with the first TTI length for transmission, on the PCC is selected to carry the UCI, or if there is no uplink shared channel with the first TTI length for transmission, on the PCC, an uplink shared channel with the first TTI length for transmission, on an SCC with a lowest carrier index is selected to carry the UCI, wherein when the selected uplink shared channel is an uplink shared channel corresponding to an RAR grant, then the UCI is not transmitted.

When the third scheme is applied, when the selected uplink channel is the uplink control channel with the second TTI length for transmission, and when there are a plurality of uplink control channels with the second TTI length for transmission, in a transmission period of time of the uplink channel with the first TTI length for transmission, an uplink channel to carry the UCI is selected in the same scheme as in the preset rule 2; and when the selected uplink channel is the uplink channel with the first TTI length for transmission, and when there are both an uplink shared channel with the first TTI length for transmission and an uplink control channel with the first TTI length for transmission, or there are a plurality of uplink shared channels with the first TTI length for transmission, then a channel to carry the UCI is selected in the same scheme as in the preset rule 3.

In an implementation, when an uplink shared channel with the first TTI length for transmission overlaps with an uplink shared channel with the second TTI length for transmission, at least one of the following schemes is applied:

in a fourth scheme, the uplink shared channel with the second TTI length for transmission is selected for transmission, and the uplink shared channel with the first TTI length for transmission is dropped, or information in a symbol in the uplink shared channel with the first TTI length for transmission, which overlaps with the symbol in the uplink shared channel with the second TTI length for transmission is punctured;

in a fifth scheme, the uplink shared channel with the first TTI length for transmission is selected for transmission, and the uplink shared channel with the second TTI length for transmission is dropped; or in a sixth scheme, an uplink channel carrying UCI is selected, and when there are a plurality of uplink channels carrying UCI, an uplink channel carrying UCI with a high priority is selected, and a remaining uplink channel is dropped, or information in a symbol, in the remaining uplink channel, which overlaps with the symbol in the selected uplink channel is punctured; and when the plurality of channels carry the UCI with a same priority, an uplink channel is selected from the plurality of channels carrying the UCI with the same priority as in the third scheme or the fourth scheme.

In an implementation, when the fourth scheme is applied, UCI carried on the uplink shared channel with the first TTI length for transmission is transferred to and transmitted on the uplink shared channel with the second TTI length for transmission under a preset rule 1 or a preset rule 4; when the fifth scheme is applied, UCI carried on the uplink shared channel with the second TTI length for transmission is transferred to and transmitted on the uplink shared channel with the first TTI length for transmission under the preset rule 1 or a preset rule 5; and when the sixth scheme is applied, UCI in an uplink channel which is not selected is transferred to and transmitted on the selected uplink channel under the preset rule 1.

In an implementation, when the fourth scheme is applied, the preset rule 4 includes one or a combination of the following schemes:

all the UCI carried on the uplink shared channel with the first TTI length for transmission is transferred to and transmitted on the uplink shared channel with the second TTI length for transmission;

when the UCI carried on the uplink shared channel with the first TTI length for transmission is ACK/NACK and/or an SR, the UCI is transferred to and transmitted on the uplink shared channel with the second TTI length for transmission, and when the UCI carried on the uplink shared channel with the first TTI length for transmission comprises P-CSI, the P-CSI carried on the uplink shared channel with the first TTI length for transmission is dropped, or if P-CSI is carried on the uplink shared channel with the second TTI length for transmission, then the P-CSI carried on the uplink shared channel with the first TTI length for transmission is dropped; and if no P-CSI is carried on the uplink shared channel with the second TTI length for transmission, then the P-CSI carried on the uplink shared channel with the first TTI length for transmission is transferred to and transmitted on the uplink shared channel with the second TTI length for transmission; or when there are a plurality of uplink shared channels with the second TTI length for transmission, in a transmission period of time of the uplink shared channel with the first TTI length for transmission, the first or last one of the uplink shared channels with the second TTI length for transmission is selected to carry the UCI; or when a plurality of carriers are aggregated for a UE, if there is an uplink shared channel with the second TTI length for transmission, on a PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs comprising the uplink shared channels with the second TTI length for transmission is selected to carry the UCI; and if there are a plurality of uplink shared channels with the second TTI length for transmission, on the selected carrier, then the first or last one of the uplink shared channels with the second TTI length for transmission is selected to carry the UCI; wherein when the selected uplink shared channel with the second TTI length for transmission is an uplink shared channel corresponding to an RAR grant, the UCI is not transmitted.

When the fifth scheme is applied, the preset rule 5 includes one or a combination of the following schemes:

all the UCI carried on the uplink shared channel with the second TTI length for transmission is transferred to and transmitted on the uplink shared channel with the first TTI length for transmission;

when the UCI carried on the uplink shared channel with the second TTI length for transmission is ACK/NACK and/or an SR, the UCI is transferred to and transmitted on the uplink shared channel with the first TTI length for transmission; and when the UCI carried on the uplink shared channel with the second TTI length for transmission comprises P-CSI, the P-CSI carried on the uplink shared channel with the second TTI length for transmission is dropped, or if P-CSI is carried on the uplink shared channel with the first TTI length for transmission, then the P-CSI carried on the uplink shared channel with the second TTI length for transmission is dropped, and if no P-CSI is carried on the uplink shared channel with the first TTI length for transmission, then the P-CSI carried on the uplink shared channel with the second TTI length for transmission is transferred to and transmitted on the uplink shared channel with the first TTI length for transmission; or when there are a plurality of uplink shared channels with the first TTI length for transmission, and if there is an uplink shared channel with the first TTI length for transmission, on a PCC, then the uplink shared channel with the first TTI length for transmission, on the PCC is selected to carry UCI in the sPUSCH; if there is no uplink shared channel with the first TTI length for transmission, on the PCC, then an uplink shared channel with the first TTI length for transmission, on an SCC with the lowest carrier index among SCCs comprising the uplink shared channels with the first TTI length for transmission is selected to carry the UCI in the sPUSCH; wherein when the selected uplink shared channel with the first TTI length for transmission is an uplink shared channel corresponding to an RAR grant, the UCI is not transmitted.

When the sixth scheme is applied, when the selected uplink channel is the uplink shared channel with the second TTI length for transmission, and when there are a plurality of uplink shared channels with the second TTI length for transmission, in a transmission period of time of the uplink shared channel with the first TTI length for transmission, a channel to carry the UCI is selected as in the scheme as in the preset rule 4; or when the selected uplink channel is the uplink shared channel with the first TTI length for transmission, and when there are a plurality of uplink shared channels with the first TTI length for transmission, a channel to carry the UCI is selected as in the scheme as in the preset rule 5.

In an implementation, when an uplink control channel with the first TTI length for transmission overlaps with an uplink shared channel with the second TTI length for transmission, at least one of the following schemes is applied:

in a seventh scheme, the uplink shared channel with the second TTI length for transmission is selected for transmission, and the uplink control channel with the first TTI length for transmission is dropped, or information in a symbol in the uplink control channel with the first TTI length for transmission, which overlaps with the symbol in the uplink shared channel with the second TTI length for transmission is punctured;

in an eighth scheme, the uplink control channel with the first TTI length for transmission is selected for transmission, and the uplink shared channel with the second TTI length for transmission is dropped; or in a ninth scheme, an uplink channel carrying UCI is selected, and when there are a plurality of uplink channels carrying UCI, an uplink channel carrying UCI with a high priority is selected, and a remaining uplink channel is dropped, or information in a symbol, in the remaining uplink channel, which overlaps with the symbol in the selected uplink channel is punctured; and when the plurality of channels carry the UCI with a same priority, an uplink channel is selected from the plurality of channels carrying the UCI with the same priority as in the seventh scheme or the eighth scheme.

In an implementation, when the seventh scheme is applied, UCI carried on the uplink control channel with the first TTI length for transmission is transferred to and transmitted on the uplink shared channel with the second TTI length for transmission under a preset rule 1 or a preset rule 6; when the eighth scheme is applied, when the uplink shared channel with the second TTI length for transmission carries UCI, the UCI is transferred to and transmitted on the uplink control channel with the first TTI length for transmission under the preset rule 1 or a preset rule 7; and when the ninth scheme is applied, UCI in an uplink channel which is not selected is transferred to and transmitted on the selected uplink channel under the preset rule 1.

In an implementation, when the seventh scheme is applied, the preset rule 6 includes one or a combination of the following schemes:

all the UCI carried on the uplink control channel with the first TTI length for transmission is transferred to and transmitted on the uplink shared channel with the second TTI length for transmission;

when the UCI carried on the uplink control channel with the first TTI length for transmission is ACK/NACK and/or an SR, the UCI is transferred to and transmitted on the uplink shared channel with the second TTI length for transmission; when the UCI carried on the uplink control channel with the first TTI length for transmission comprises P-CSI, the P-CSI carried on the uplink control channel with the first TTI length for transmission is dropped, or if P-CSI is carried on the uplink shared channel with the second TTI length for transmission, then the P-CSI carried on the uplink control channel with the first TTI length for transmission is dropped; and if no P-CSI is carried on the uplink shared channel with the second TTI length for transmission, then the P-CSI carried on the uplink control channel with the first TTI length for transmission is transferred to and transmitted on the uplink shared channel with the second TTI length for transmission; or when there are a plurality of uplink shared channels with the second TTI length for transmission, in a transmission period of time of the uplink control channel with the first TTI length for transmission, the first or last one of the uplink shared channels with the second TTI length for transmission is selected to carry the UCI; or when a plurality of carriers are aggregated for a UE, if there is an uplink shared channel with the second TTI length for transmission, on a PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs comprising the uplink shared channels with the second TTI length for transmission is selected to carry the UCI, and if there are a plurality of uplink shared channels with the second TTI length for transmission, on the selected carrier, then the first or last one of the uplink shared channels with the second TTI length for transmission is selected to carry the UCI; wherein when the selected uplink shared channel with the second TTI length for transmission is an uplink shared channel corresponding to an RAR grant, the UCI is not transmitted.

When the eighth scheme is applied, the preset rule 7 includes one or a combination of the following schemes:

all the UCI carried on the uplink shared channel with the second TTI length for transmission is transferred to and transmitted on the uplink control channel with the first TTI length for transmission; or when the UCI carried on the uplink shared channel with the second TTI length for transmission is ACK/NACK and/or an SR, the UCI is transferred to and transmitted on the uplink control channel with the first TTI length for transmission; when the UCI carried on the uplink shared channel with the second TTI length for transmission comprises P-CSI, the P-CSI carried on the uplink shared channel with the second TTI length for transmission is dropped, or if P-CSI is carried on the uplink control channel with the first TTI length for transmission, then the P-CSI carried on the uplink shared channel with the second TTI length for transmission is dropped, and if no P-CSI is carried on the uplink control channel with the first TTI length for transmission, then the P-CSI carried on the uplink shared channel with the second TTI length for transmission is transferred to and transmitted on the uplink control channel with the first TTI length for transmission.

When the ninth scheme is applied, when the selected uplink channel is the uplink shared channel with the second TTI length for transmission, and when there are a plurality of uplink shared channels with the second TTI length for transmission, in a transmission period of time of the uplink control channel with the first TTI length for transmission, a channel to carry the UCI is selected as in the scheme in the preset rule 7.

In an implementation, priorities of UCI are as follows: a priority of an SR is higher than or equal to that of ACK/NACK, and a priority of ACK/NACK is higher than that of P-CSI.

In an implementation, the preset rule 1 includes one or a combination of the following schemes:

UCI in the uplink channel which is not selected is transferred to and transmitted on the selected uplink channel;

when the UCI in the uplink channel which is not selected is ACK/NACK and/or an SR, the UCI is transferred to and transmitted on the selected uplink channel; when the UCI in the uplink channel which is not selected comprises P-CSI, the P-CSI in the uplink channel which is not selected is dropped, or if P-CSI is carried on the selected uplink channel, then the P-CSI in the uplink channel which is not selected is dropped, or if no P-CSI is carried on the selected uplink channel, then the P-CSI in the uplink channel which is not selected is transferred to and transmitted on the selected uplink channel;

when the selected uplink channel is an uplink channel with the first TTI length for transmission, if there are both an uplink shared channel with the first TTI length for transmission, and an uplink control channel with the first TTI length for transmission, then the uplink shared channel with the first TTI length for transmission or the uplink control channel with the first TTI length for transmission is selected to carry the UCI, or a part of the UCI is carried on the uplink shared channel with the first TTI length for transmission, and the other part of the UCI is carried on the uplink control channel with the first TTI length for transmission; when there are a plurality of uplink shared channels with the first TTI length, and when there is an uplink shared channel with the first TTI length for transmission, on a PCC, the uplink shared channel with the first TTI length for transmission, on the PCC is selected to carry the UCI; when there is no uplink shared channel with the first TTI length for transmission, on the PCC, an uplink shared channel with the first TTI length for transmission, on an SCC with the lowest carrier index among SCCs comprising the uplink shared channels with the first TTI length for transmission is selected to carry the UCI; wherein when the selected uplink shared channel is an uplink shared channel corresponding to an RAR grant, the UCI is not transmitted;

when the selected uplink channel is the uplink control channel with the second TTI length for transmission, if there are a plurality of uplink control channels with the second TTI length for transmission, in the first TTI length, then the first or last uplink control channel with the second TTI length for transmission is selected to carry the UCI, or an uplink control channel with the second TTI length for transmission, which carries P-CSI is selected to carry P-CSI in the uplink channel which is not selected; if there is no uplink control channel with the second TTI length for transmission, which carries P-CSI, then the first or last uplink control channel with the second TTI length for transmission is selected to carry the P-CSI in the uplink channel which is not selected; an uplink control channel with the second TTI length for transmission, which carries ACK/NACK and/or an SR is selected to carry ACK/NACK and/or an SR in the uplink channel which is not selected; if there is no uplink control channel with the second TTI length for transmission, which carries ACK/NACK and/or an SR, then the first or last uplink control channel with the second TTI length for transmission is selected to carry the ACK/NACK and/or the SR in the uplink channel which is not selected; wherein when there are a plurality of channels satisfying the condition above, then the first or last one of the plurality of channels satisfying the condition above is selected to carry the corresponding UCI in the uplink channel which is not selected; or when the selected uplink channel is the uplink shared channel with the second TTI length for transmission, if there are a plurality of uplink shared channels with the second TTI length for transmission, in the first TTI length, then the first or last one of the uplink shared channels with the second TTI length for transmission is selected to carry the UCI; or when a plurality of carriers are aggregated for a UE, and if there is an uplink shared channel with the second TTI length for transmission, on the PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs comprising the uplink shared channels with the second TTI length for transmission is selected to carry the UCI; and when there are a plurality of uplink shared channels with the second TTI length for transmission, on the selected carrier, the first or last one of the uplink shared channels with the second TTI length for transmission is selected to carry the UCI; wherein when the selected uplink shared channel with the second TTI length for transmission is an uplink shared channel corresponding to an RAR grant, the UCI is not transmitted.

In an implementation, the apparatus is further configured:

to determine whether a sum of transmission power of the uplink channel with the first TTI length for transmission, and transmission power of the uplink channel with the second TTI length for transmission exceeds a highest transmission power allowed for a UE, and when the sum of transmission powers exceeds the highest transmission power, to determine whether the transmission period of time of the uplink channel with the first TTI length for transmission overlaps with the transmission period of time of the uplink channel with the second TTI length for transmission; and when the transmission period of time of the uplink channel with the first TTI length for transmission overlaps with the transmission period of time of the uplink channel with the second TTI length for transmission, to select at least one uplink channel for transmission, under the preset method, and to drop the remaining uplink channel, or to transmit the remaining uplink channel using puncturing; and/or to determine whether there is a support of simultaneous transmission of the uplink channel with the first TTI length for transmission, and the uplink channel with the second TTI length for transmission, and when there is no support, to determine whether the transmission period of time of the uplink channel with the first TTI length for transmission overlaps with the transmission period of time of the uplink channel with the second TTI length for transmission; and when the transmission period of time of the uplink channel with the first TTI length for transmission overlaps with the transmission period of time of the uplink channel with the second TTI length for transmission, to select at least one uplink channel for transmission, under the preset method, and to drop the remaining uplink channel, or to transmit the remaining uplink channel using puncturing; and/or to determine whether there is a support of simultaneous transmission of an uplink control channel with the first TTI length for transmission, and an uplink shared channel with the second TTI length for transmission, and/or simultaneous transmission of an uplink shared channel with the first TTI length for transmission, and an uplink control channel with the second TTI length for transmission, and when there is no support, to determine whether the transmission period of time of the uplink channel with the first TTI length for transmission overlaps with the transmission period of time of the uplink channel with the second TTI length for transmission; and when the transmission period of time of the uplink channel with the first TTI length for transmission overlaps with the transmission period of time of the uplink channel with the second TTI length for transmission, to select at least one uplink channel for transmission, under the preset method, and to drop the remaining uplink channel, or to transmit the remaining uplink channel using puncturing.

In a fourth aspect, an embodiment of the invention provides an apparatus for transmitting data, the apparatus including: a second determining module configured to determine whether a transmission period of time of an uplink channel with a first TTI length for transmission overlaps with a transmission period of time of an uplink channel with a second TTI length for transmission; and a transmission determining module configured, when it is determined that the transmission period of time of the uplink channel with the first TTI length for transmission overlaps with the transmission period of time of the uplink channel with the second TTI length for transmission, to determine that a UE selects an uplink channel of the uplink channels for transmission, under a preset method, and drops a remaining uplink channel, or transmits the remaining uplink channel using puncturing.

In an implementation, the first TTI length is longer than the second TTI length.

In an implementation, the uplink channels include an uplink control channel and/or an uplink shared channel.

In an implementation, the preset method is one or a combination of the following methods:

an uplink control channel is selected, and an uplink shared channel is dropped or transmitted using puncturing;

the uplink channel with the second TTI length for transmission is selected, and the uplink channel with the first TTI length for transmission is dropped or transmitted using puncturing; or an uplink channel carrying UCI is selected, and when there are a plurality of uplink channels carrying UCI, an uplink channel carrying UCI with a high priority is selected, and when there are a plurality of uplink channels carrying UCI with the high priority, an uplink channel is selected under any of the methods above, and a remaining uplink channel is dropped or transmitted using puncturing.

In an implementation, the apparatus is further configured: to determine that the UE transfers UCI in an uplink channel which is not selected to the selected uplink channel under a preset rule 1, and transmits the UCI on the selected uplink channel.

In an implementation, when the uplink channel with the first TTI length for transmission overlaps with an uplink control channel with the second TTI length for transmission, at least one of the following schemes is applied, wherein the uplink channel with the first TTI length for transmission comprises at least one of an uplink shared channel or an uplink control channel:

in a first scheme, it is determined that the uplink control channel with the second TTI length for transmission is selected by the UE for transmission, the uplink channel with the first TTI length for transmission is dropped, or information in a symbol in the uplink channel with the first TTI length for transmission, which overlaps with the symbol in the uplink control channel with the second TTI length for transmission is punctured;

in a second scheme, it is determined that that the uplink channel with the first TTI length for transmission is selected by the UE, and the uplink control channel with the second TTI length for transmission is dropped; or in a third scheme, it is determined that an uplink channel carrying UCI is selected, and when there are a plurality of uplink channels carrying UCI, an uplink channel carrying UCI with a high priority is selected by the UE, and a remaining uplink channel is dropped, or information in a symbol, in the remaining uplink channel, which overlaps with the symbol in the selected uplink channel is punctured; and when there are a plurality of uplink channels carrying UCI with the same high priority, an uplink channel is selected from the plurality of uplink channels carrying the UCI with the same high priority as in the first scheme or the second scheme.

In an implementation, when the first scheme is applied, it is determined that UCI carried on the uplink channel with the first TTI length for transmission is transferred by the UE to and transmitted on the uplink control channel with the second TTI length for transmission under a preset rule 1 or a preset rule 2; when the second scheme is applied, it is determined that UCI carried on the uplink control channel with the second TTI length for transmission is transferred by the UE to and transmitted on the uplink channel with the first TTI length for transmission, under the preset rule 1 or a preset rule 3; and when the third scheme is applied, it is determined that UCI in an uplink channel which is not selected is transferred by the UE to and transmitted on the selected uplink channel under the preset rule 1.

In an implementation, when the first scheme is applied, the preset rule 2 includes one or a combination of the following schemes:

all the UCI carried on the uplink channel with the first TTI length for transmission is transferred to and transmitted on the uplink control channel with the second TTI length for transmission;

when the UCI carried on the uplink channel with the first TTI length for transmission is ACK/NACK and/or an SR, the UCI is transferred to and transmitted on the uplink control channel with the second TTI length for transmission; when the UCI carried on the uplink channel with the first TTI length for transmission comprises P-CSI, the P-CSI carried on the uplink channel with the first TTI length for transmission is dropped, or if the uplink control channel with the second TTI length for transmission comprises P-CSI, then the P-CSI carried on the uplink channel with the first TTI length for transmission is dropped, and if the uplink control channel with the second TTI length for transmission does not comprise any P-CSI, then the P-CSI carried on the uplink channel with the first TTI length for transmission is transferred to and transmitted on the uplink control channel with the second TTI length for transmission; or when there are a plurality of uplink control channels with the second TTI length for transmission, in a transmission period of time of the uplink channel with the first TTI length for transmission, then:

the first or last one of the uplink control channels with the second TTI length for transmission is selected to carry the UCI; or an uplink control channel with the second TTI length for transmission, which carries P-CSI is selected to carry P-CSI in the uplink channel with the first TTI length for transmission, and if there is no uplink control channel with the second TTI length for transmission, which carries P-CSI, then the first or last one of the uplink control channels with the second TTI length for transmission is selected to carry the P-CSI in the uplink channel with the first TTI length for transmission; an uplink control channel with the second TTI length for transmission, which carries ACK/NACK and/or an SR is selected to carry ACK/NACK and/or an SR in the uplink channel with the first TTI length for transmission; if there is no uplink control channel with the second TTI length for transmission, which carries ACK/NACK and/or an SR, then the first or last one of the uplink control channels with the second TTI length for transmission is selected to carry the ACK/NACK and/or the SR in the uplink channel with the first TTI length for transmission; wherein when there are a plurality of channels satisfying the condition, the first or last one of the plurality of channels satisfying the condition is selected to carry the corresponding UCI in the uplink channel with the first TTI length for transmission.

When the second scheme is applied, the preset rule 3 includes one or a combination of the following schemes:

all the UCI carried on the uplink control channel with the second TTI length for transmission is transferred to and transmitted on the uplink channel with the first TTI length for transmission;

when the UCI carried on the uplink control channel with the second TTI length for transmission is ACK/NACK and/or an SR, the UCI is transferred to and transmitted on the uplink channel with the first TTI length for transmission; and when the UCI carried on the uplink control channel with the second TTI length for transmission comprises P-CSI, the P-CSI carried on the uplink control channel with the second TTI length for transmission is dropped, or if P-CSI is carried on the uplink channel with the first TTI length for transmission, then the P-CSI carried on the uplink control channel with the second TTI length for transmission is dropped, and if no P-CSI is carried on the uplink channel with the first TTI length for transmission, then the P-CSI carried on the uplink control channel with the second TTI length for transmission is transferred to and transmitted on the uplink channel with the first TTI length for transmission; or when there are both an uplink shared channel with the first TTI length for transmission, and an uplink control channel with the first TTI length for transmission, one of the uplink shared channel with the first TTI length for transmission, and the uplink control channel with the first TTI length for transmission, is selected to carry the UCI, or a part of the UCI is carried on the uplink shared channel with the first TTI length for transmission, and the other part of the UCI is carried on the uplink control channel with the first TTI length for transmission; and/or when there are a plurality of uplink shared channels with the first TTI length for transmission, and if there is an uplink shared channel with the first TTI length for transmission, on a PCC, then the uplink shared channel with the first TTI length for transmission, on the PCC is selected to carry the UCI, and if there is no uplink shared channel with the first TTI length for transmission, on the PCC, then an uplink shared channel with the first TTI length for transmission, on an SCC with the lowest carrier index among SCCs comprising the uplink shared channels with the first TTI length for transmission is selected to carry the UCI, wherein if the selected uplink shared channel is an uplink shared channel corresponding to an RAR grant, then the UCI is not transmitted.

When the third scheme is applied, when the selected uplink channel is the uplink control channel with the second TTI length for transmission, if there are a plurality of uplink control channels with the second TTI length for transmission, in a transmission period of time of the uplink channel with the first TTI length for transmission, then an uplink channel to carry the UCI is selected in the same scheme as in the preset rule 2; and when the selected uplink channel is the uplink channel with the first TTI length for transmission, if there are both an uplink shared channel with the first TTI length for transmission and an uplink control channel with the first TTI length for transmission, or there are a plurality of uplink shared channels with the first TTI length for transmission, then a channel to carry the UCI is selected in the same scheme as in the preset rule 3.

In an implementation, when an uplink shared channel with the first TTI length for transmission overlaps with an uplink shared channel with the second TTI length for transmission, at least one of the following schemes is applied:

in a fourth scheme, it is determined that the uplink shared channel with the second TTI length for transmission is selected by the UE for transmission, and the uplink shared channel with the first TTI length for transmission is dropped, or information in a symbol in the uplink shared channel with the first TTI length for transmission, which overlaps with the symbol in the uplink shared channel with the second TTI length for transmission is punctured;

in a fifth scheme, it is determined that the uplink shared channel with the first TTI length for transmission is selected by the UE for transmission, and the uplink shared channel with the second TTI length for transmission is dropped; or in a sixth scheme, it is determined that an uplink channel carrying UCI is selected by the UE, and when there are a plurality of uplink channels carrying UCI, an uplink channel carrying UCI with a high priority is selected, and a remaining uplink channel is dropped, or information in a symbol, in the remaining uplink channel, which overlaps with the symbol in the selected uplink channel is punctured; and when there are a plurality of channels carrying the UCI with the same high priority, an uplink channel is selected from the plurality of channels carrying the UCI with the same high priority as in the third scheme or the fourth scheme.

In an implementation, when the fourth scheme is applied, it is determined that UCI carried on the uplink shared channel with the first TTI length for transmission is transferred by the UE to and transmitted on the uplink shared channel with the second TTI length for transmission under a preset rule 1 or a preset rule 4; when the fifth scheme is applied, it is determined that UCI carried on the uplink shared channel with the second TTI length for transmission is transferred by the UE to and transmitted on the uplink shared channel with the first TTI length for transmission under the preset rule 1 or a preset rule 5; and when the sixth scheme is applied, it is determined that UCI in an uplink channel which is not selected is transferred by the UE to and transmitted on the selected uplink channel under the preset rule 1.

In an implementation, when the fourth scheme is applied, the preset rule 4 includes one or a combination of the following schemes:

all the UCI carried on the uplink shared channel with the first TTI length for transmission is transferred to and transmitted on the uplink shared channel with the second TTI length for transmission;

when the UCI carried on the uplink shared channel with the first TTI length for transmission is ACK/NACK and/or an SR, the UCI is transferred to and transmitted on the uplink shared channel with the second TTI length for transmission, and when the UCI carried on the uplink shared channel with the first TTI length for transmission comprises P-CSI, the P-CSI carried on the uplink shared channel with the first TTI length for transmission is dropped, or if P-CSI is carried on the uplink shared channel with the second TTI length for transmission, then the P-CSI carried on the uplink shared channel with the first TTI length for transmission is dropped; and if no P-CSI is carried on the uplink shared channel with the second TTI length for transmission, then the P-CSI carried on the uplink shared channel with the first TTI length for transmission is transferred to and transmitted on the uplink shared channel with the second TTI length for transmission; or when there are a plurality of uplink shared channels with the second TTI length for transmission, in a transmission period of time of the uplink shared channel with the first TTI length for transmission, the first or last one of the uplink shared channels with the second TTI length for transmission is selected to carry the UCI; or when a plurality of carriers are aggregated for the UE, if there is an uplink shared channel with the second TTI length for transmission, on a PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs comprising the uplink shared channels with the second TTI length for transmission is selected to carry the UCI, and if there are a plurality of uplink shared channels with the second TTI length for transmission, on the selected carrier, then the first or last one of the uplink shared channels with the second TTI length for transmission is selected to carry the UCI; and if the selected uplink shared channel with the second TTI length for transmission is an uplink shared channel corresponding to an RAR grant, then the UCI is not transmitted.

When the fifth scheme is applied, the preset rule 5 includes one or a combination of the following schemes:

all the UCI carried on the uplink shared channel with the second TTI length for transmission is transferred to and transmitted on the uplink shared channel with the first TTI length for transmission;

when the UCI carried on the uplink shared channel with the second TTI length for transmission is ACK/NACK and/or an SR, the UCI is transferred to and transmitted on the uplink shared channel with the first TTI length for transmission; and when the UCI carried on the uplink shared channel with the second TTI length for transmission comprises P-CSI, the P-CSI carried on the uplink shared channel with the second TTI length for transmission is dropped, or if P-CSI is carried on the uplink shared channel with the first TTI length for transmission, then the P-CSI carried on the uplink shared channel with the second TTI length for transmission is dropped, and if no P-CSI is carried on the uplink shared channel with the first TTI length for transmission, then the P-CSI carried on the uplink shared channel with the second TTI length for transmission is transferred to and transmitted on the uplink shared channel with the first TTI length for transmission; or when there are a plurality of uplink shared channels with the first TTI length for transmission, if there is an uplink shared channel with the first TTI length for transmission, on a PCC, then the uplink shared channel with the first TTI length for transmission, on the PCC is selected to carry UCI in the sPUSCH; if there is no uplink shared channel with the first TTI length for transmission, on the PCC, then an uplink shared channel with the first TTI length for transmission, on an SCC with the lowest carrier index among SCCs comprising the uplink shared channels with the first TTI length for transmission is selected to carry the UCI in the sPUSCH; and when the selected uplink shared channel with the first TTI length for transmission is an uplink shared channel corresponding to an RAR grant, the UCI is not transmitted.

When the sixth scheme is applied, when the selected uplink channel is the uplink shared channel with the second TTI length for transmission, and when there are a plurality of uplink shared channels with the second TTI length for transmission, in a transmission period of time of the uplink shared channel with the first TTI length for transmission, a channel to carry the UCI is selected as in the scheme as in the preset rule 4; and when the selected uplink channel is the uplink shared channel with the first TTI length for transmission, and when there are a plurality of uplink shared channels with the first TTI length for transmission, then a channel to carry the UCI is selected as in the scheme as in the preset rule 5.

In an implementation, when an uplink control channel with the first TTI length for transmission overlaps with an uplink shared channel with the second TTI length for transmission, at least one of the following schemes is applied:

in a seventh scheme, it is determined that the uplink shared channel with the second TTI length for transmission is selected by the UE for transmission, and the uplink control channel with the first TTI length for transmission is dropped, or information in a symbol in the uplink control channel with the first TTI length for transmission, which overlaps with the symbol in the uplink shared channel with the second TTI length for transmission is punctured;

in an eighth scheme, it is determined that the uplink control channel with the first TTI length for transmission is selected by the UE for transmission, and the uplink shared channel with the second TTI length for transmission is dropped; or in a ninth scheme, it is determined that an uplink channel carrying UCI is selected by the UE, and when there are a plurality of uplink channels carrying UCI, an uplink channel carrying UCI with a high priority is selected, and a remaining uplink channel is dropped, or information in a symbol, in the remaining uplink channel, which overlaps with the symbol in the selected uplink channel is punctured; and when there are a plurality of channels carrying the UCI with the same high priority, an uplink channel is selected from the plurality of channels carrying the UCI with the same high priority as in the seventh scheme or the eighth scheme.

In an implementation, when the seventh scheme is applied, it is determined that UCI carried on the uplink control channel with the first TTI length for transmission is transferred by the UE to and transmitted on the uplink shared channel with the second TTI length for transmission under a preset rule 1 or a preset rule 6; when the eighth scheme is applied, if the uplink shared channel with the second TTI length for transmission carries UCI, then it is determined that the UCI is transferred by the UE to and transmitted on the uplink control channel with the first TTI length for transmission under the preset rule 1 or a preset rule 7; and when the ninth scheme is applied, it is determined that UCI in an uplink channel which is not selected is transferred by the UE to and transmitted on the selected uplink channel under the preset rule 1.

In an implementation, when the seventh scheme is applied, the preset rule 6 includes one or a combination of the following schemes:

all the UCI carried on the uplink control channel with the first TTI length for transmission is transferred to and transmitted on the uplink shared channel with the second TTI length for transmission;

when the UCI carried on the uplink control channel with the first TTI length for transmission is ACK/NACK and/or an SR, the UCI is transferred to and transmitted on the uplink shared channel with the second TTI length for transmission; when the UCI carried on the uplink control channel with the first TTI length for transmission comprises P-CSI, the P-CSI carried on the uplink control channel with the first TTI length for transmission is dropped, or if P-CSI is carried on the uplink shared channel with the second TTI length for transmission, then the P-CSI carried on the uplink control channel with the first TTI length for transmission is dropped; and if no P-CSI is carried on the uplink shared channel with the second TTI length for transmission, then the P-CSI carried on the uplink control channel with the first TTI length for transmission is transferred to and transmitted on the uplink shared channel with the second TTI length for transmission; or when there are a plurality of uplink shared channels with the second TTI length for transmission, in a transmission period of time of the uplink control channel with the first TTI length for transmission, the first or last one of the uplink shared channels with the second TTI length for transmission is selected to carry the UCI; or when a plurality of carriers are aggregated for the UE, if there is an uplink shared channel with the second TTI length for transmission, on a PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs comprising the uplink shared channels with the second TTI length for transmission is selected to carry the UCI, and if there are a plurality of uplink shared channels with the second TTI length for transmission, on the selected carrier, then the first or last one of the uplink shared channels with the second TTI length for transmission is selected to carry the UCI; and if the selected uplink shared channel with the second TTI length for transmission is an uplink shared channel corresponding to an RAR grant, then the UCI is not transmitted.

When the eighth scheme is applied, the preset rule 7 includes one or a combination of the following schemes:

all the UCI carried on the uplink shared channel with the second TTI length for transmission is transferred to and transmitted on the uplink control channel with the first TTI length for transmission; or when the UCI carried on the uplink shared channel with the second TTI length for transmission is ACK/NACK and/or an SR, the UCI is transferred to and transmitted on the uplink control channel with the first TTI length for transmission; and when the UCI carried on the uplink shared channel with the second TTI length for transmission comprises P-CSI, the P-CSI carried on the uplink shared channel with the second TTI length for transmission is dropped, or if P-CSI is carried on the uplink control channel with the first TTI length for transmission, then the P-CSI carried on the uplink shared channel with the second TTI length for transmission is dropped, and if no P-CSI is carried on the uplink control channel with the first TTI length for transmission, then the P-CSI carried on the uplink shared channel with the second TTI length for transmission is transferred to and transmitted on the uplink control channel with the first TTI length for transmission.

When the ninth scheme is applied, when the selected uplink channel is the uplink shared channel with the second TTI length for transmission, if there are a plurality of uplink shared channels with the second TTI length for transmission, in a transmission period of time of the uplink control channel with the first TTI length for transmission, then a channel to carry the UCI is selected as in the scheme in the preset rule 7.

In an implementation, the priorities of UCI are as follows: a priority of an SR is higher than or equal to that of ACK/NACK, and a priority of ACK/NACK is higher than that of P-CSI.

In an implementation, the preset rule 1 includes one or a combination of the following schemes:

UCI in the uplink channel which is not selected is transferred to and transmitted on the selected uplink channel;

when the UCI in the uplink channel which is not selected is ACK/NACK and/or an SR, the UCI is transferred to and transmitted on the selected uplink channel; and when the UCI in the uplink channel which is not selected comprises P-CSI, the P-CSI in the uplink channel which is not selected is dropped, or if P-CSI is carried on the selected uplink channel, then the P-CSI in the uplink channel which is not selected is dropped, and if no P-CSI is carried on the selected uplink channel, then the P-CSI in the uplink channel which is not selected is transferred to and transmitted on the selected uplink channel;

when the selected uplink channel is an uplink channel with the first TTI length for transmission, if there are both an uplink shared channel with the first TTI length for transmission, and an uplink control channel with the first TTI length for transmission, then one of the uplink shared channel with the first TTI length for transmission and the uplink control channel with the first TTI length for transmission is selected to carry the UCI, or a part of the UCI is carried on the uplink shared channel with the first TTI length for transmission, and the other part of the UCI is carried on the uplink control channel with the first TTI length for transmission; if there are a plurality of uplink shared channels with the first TTI length, then when there is an uplink shared channel with the first TTI length for transmission, on a PCC, the uplink shared channel with the first TTI length for transmission, on the PCC is selected to carry the UCI, and when there is no uplink shared channel with the first TTI length for transmission, on the PCC, an uplink shared channel with the first TTI length for transmission, on an SCC with the lowest carrier index among SCCs comprising the uplink shared channels with the first TTI length for transmission is selected to carry the UCI, wherein if the selected uplink shared channel is an uplink shared channel corresponding to an RAR grant, then the UCI is not transmitted;

when the selected uplink channel is the uplink control channel with the second TTI length for transmission, if there are a plurality of uplink control channels with the second TTI length for transmission, in the first TTI length, then the first or last uplink control channel with the second TTI length for transmission is selected to carry the UCI, or an uplink control channel with the second TTI length for transmission, which carries P-CSI is selected to carry P-CSI in the uplink channel which is not selected; if there is no uplink control channel with the second TTI length for transmission, which carries P-CSI, then the first or last uplink control channel with the second TTI length for transmission is selected to carry the P-CSI in the uplink channel which is not selected, and an uplink control channel with the second TTI length for transmission, which carries ACK/NACK and/or an SR is selected to carry ACK/NACK and/or an SR in the uplink channel which is not selected; if there is no uplink control channel with the second TTI length for transmission, which carries ACK/NACK and/or an SR, then the first or last uplink control channel with the second TTI length for transmission is selected to carry the ACK/NACK and/or the SR in the uplink channel which is not selected; and if there are a plurality of channels satisfying the condition above, then the first or last one of the plurality of channels satisfying the condition above is selected to carry the corresponding UCI in the uplink channel which is not selected; or when the selected uplink channel is the uplink shared channel with the second TTI length for transmission, if there are a plurality of uplink shared channels with the second TTI length for transmission, in the first TTI length, then the first or last one of the uplink shared channels with the second TTI length for transmission is selected to carry the UCI; or when a plurality of carriers are aggregated for the UE, if there is an uplink shared channel with the second TTI length for transmission, on the PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs comprising the uplink shared channels with the second TTI length for transmission is selected to carry the UCI, and if there are a plurality of uplink shared channels with the second TTI length for transmission, on the selected carrier, then the first or last one of the uplink shared channels with the second TTI length for transmission is selected to carry the UCI; and if the selected uplink shared channel with the second TTI length for transmission is an uplink shared channel corresponding to an RAR grant, then the UCI is not transmitted.

In an implementation, the apparatus further determines that the UE operates in the following operations of:

determining whether a sum of transmission power of the uplink channel with the first TTI length for transmission, and transmission power of the uplink channel with the second TTI length for transmission exceeds a highest transmission power allowed for the UE, and when the sum of transmission powers exceeds the highest transmission power, determining whether the transmission period of time of the uplink channel with the first TTI length for transmission overlaps with the transmission period of time of the uplink channel with the second TTI length for transmission; and when the transmission period of time of the uplink channel with the first TTI length for transmission overlaps with the transmission period of time of the uplink channel with the second TTI length for transmission, selecting at least one uplink channel for transmission, under the preset method, and dropping the remaining uplink channel, or transmitting the remaining uplink channel using puncturing; and/or determining whether there is a support of simultaneous transmission of the uplink channel with the first TTI length for transmission, and the uplink channel with the second TTI length for transmission, and when there is no support, determining whether the transmission period of time of the uplink channel with the first TTI length for transmission overlaps with the transmission period of time of the uplink channel with the second TTI length for transmission; and when the transmission period of time of the uplink channel with the first TTI length for transmission overlaps with the transmission period of time of the uplink channel with the second TTI length for transmission, selecting at least one uplink channel for transmission, under the preset method, and dropping the remaining uplink channel, or transmitting the remaining uplink channel using puncturing; and/or determining whether there is a support of simultaneous transmission of an uplink control channel with the first TTI length for transmission, and an uplink shared channel with the second TTI length for transmission, and/or simultaneous transmission of an uplink shared channel with the first TTI length for transmission, and an uplink control channel with the second TTI length for transmission, and when there is no support, determining whether the transmission period of time of the uplink channel with the first TTI length for transmission overlaps with the transmission period of time of the uplink channel with the second TTI length for transmission; and when the transmission period of time of the uplink channel with the first TTI length for transmission overlaps with the transmission period of time of the uplink channel with the second TTI length for transmission, selecting at least one uplink channel for transmission, under the preset method, and dropping the remaining uplink channel, or transmitting the remaining uplink channel using puncturing.

In a fifth aspect, there is provided an apparatus including: a processor, a transceiver, and a memory, wherein the processor is configured to read and execute program in the memory to perform the method according to any one of the solutions in the first aspect above.

In a sixth aspect, there is provided an apparatus including: a processor, a transceiver, and a memory, wherein the processor is configured to read and execute program in the memory to perform the method according to any one of the solutions in the second aspect above.

In a seventh aspect, there is provided a computer storage medium storing computer executable instructions configured to cause the computer to perform the method according to any one of the solutions in the first aspect above.

In an eighth aspect, there is provided a computer storage medium storing computer executable instructions configured to cause the computer to perform the method according to any one of the solutions in the second aspect above.

In the technical solutions according to the embodiments of the invention, there is defined a solution to transmission on overlapping channels with different TTI lengths, and in an implementation, one of the channels is selected under a preset method, and transmission on the other channel(s) is/are dropped, or transmission on the other channel(s) is performed using puncturing. In order to transmit data, one of the channels is selected under the preset method, and transmission on the other channel(s) is dropped, or transmission on the other channel(s) is performed using puncturing, so the UE can transmit data correctly even when the channels with the different TTI lengths overlap with each other.

BRIEF DESCRIPTION OF THE DRAWINGS

The drawings described here are intended to provide further understanding of the invention, and constitute a part of the invention, and the exemplary embodiments of the invention and the description thereof are intended to set forth the invention, but not to limit the invention unduly. In the drawings.

DETAILED DESCRIPTION OF THE EMBODIMENTS

As there is a growing demand for mobile communication services, the International Telecommunication Union (ITU), and other organizations have defined higher user-plane delay performance to be required in future mobile communication systems. A user-plane delay is generally shortened by reducing a TTI length to thereby support short-TTI transmission. However there has been absent so far a definite solution to transmission in a short TTI. In the invention, there is proposed a solution to transmission on overlapping channels with different TTI lengths, where one of the channels are selected under a preset method, and the other channel(s) is/are dropped or transmitted using puncturing. Particular embodiments of the invention are described below with reference to the drawings.

In the following description, implementations at the eNB side and the UE side are described respectively, and then an example of an implementation in which both of them cooperate is further described for better understanding of the implementations of the solutions according to the embodiments of the invention. Such a description will not suggest that both of them shall cooperate in an implementation, or they shall operate separately in an implementation, and in fact, respective problems at the eNB side and the UE side can also be addressed when they operate separately in an implementation, although a better technical effect can be achieved when both of them cooperate in an implementation.

It shall be further noted since generally the eNB side operationally corresponds to the UE side, one of the sides is described in details, and the other side is described in brief for the sake of conciseness, but this will not suggest there be no corresponding implementation at the other side, and those skilled in the art can readily know a corresponding implementation at the other side without any inventive effort.

Figure 1:
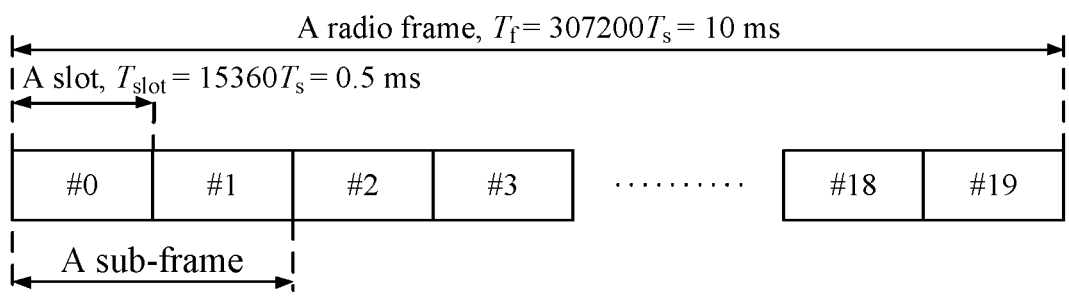
FIG. 1 is a schematic diagram of the frame structure 1 for the LTE FDD system in the prior art.
Figure 2:
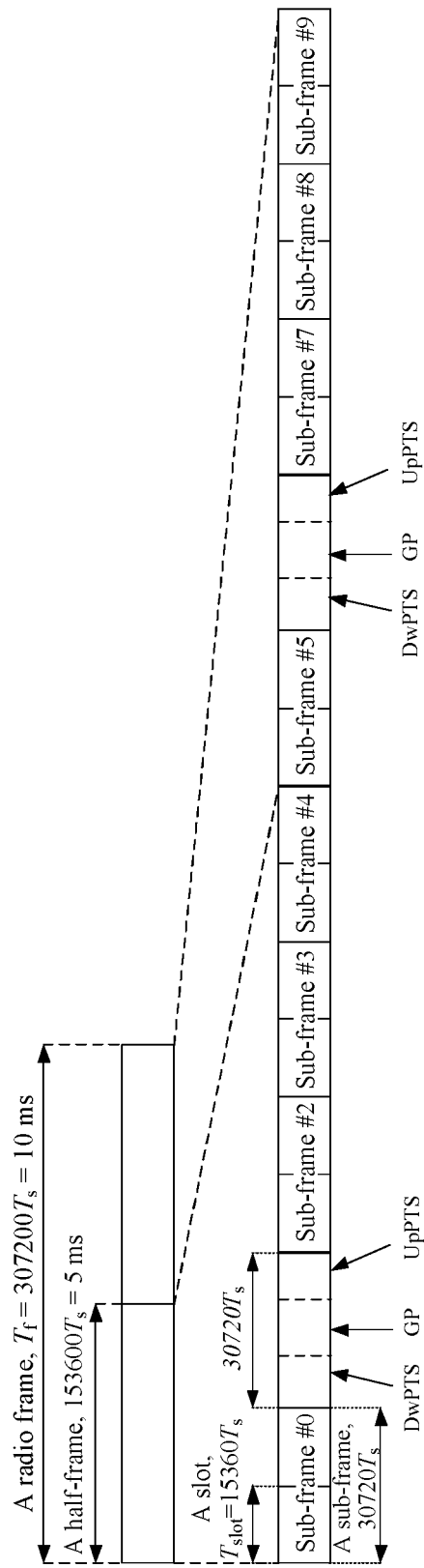
FIG. 2 is a schematic diagram of the frame structure 2 for the LTE TDD system in the prior art.
Figure 3:
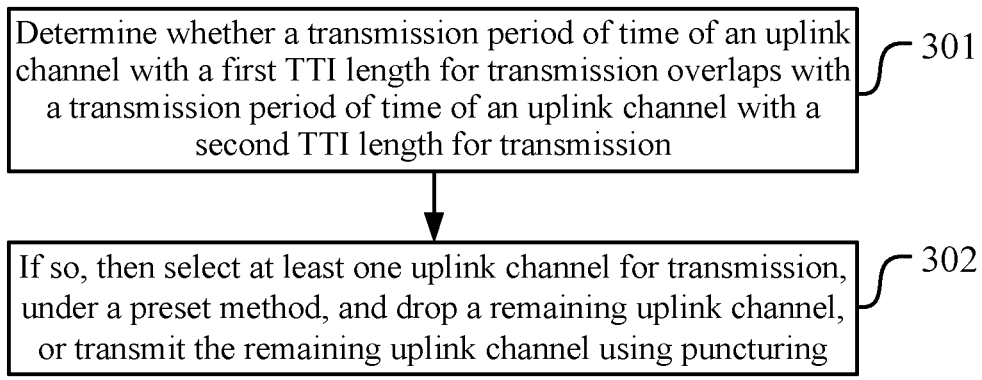
FIG. 3 is a schematic flow chart of a method for transmitting data at the UE side according to an embodiment of the invention.

FIG. 3 is a schematic flow chart of a method for transmitting data at the UE side according to an embodiment of the invention, and as illustrated, the method includes the following operations.

The operation 301 is to determine whether a transmission period of time of an uplink channel with a first TTI length for transmission overlaps with a transmission period of time of an uplink channel with a second TTI length for transmission.

The operation 302 is, when it is determined that the transmission period of time of the uplink channel with the first TTI length for transmission overlaps with the transmission period of time of the uplink channel with the second TTI length for transmission, to select at least one uplink channel for transmission, under a preset method, and to drop a remaining uplink channel, or to transmit the remaining uplink channel using puncturing.

Figure 4:
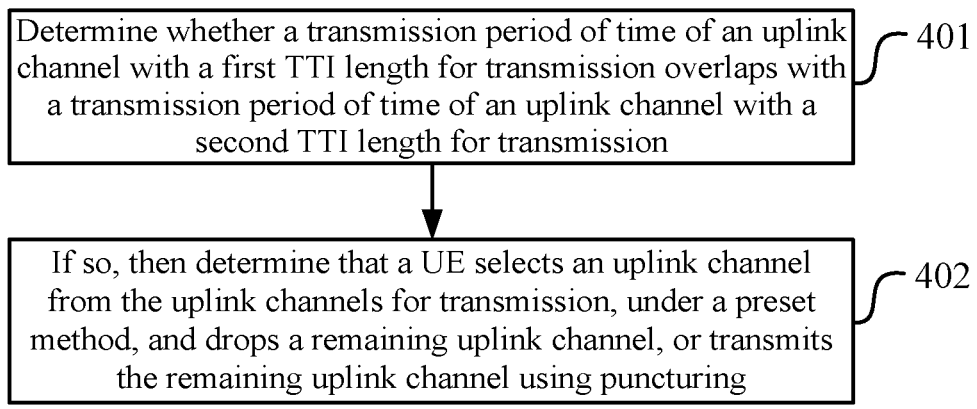
FIG. 4 is a schematic flow chart of a method for transmitting data at the eNB side according to an embodiment of the invention.

FIG. 4 is a schematic flow chart of a method for transmitting data at the eNB side according to an embodiment of the invention, and as illustrated, the method includes the following operations.

The operation 401 is to determine whether a transmission period of time of an uplink channel with a first TTI length for transmission overlaps with a transmission period of time of an uplink channel with a second TTI length for transmission.

The step 402 is, when it is determined that the transmission period of time of the uplink channel with the first TTI length for transmission overlaps with the transmission period of time of the uplink channel with the second TTI length for transmission, to determine that a UE selects an uplink channel from the uplink channels for transmission, under a preset method, and drops a remaining uplink channel, or transmits the remaining uplink channel using puncturing.

In a particular implementation, at the UE side, when the transmission period of time of the uplink channel with the first TTI length for transmission overlaps (i.e., collides at the same time domain position) with the transmission period of time of the uplink channel with the second TTI length for transmission, the UE selects at least one uplink channel from the uplink channels for transmission, under the preset method, and drops the remaining uplink channel(s), or transmits the remaining uplink channel(s) using puncturing.

At the eNB side, when the transmission period of time of the uplink channel with the first TTI length for transmission overlaps (i.e., collides at the same time domain position) with the transmission period of time of the uplink channel with the second TTI length for transmission, the eNB determines that the UE selects an uplink channel(s) for transmission, under the preset method, and drops the remaining uplink channel(s), or transmits the remaining uplink channel(s) using puncturing.

Since other operations at the eNB side are the same as those at the UE side, generally the UE side is described below.

In a particular implementation, there can be the following characteristics.

The first TTI length is longer than the second TTI length;

The first TTI length is 1 ms, and the second TTI length is a short TTI no longer than 1 ms, e.g., two, three, four, seven, etc., symbols;

The uplink channel is an uplink control channel or an uplink shared channel;

The preset rule is that the uplink control channel is selected, and the uplink shared channel is dropped or transmitted using puncturing, and/or the uplink channel with the second TTI length for transmission is selected, and the uplink channel with the first TTI length for transmission is dropped or transmitted using puncturing, and/or an uplink channel carrying Uplink Control Information (UCI) is selected, where if there are a plurality of uplink channels carrying UCI, then an uplink channel carrying UCI with a high priority is selected, and if there are a plurality of uplink channels carrying UCI with a high priority, then an uplink channel is selected under any of the methods above, and the other uplink channels is dropped or transmitted using puncturing;

The UCI priorities are sorted so that a UCI priority of a Scheduling Request (SR) is higher than or equal to that of ACK/NACK, and a UCI priority of ACK/NACK is higher than that of Periodic Channel State Information (P-CSI);

In an implementation, UCI in the uplink channel which is not selected can be transferred to and transmitted on the selected uplink channel under a preset rule 1, where particularly the preset rule 1 can be that:

all the UCI in the uplink channel which is not selected is transferred to and transmitted on the selected uplink channel; or when the UCI in the uplink channel which is not selected is ACK/NACK and/or an SR, the UCI is transferred directly to and transmitted on the selected uplink channel; when the UCI in the uplink channel which is not selected includes P-CSI, the P-CSI is dropped directly, or if P-CSI is carried on the selected uplink channel, then the P-CSI in the uplink channel which is not selected is dropped, and if no P-CSI is carried on the selected uplink channel, then the P-CSI in the uplink channel which is not selected is transferred to and transmitted on the selected uplink channel; or when the selected uplink channel is an uplink shared channel with the first TTI length for transmission, and/or an uplink control channel with the first TTI length for transmission, if there are both an uplink shared channel with the first TTI length for transmission, and an uplink control channel with the first TTI length for transmission, then one of them (e.g., the uplink control channel) is selected to carry the UCI, or a part of the UCI (e.g., P-CSI) is carried on the uplink shared channel with the first TTI length for transmission, and the other part of the UCI (e.g., ACK/NACK and/or an SR) is carried on the uplink control channel with the first TTI length for transmission; if there are a plurality of uplink shared channels with the first TTI length, then when there is an uplink shared channel with the first TTI length for transmission, on a Primary Component Carrier (PCC), then the uplink shared channel with the first TTI length for transmission, on the PCC is selected to carry the UCI, and when there is no uplink shared channel with the first TTI length for transmission, on the PCC, then an uplink shared channel with the first TTI length for transmission, on a Secondary Component Carrier (SCC) with the lowest carrier index among SCCs including the uplink shared channels with the first TTI length for transmission is selected to carry the UCI, where if the selected uplink shared channel is an uplink shared channel corresponding to a Random Access Response (RAR) grant, then the UCI is not transmitted; or when the selected uplink channel is the uplink control channel with the second TTI length for transmission, if there are a plurality of uplink control channels with the second TTI length for transmission, in the first TTI length, then the first or last uplink control channel with the second TTI length for transmission is selected to carry the UCI, or an uplink control channel with the second TTI length for transmission, which carries P-CSI is selected to carry P-CSI in the uplink channel which is not selected; if there is no uplink control channel with the second TTI length for transmission, which carries P-CSI, then the first or last uplink control channel with the second TTI length for transmission is selected to carry the P-CSI in the uplink channel which is not selected, and an uplink control channel with the second TTI length for transmission, which carries ACK/NACK and/or an SR (which may or may not be the same as the uplink channel selected for the P-CSI, where if they are different, then a plurality of channels are selected to carry the different UCI respectively) is selected to carry ACK/NACK and/or an SR in the uplink channel which is not selected; if there is no uplink control channel with the second TTI length for transmission, which carries ACK/NACK and/or an SR, then the first or last uplink control channel with the second TTI length for transmission is selected to carry the ACK/NACK and/or the SR in the uplink channel which is not selected; and if there are a plurality of channels satisfying the condition above, then the first or last one of the plurality of channels satisfying the condition above is selected to carry the corresponding UCI in the uplink channel which is not selected; or when the selected uplink channel is the uplink shared channel with the second TTI length for transmission, if there are a plurality of uplink shared channels with the second TTI length for transmission, in the first TTI length, then the first or last one of the uplink shared channels with the second TTI length for transmission is selected to carry the UCI; or when a plurality of carriers are aggregated for the UE, then if there is an uplink shared channel with the second TTI length for transmission, on the PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs including the uplink shared channels with the second TTI length for transmission is selected to carry the UCI, and if there are a plurality of uplink shared channels with the second TTI length for transmission, on the selected carrier, then the first or last one of the uplink shared channels with the second TTI length for transmission is selected to carry the UCI; and if the selected uplink shared channel with the second TTI length for transmission is an uplink shared channel corresponding to an RAR grant, then the UCI is not transmitted.

Implementations of transmission when the uplink channel with the first TTI length for transmission, and the uplink channel with the second TTI length for transmission are an uplink shared channel or an uplink control channel respectively is described below.

First Instance:

An implementation can be as follows when an uplink channel (which includes an uplink shared channel and/or an uplink control channel) with the first TTI length for transmission overlaps with an uplink control channel with the second TTI length for transmission.

In a first scheme, the uplink control channel with the second TTI length for transmission is selected for transmission, the uplink channel with the first TTI length for transmission is dropped, or information in symbol(s), in the uplink channel with the first TTI length for transmission which overlap(s) with symbol(s) in the uplink control channel with the second TTI length for transmission is punctured (that is, the information in the symbol(s) is not transmitted).

UCI carried on the uplink channel with the first TTI length for transmission is transferred to and transmitted on the uplink control channel with the second TTI length for transmission under the preset rule 1 or a preset rule 2, where particularly the preset rule 2 can be that:

all the UCI carried on the uplink channel with the first TTI length for transmission is transferred to and transmitted on the uplink control channel with the second TTI length for transmission; or when the UCI carried on the uplink channel with the first TTI length for transmission is ACK/NACK and/or an SR, the UCI is transferred directly to and transmitted on the uplink control channel with the second TTI length for transmission; and when the UCI carried on the uplink channel with the first TTI length for transmission includes P-CSI, in one implementation, the P-CSI carried on the uplink channel with the first TTI length for transmission is dropped directly, or in another implementation, when the uplink control channel with the second TTI length for transmission includes P-CSI, the P-CSI carried on the uplink channel with the first TTI length for transmission is dropped, and when the uplink control channel with the second TTI length for transmission does not include any P-CSI, the P-CSI carried on the uplink channel with the first TTI length for transmission is transferred to and transmitted on the uplink control channel with the second TTI length for transmission;

if there are a plurality of uplink control channels with the second TTI length for transmission, in a transmission period of time of the uplink channel with the first TTI length for transmission, then:

the first or last one of the uplink control channels with the second TTI length for transmission is selected to carry the UCI; or an uplink control channel with the second TTI length for transmission, which carries P-CSI is selected to carry P-CSI in the uplink channel with the first TTI length for transmission, and if there is no uplink control channel with the second TTI length for transmission, which carries P-CSI, then the first or last one of the uplink control channels with the second TTI length for transmission is selected to carry the P-CSI in the uplink channel with the first TTI length for transmission, and an uplink control channel with the second TTI length for transmission, which carries ACK/NACK and/or an SR (which may or may not be the same as the uplink channel selected for the P-CSI, where if they are the same, then a plurality of channels have been selected to carry the different UCI respectively) is selected to carry ACK/NACK and/or an SR in the uplink channel with the first TTI length for transmission; if there is no uplink control channel with the second TTI length for transmission, which carries ACK/NACK and/or an SR, then the first or last one of the uplink control channels with the second TTI length for transmission is selected to carry the ACK/NACK and/or the SR in the uplink channel with the first TTI length for transmission; and if there are a plurality of channels satisfying the condition, then the first or last one of the plurality of channels satisfying the condition is selected to carry the corresponding UCI in the uplink channel with the first TTI length for transmission;

For example, when a Physical Uplink Shared Channel (PUSCH)/Physical Uplink Control Channel (PUCCH) overlaps with an sPUCCH (a short PUCCH), the sPUCCH is selected, and the PUSCH/PUCCH is dropped, or information in symbol(s) in the PUSCH/PUCCH, which overlap with symbol(s) in the sPUCCH is punctured.

If the PUSCH/PUCCH carries UCI, then the UCI is placed into and transmitted on the sPUCCH under the rule above; and if there are a plurality of sPUCCHs in a transmission sub-frame of the PUSCH/PUCCH, then at least one of the sPUCCHs is selected under the selection rule above to transmit the UCI in the PUSCH/PUCCH.

In a second scheme, the uplink channel with the first TTI length for transmission is selected, and UCI carried on the uplink control channel with the second TTI length for transmission is transferred to and transmitted on the uplink channel with the first TTI length for transmission, under the preset rule 1 or a preset rule 3, where particularly the preset rule 3 can be that:

all the UCI carried on the uplink control channel with the second TTI length for transmission is transferred to and transmitted on the uplink channel with the first TTI length for transmission; or when the UCI carried on the uplink control channel with the second TTI length for transmission is ACK/NACK and/or an SR, the UCI is transferred directly to and transmitted on the uplink channel with the first TTI length for transmission; and when the UCI carried on the uplink control channel with the second TTI length for transmission includes P-CSI, in one implementation, the P-CSI is dropped directly, or in another implementation, if P-CSI is carried on the uplink channel with the first TTI length for transmission, then the P-CSI carried on the uplink control channel with the second TTI length for transmission is dropped, and if no P-CSI is carried on the uplink channel with the first TTI length for transmission, then the P-CSI carried on the uplink control channel with the second TTI length for transmission is transferred to and transmitted on the uplink channel with the first TTI length for transmission;

if there are both the uplink shared channel, and the uplink control channel, with the first TTI length for transmission, then one of them (e.g., the uplink control channel) is selected to carry the UCI, or a part of the UCI (e.g., P-CSI) is carried on the uplink shared channel with the first TTI length for transmission, and the other part of the UCI (e.g., ACK/NACK and/or an SR) is carried on the uplink control channel with the first TTI length for transmission;

if there are a plurality of uplink shared channels with the first TTI length for transmission, when there is an uplink shared channel with the first TTI length for transmission, on a PCC, then the uplink shared channel with the first TTI length for transmission, on the PCC is selected to carry the UCI, and when there is no uplink shared channel with the first TTI length for transmission, on the PCC, an uplink shared channel with the first TTI length for transmission, on an SCC with the lowest carrier index among SCCs including the uplink shared channels with the first TTI length for transmission is selected to carry the UCI, where if the selected uplink shared channel is an uplink shared channel corresponding to an RAR grant, then the UCI is not transmitted.

For example, when a PUSCH/PUCCH overlaps with an sPUCCH, the PUSCH/PUCCH is selected, and the sPUCCH is dropped; and UCI carried on the sPUCCH is placed into and transmitted on the PUSCH/PUCCH under the above preset rule, where as described above, all the UCI is placed into and transmitted on the PUCCH, or ACK/NACK is placed into and transmitted on the PUCCH, and P-CSI is placed into and transmitted on the PUSCH, and if there are a plurality of PUSCHs, then one of the PUSCHs is selected under the selection rule above to carry the UCI in the sPUCCH.

In a third scheme, an uplink channel carrying UCI is selected, and when there are a plurality of uplink channels carrying UCI, an uplink channel carrying UCI with a high priority is selected, and the other channels are dropped, or information in symbol(s), in the other channels, which overlap with symbol(s) in the selected uplink channel is punctured (that is, the information is not transmitted, and this will apply hereinafter); and if the plurality of channels carry the UCI with the same priority, then reference is further made to the first scheme or the second scheme.

Priorities of UCI are as follows: a priority of an SR is higher than or equal to that of ACK/NACK, and a priority of ACK/NACK is higher than that of P-CSI.

UCI in the uplink channel which is not selected is transferred to and transmitted on the selected uplink channel under the preset rule 1, where the preset rule 1 is as described above.

When the selected uplink channel is the uplink control channel with the second TTI length for transmission, if there are a plurality of uplink control channels with the second TTI length for transmission, in a transmission period of time of the uplink channel with the first TTI length for transmission, then an uplink channel to carry the UCI is selected under the same rule as in the first scheme; and when the selected uplink channel is the uplink channel with the first TTI length for transmission, if there are both the uplink shared channel, and the uplink control channel, with the first TTI length for transmission, or there are a plurality of uplink shared channels with the first TTI length for transmission, then a channel to carry the UCI is selected under the same rule as in the second scheme.

For example, when a PUSCH/PUCCH overlaps with an sPUCCH, if the sPUCCH carries ACK/NACK, and the PUSCH/PUCCH carries P-CSI, then the sPUCCH is selected, the P-CSI in the PUSCH/PUCCH is transferred to and transmitted on the sPUCCH under the preset rule above, and the PUSCH/PUCCH is dropped, or information in symbol(s) in the PUSCH/PUCCH, which overlap with symbol(s) in the sPUCCH, is punctured;

If the PUSCH/PUCCH carries ACK/NACK, and the sPUCCH carries P-CSI, then the PUSCH/PUCCH is selected, the sPUCCH is dropped, and the P-CSI in the sPUCCH is transferred to and transmitted on the PUSCH/PUCCH under the preset rule above.

If the sPUCCH carries ACK/NACK, and the PUSCH/PUCCH also carries ACK/NACK, then the sPUCCH is selected as in the first scheme, the ACK/NACK in the PUSCH/PUCCH is transferred to and transmitted on the sPUCCH, and the PUSCH/PUCCH is dropped, or information in symbol(s) in the PUSCH/PUCCH, which overlaps with symbol(s) in the sPUCCH is punctured; or the PUSCH/PUCCH is selected as in the second scheme, the sPUCCH is dropped, and the ACK/NACK in the sPUCCH is transferred to and transmitted on the PUSCH/PUCCH.

In the selection process, when the sPUCCH is selected, if there are a plurality of sPUCCHs which transmit information in a transmission sub-frame of the PUSCH/PUCCH, then an uplink control channel is selected under the selection rule in the first scheme above to carry the UCI in the PUSCH/PUCCH; and when the PUSCH/PUCCH is selected, if there are a plurality of PUSCHs, or if there are both a PUSCH and a PUCCH, then an uplink channel to carry the UCI in the sPUCCH is selected under the selection rule in the second scheme above.

Second Instance:

An implementation can be as follows when an uplink shared channel with the first TTI length for transmission overlaps with an uplink shared channel with the second TTI length for transmission.

In a fourth scheme, the uplink shared channel with the second TTI length for transmission is selected for transmission, and the uplink shared channel with the first TTI length for transmission is dropped, or information in symbol(s) in the uplink shared channel with the first TTI length for transmission, which overlap with the symbol(s) in the uplink shared channel with the second TTI length for transmission is punctured;

UCI carried on the uplink shared channel with the first TTI length for transmission is transferred to and transmitted on the uplink shared channel with the second TTI length for transmission under the preset rule 1 or a preset rule 4;

Particularly the preset rule 4 can be as follows:

all the UCI carried on the uplink shared channel with the first TTI length for transmission is transferred to and transmitted on the uplink shared channel with the second TTI length for transmission; or when the UCI is ACK/NACK and/or an SR, the UCI is transferred directly to and transmitted on the uplink shared channel with the second TTI length for transmission, and when the UCI includes P-CSI, the P-CSI is dropped directly, or if P-CSI is carried on the uplink shared channel with the second TTI length for transmission, then the P-CSI carried on the uplink shared channel with the first TTI length for transmission is dropped; and if no P-CSI is carried on the uplink shared channel with the second TTI length for transmission, then the P-CSI carried on the uplink shared channel with the first TTI length for transmission is transferred to and transmitted on the uplink shared channel with the second TTI length for transmission;

if there are a plurality of uplink shared channels with the second TTI length for transmission, in a transmission period of time of the uplink shared channel with the first TTI length for transmission, then the first or last one of the uplink shared channels with the second TTI length for transmission is selected to carry the UCI; or when a plurality of carriers are aggregated for the UE, if there is an uplink shared channel with the second TTI length for transmission, on a PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs including the uplink shared channels with the second TTI length for transmission is selected to carry the UCI, and if there are a plurality of uplink shared channels with the second TTI length for transmission, on the selected carrier, then the first or last one of the uplink shared channels with the second TTI length for transmission is selected to carry the UCI; and if the selected uplink shared channel with the second TTI length for transmission is an uplink shared channel corresponding to an RAR grant, then the UCI is not transmitted;

For example, when a PUSCH overlaps with an sPUSCH, then the sPUSCH is selected, and the PUSCH is dropped, or information in symbol(s) in the PUSCH, which overlaps with symbol(s) in the sPUSCH is punctured; or if the PUSCH carries UCI, then the UCI is placed into and transmitted on the sPUSCH under the preset rule;

If there are a plurality of sPUSCHs in a transmission sub-frame of the PUSCH, then the UCI is placed into and transmitted on the first or last one of the sPUSCHs, or when a plurality of carriers are aggregated for the UE, if there are the sPUSCHs on a PCC, then the first or last one of the sPUSCHs on the PCC is selected preferentially to carry the UCI in the PUSCH; and if there is no sPUSCH on the PCC, then the first or last one of the sPUSCHs on an SCC with the lowest carrier index among SCCs including the sPUSCHs is selected to carry the UCI in the PUSCH.

In a fifth scheme, the uplink shared channel with the first TTI length for transmission is selected for transmission, and the uplink shared channel with the second TTI length for transmission is dropped;

UCI carried on the uplink shared channel with the second TTI length for transmission is transferred to and transmitted on the uplink shared channel with the first TTI length for transmission under the preset rule 1 or a preset rule 5;

Particularly the preset rule 5 can be that:

all the UCI carried on the uplink shared channel with the second TTI length for transmission is transferred to and transmitted on the uplink shared channel with the first TTI length for transmission; or when the UCI carried on the uplink shared channel with the second TTI length for transmission is ACK/NACK and/or an SR, the UCI is transferred directly to and transmitted on the uplink shared channel with the first TTI length for transmission; and when the UCI carried on the uplink shared channel with the second TTI length for transmission includes P-CSI, the P-CSI is dropped directly, or if P-CSI is carried on the uplink shared channel with the first TTI length for transmission, then the P-CSI carried on the uplink shared channel with the second TTI length for transmission is dropped, and if no P-CSI is carried on the uplink shared channel with the first TTI length for transmission, then the P-CSI carried on the uplink shared channel with the second TTI length for transmission is transferred to and transmitted on the uplink shared channel with the first TTI length for transmission;

if there are a plurality of uplink shared channels with the first TTI length for transmission, then if there is an uplink shared channel with the first TTI length for transmission, on a PCC, then the uplink shared channel with the first TTI length for transmission, on the PCC is selected to carry UCI in the sPUSCH; if there is no uplink shared channel with the first TTI length for transmission, on the PCC, then an uplink shared channel with the first TTI length for transmission, on an SCC with the lowest carrier index among SCCs including the uplink shared channels with the first TTI length for transmission is selected to carry the UCI in the sPUSCH; and if the selected uplink shared channel with the first TTI length for transmission is an uplink shared channel corresponding to an RAR grant, then the UCI is not transmitted;

For example, when a PUSCH overlaps with an sPUSCH, the PUSCH is selected, and the sPUSCH is dropped; if the sPUSCH caries UCI, then the UCI is placed into and transmitted on the PUSCH under the preset rule; if there are a plurality of PUSCHs, then if there is a PUSCH on a PCC, then the PUSCH on the PCC is selected preferentially to carry UCI in the sPUSCH; and if there is no PUSCH on the PCC, then a PUSCH on an SCC with the lowest carrier index among SCCs including the PUSCH is selected to carry the UCI in the sPUSCH.

In a sixth scheme, an uplink channel carrying UCI is selected, and when there are a plurality of uplink channels carrying UCI, an uplink channel carrying UCI with a high priority is selected, and the other channels are dropped, or information in symbol(s), in the other channels, which overlap(s) with symbol(s) in the selected uplink channel is punctured (that is, the information is not transmitted, and this will apply hereinafter); and if there are a plurality of channels carrying UCI with the same high priority, then reference is further made to the fourth scheme or the fifth scheme;

The priorities of UCI are sorted so that a priority of an SR is higher than or equal to that of ACK/NACK, and a priority of ACK/NACK is higher than that of P-CSI;

UCI in the uplink channel which is not selected is transferred to and transmitted on the selected uplink channel under the preset rule 1;

When the selected uplink channel is the uplink shared channel with the second TTI length for transmission, if there are a plurality of uplink shared channels with the second TTI length for transmission, in a transmission period of time of the uplink shared channel with the first TTI length for transmission, then a channel to carry the UCI is selected under the same rule as in the fourth scheme; and when the selected uplink channel is the uplink shared channel with the first TTI length for transmission, if there are a plurality of uplink shared channels with the first TTI length for transmission, then a channel to carry the UCI is selected under the same rule as in the fifth scheme;

For example, when a PUSCH overlaps with an sPUSCH, if the sPUSCH carries ACK/NACK, and the PUSCH carries P-CSI, then the sPUSCH is selected, the P-CSI in the PUSCH is transferred to and transmitted on the sPUSCH under the preset rule above, and the PUSCH is dropped, or information in symbol(s) in the PUSCH, which overlaps with symbol(s) in the sPUSCH is punctured;

If the PUSCH carries ACK/NACK, and the sPUSCH carries P-CSI, then the PUSCH is selected, the sPUSCH is dropped, and the P-CSI in the sPUSCH is transferred to and transmitted on the PUSCH under the preset rule above; and if the sPUSCH carries ACK/NACK, and the PUSCH also carries ACK/NACK, then the sPUSCH is selected, the ACK/NACK in the PUSCH is transferred to and transmitted on the sPUSCH, and the PUSCH is dropped, or information in symbol(s) in the PUSCH, which overlaps with symbol(s) in the sPUSCH is punctured, in the fourth scheme, or the PUSCH is selected, the sPUSCH is dropped, and the ACK/NACK in the sPUSCH is transferred to and transmitted on the PUSCH, in the fifth scheme;

In the selection process, when the sPUSCH is selected, if there are a plurality of sPUSCHs in a transmission sub-frame of the PUSCH, then an uplink shared channel is selected under the selection rule in the fourth scheme above to carry the UCI in the PUSCH; and when the PUSCH is selected, if there are a plurality of PUSCHs, then an uplink channel to carry the UCI in the sPUSCH is selected under the selection rule in the fifth scheme above.

Third Instance:

An implementation can be as follows when an uplink control channel with the first TTI length for transmission overlaps with an uplink shared channel with the second TTI length for transmission.

In a seventh scheme, the uplink shared channel with the second TTI length for transmission is selected for transmission, UCI carried on the uplink control channel with the first TTI length for transmission is transferred to and transmitted on the uplink shared channel with the second TTI length for transmission under the preset rule 1 or a preset rule 6, and the uplink control channel with the first TTI length for transmission is dropped, or information in symbol(s) in the uplink control channel with the first TTI length for transmission, which overlap with symbol(s) in the uplink shared channel with the second TTI length for transmission is punctured;

Particularly the preset rule 6 can be as follows:

all the UCI carried on the uplink control channel with the first TTI length for transmission is transferred to and transmitted on the uplink shared channel with the second TTI length for transmission; or when the UCI carried on the uplink control channel with the first TTI length for transmission is ACK/NACK and/or an SR, the UCI is transferred directly to and transmitted on the uplink shared channel with the second TTI length for transmission, and when the UCI carried on the uplink control channel with the first TTI length for transmission includes P-CSI, the P-CSI is dropped directly, or if P-CSI is carried on the uplink shared channel with the second TTI length for transmission, then the P-CSI carried on the uplink control channel with the first TTI length for transmission is dropped; and if no P-CSI is carried on the uplink shared channel with the second TTI length for transmission, then the P-CSI carried on the uplink control channel with the first TTI length for transmission is transferred to and transmitted on the uplink shared channel with the second TTI length for transmission;

if there are a plurality of uplink shared channels with the second TTI length for transmission, in a transmission period of time of the uplink control channel with the first TTI length for transmission, then an uplink shared channel with the second TTI length for transmission is selected in the same manner as in the fourth scheme of the second instance.

For example, when a PUCCH overlaps with an sPUSCH, then the sPUSCH is selected, and the PUCCH is dropped, or information in symbol(s) in the PUCCH, which overlap with symbol(s) in the sPUSCH is punctured; and furthermore UCI carried on the PUCCH is placed into and transmitted on the sPUSCH, and when there are a plurality of sPUSCHs in a transmission sub-frame of the PUCCH, one of the sPUSCHs is selected in the same manner as in the fourth scheme in the second instance.

In an eighth scheme, the uplink control channel with the first TTI length for transmission is selected for transmission, and the uplink shared channel with the second TTI length for transmission is dropped.

If the uplink shared channel with the second TTI length for transmission carries UCI, then the UCI is transferred to and transmitted on the uplink control channel with the first TTI length for transmission under the preset rule 1 or a preset rule 7.

Particularly the preset rule 7 can be that:

all the UCI carried on the uplink shared channel with the second TTI length for transmission is transferred to and transmitted on the uplink control channel with the first TTI length for transmission; or when the UCI carried on the uplink shared channel with the second TTI length for transmission is ACK/NACK and/or an SR, the UCI is transferred directly to and transmitted on the uplink control channel with the first TTI length for transmission; and when the UCI carried on the uplink shared channel with the second TTI length for transmission includes P-CSI, the P-CSI is dropped directly, or if P-CSI is carried on the uplink control channel with the first TTI length for transmission, then the P-CSI carried on the uplink shared channel with the second TTI length for transmission is dropped, and if no P-CSI is carried on the uplink control channel with the first TTI length for transmission, then the P-CSI carried on the uplink shared channel with the second TTI length for transmission is transferred to and transmitted on the uplink control channel with the first TTI length for transmission.

For example, when a PUCCH overlaps with an sPUSCH, the PUCCH is selected, and the sPUSCH is dropped; and furthermore if the sPUSCH caries UCI, then the UCI is placed into and transmitted on the PUCCH under the preset rule.

In a ninth scheme, an uplink channel carrying UCI is selected, and when there are a plurality of uplink channels carrying UCI, an uplink channel carrying UCI with a high priority is selected, and the other channels are dropped, or information in symbol(s), in the other channels, which overlap with symbol(s) in the selected uplink channel is punctured (that is, the information is not transmitted, and this will apply hereinafter); and if the plurality of channels carry the UCI with the same priority, then reference is further made to the seventh scheme or the ninth scheme.

The UCI priorities are sorted so that a UCI priority of an SR is higher than or equal to that of ACK/NACK, and a UCI priority of ACK/NACK is higher than that of P-CSI.

UCI in the uplink channel which is not selected is transferred to and transmitted on the selected uplink channel under the preset rule 1.

When the selected uplink channel is the uplink shared channel with the second TTI length for transmission, if there are a plurality of uplink shared channels with the second TTI length for transmission, in a transmission period of time of the uplink control channel with the first TTI length for transmission, then a channel to carry the UCI is selected under the same rule as in the eighth scheme.

For example, when a PUCCH overlaps with an sPUSCH, if the sPUSCH carries ACK/NACK, and the PUCCH carries P-CSI, then the sPUSCH is selected, the P-CSI in the PUCCH is transferred to and transmitted on the sPUSCH under the preset rule above, and the PUCCH is dropped, or information in symbol(s) in the PUCCH, which overlap with symbol(s) in the sPUSCH is punctured.

If the PUCCH carries ACK/NACK, and the sPUSCH carries P-CSI, then the PUCCH is selected, the sPUSCH is dropped, and the P-CSI in the sPUSCH is transferred to and transmitted on the PUCCH under the preset rule above.

If the sPUSCH carries ACK/NACK, and the PUCCH also carries ACK/NACK, then the sPUSCH is selected, the ACK/NACK in the PUCCH is transferred to and transmitted on the sPUSCH, and the PUCCH is dropped, or information in symbol(s) in the PUCCH, which overlap with symbol(s) in the sPUSCH is punctured, in the seventh scheme, or the PUCCH is selected, the sPUSCH is dropped, and the ACK/NACK in the sPUSCH is transferred to and transmitted on the PUCCH, in the eighth scheme.

In the selection process, when the sPUSCH is selected, if there are a plurality of sPUSCHs in a transmission sub-frame of the PUCCH, then an uplink shared channel is selected under the selection rule in the seventh scheme above to carry the UCI in the PUCCH.

In a particular implementation, before the above operations are performed, it can further include the operation of determining whether the sum of transmission power of the uplink channel with the first TTI length for transmission, and transmission power of the uplink channel with the second TTI length for transmission exceeds the highest transmission power allowed for the UE, and if so, then the operations above are performed.

Before the above operations are performed, it can further include the operation of determining whether there is a support of simultaneous transmission of the uplink channel with the first TTI length for transmission, and the uplink channel with the second TTI length for transmission, and if not, then the operations above are performed.

Before the above operations are performed, it can further include the operation of determining whether there is a support of simultaneous transmission of an uplink control channel with the first TTI length for transmission, and an uplink shared channel with the second TTI length for transmission, and/or simultaneous transmission of an uplink shared channel with the first TTI length for transmission, and an uplink control channel with the second TTI length for transmission, and if not, then the operations above are performed.

In the process above, when P-CSI carried on the uplink channel which is not selected is transmitted on the selected uplink channel, a transmission rule for a combination of UCI on the selected uplink channel shall be complied, e.g., whether there is a support of simultaneous transmission of ACK/NACK/SR and P-CSI, the number of pieces of P-CSI to be transmitted can be selected according to a transmission capacity, etc. Particularly if only ACK/NACK and/or an SR is carried on the selected uplink channel, then whether the P-CSI carried on the uplink channel which is not selected can be transferred to and transmitted on the selected uplink channel is determined according to whether the selected uplink channel supports simultaneous transmission of P-CSI, and ACK/NACK and/or an SR, and if simultaneous transmission is supported, then the P-CSI can be transferred; otherwise, the P-CSI carried on the uplink channel which is not selected is dropped. If at least P-CSI is carried on the selected uplink channel, then the P-CSI carried on the uplink channel which is not selected is transferred to and transmitted on the selected uplink channel. When the P-CSI carried on the uplink channel which is not selected is transmitted on the selected uplink channel, all the P-CSI can be carried on the selected uplink channel, or a part or all of the P-CSI carried on the uplink channel which is not selected can be selected according to a capacity of the selected uplink channel under the same rule as in the prior art, i.e., according to a CSI type priority, a carrier priority, and a CSI process priority.

Based upon the same inventive idea, embodiments of the invention further provide apparatuses for transmitting data, and since the apparatuses address the problem under a similar principle to the methods for transmitting data, reference can be made to the implementations of the methods for an implementation of the apparatuses, and a repeated description thereof is omitted here.

Figure 5:
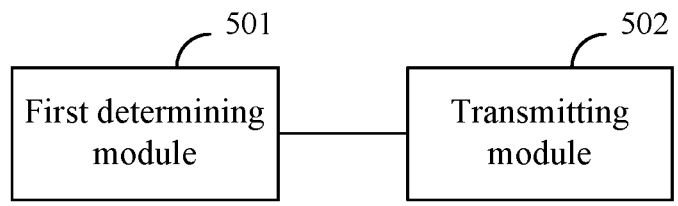
FIG. 5 is a schematic structural diagram of an apparatus for transmitting data at the UE side according to an embodiment of the invention.

FIG. 5 is a schematic structural diagram of an apparatus for transmitting data at the UE side according to an embodiment of the invention, and as illustrated, the apparatus includes:

a first determining module 501 configured to determine whether a transmission period of time of an uplink channel with a first TTI length for transmission overlaps with a transmission period of time of an uplink channel with a second TTI length for transmission; and a transmitting module 502 configured, if so, to select at least one uplink channel for transmission, under a preset method, and to drop the remaining uplink channel(s), or to transmit the remaining uplink channel(s) using puncturing.

In an implementation, the first TTI length is longer than the second TTI length.

In an implementation, an uplink channel is an uplink control channel and/or an uplink shared channel.

In an implementation, the preset method is one or a combination of the following methods:

an uplink control channel is selected, and an uplink shared channel is dropped or transmitted using puncturing;

the uplink channel with the second TTI length for transmission is selected, and the uplink channel with the first TTI length for transmission is dropped or transmitted using puncturing;

an uplink channel carrying UCI is selected, if there are a plurality of uplink channels carrying UCI, then an uplink channel carrying UCI with a high priority is selected, and if there are a plurality of uplink channels carrying UCI with a high priority, then an uplink channel is selected under the methods above, and the other uplink channels are dropped or transmitted using puncturing.

In an implementation, the transmitting module is further configured:

to transfer UCI in the uplink channel which is not selected to the selected uplink channel, and to transmit the UCI on the selected uplink channel, under a preset rule 1.

In an implementation, when an uplink channel (which includes at least one of an uplink shared channel or an uplink control channel) with the first TTI length for transmission overlaps with an uplink control channel with the second TTI length for transmission, at least one of the following schemes is applied.

First Scheme

The uplink control channel with the second TTI length for transmission is selected for transmission, the uplink channel with the first TTI length for transmission is dropped, or information in symbol(s), in the uplink channel with the first TTI length for transmission, which overlap with symbol(s) in the uplink control channel with the second TTI length for transmission is punctured.

Second Scheme:

The uplink channel with the first TTI length for transmission is selected, and the uplink control channel with the second TTI length for transmission is dropped.

Third Scheme:

An uplink channel carrying UCI is selected, and when there are a plurality of uplink channels carrying UCI, an uplink channel carrying UCI with a high priority is selected, and the other channels are dropped, or information in symbol(s), in the other channels, which overlap with symbol(s) in the selected uplink channel is punctured; and if there are a plurality of channels carrying the UCI with the same high priority, then an uplink channel is selected from the plurality of channels carrying the UCI with the same high priority as in the first scheme or the second scheme.

In an implementation, when the first scheme is applied, UCI carried on the uplink channel with the first TTI length for transmission is transferred to and transmitted on the uplink control channel with the second TTI length for transmission under a preset rule 1 or a preset rule 2.

When the second scheme is applied, UCI carried on the uplink control channel with the second TTI length for transmission is transferred to and transmitted on the uplink channel with the first TTI length for transmission, under the preset rule 1 or a preset rule 3.

When the third scheme is applied, UCI in the uplink channel which is not selected is transferred to and transmitted on the selected uplink channel under the preset rule 1.

In an implementation, when the first scheme is applied, the preset rule 2 includes one or a combination of the following schemes:

all the UCI carried on the uplink channel with the first TTI length for transmission is transferred to and transmitted on the uplink control channel with the second TTI length for transmission; or when the UCI carried on the uplink channel with the first TTI length for transmission is ACK/NACK and/or an SR, the UCI is transferred to and transmitted on the uplink control channel with the second TTI length for transmission; and when the UCI carried on the uplink channel with the first TTI length for transmission includes P-CSI, the P-CSI carried on the uplink channel with the first TTI length for transmission is dropped, or when the uplink control channel with the second TTI length for transmission includes P-CSI, the P-CSI carried on the uplink channel with the first TTI length for transmission is dropped, and when the uplink control channel with the second TTI length for transmission does not include any P-CSI, the P-CSI carried on the uplink channel with the first TTI length for transmission is transferred to and transmitted on the uplink control channel with the second TTI length for transmission;

if there are a plurality of uplink control channels with the second TTI length for transmission, in a transmission period of time of the uplink channel with the first TTI length for transmission, then:

the first or last one of the uplink control channels with the second TTI length for transmission is selected to carry the UCI; or an uplink control channel with the second TTI length for transmission, which carries P-CSI is selected to carry P-CSI in the uplink channel with the first TTI length for transmission, and if there is no uplink control channel with the second TTI length for transmission, which carries P-CSI, then the first or last one of the uplink control channels with the second TTI length for transmission is selected to carry the P-CSI in the uplink channel with the first TTI length for transmission, and an uplink control channel with the second TTI length for transmission, which carries ACK/NACK and/or an SR is selected to carry ACK/NACK and/or an SR in the uplink channel with the first TTI length for transmission; if there is no uplink control channel with the second TTI length for transmission, which carries ACK/NACK and/or an SR, then the first or last one of the uplink control channels with the second TTI length for transmission is selected to carry the ACK/NACK and/or the SR in the uplink channel with the first TTI length for transmission and if there are a plurality of channels satisfying the above conditions, then the first or last one of the plurality of channels satisfying the conditions is selected to carry the corresponding UCI in the uplink channel with the first TTI length for transmission.

When the second scheme is applied, the preset rule 3 includes one or a combination of the following schemes:

all the UCI carried on the uplink control channel with the second TTI length for transmission is transferred to and transmitted on the uplink channel with the first TTI length for transmission; or when the UCI carried on the uplink control channel with the second TTI length for transmission is ACK/NACK and/or an SR, the UCI is transferred to and transmitted on the uplink channel with the first TTI length for transmission; and when the UCI carried on the uplink control channel with the second TTI length for transmission includes P-CSI, the P-CSI carried on the uplink control channel with the second TTI length for transmission is dropped, or if P-CSI is carried on the uplink channel with the first TTI length for transmission, then the P-CSI carried on the uplink control channel with the second TTI length for transmission is dropped, and if no P-CSI is carried on the uplink channel with the first TTI length for transmission, then the P-CSI carried on the uplink control channel with the second TTI length for transmission is transferred to and transmitted on the uplink channel with the first TTI length for transmission;

if there are both the uplink shared channel with the first TTI length for transmission, and the uplink control channel, with the first TTI length for transmission, then one of them is selected to carry the UCI, or a part of the UCI is carried on the uplink shared channel with the first TTI length for transmission, and the other part of the UCI is carried on the uplink control channel with the first TTI length for transmission; and/or if there are a plurality of uplink shared channels with the first TTI length for transmission, when there is an uplink shared channel with the first TTI length for transmission, on a PCC, then the uplink shared channel with the first TTI length for transmission, on the PCC is selected to carry the UCI, and when there is no uplink shared channel with the first TTI length for transmission, on the PCC, an uplink shared channel with the first TTI length for transmission, on an SCC with the lowest carrier index among SCCs including the uplink shared channels with the first TTI length for transmission is selected to carry the UCI, where if the selected uplink shared channel is an uplink shared channel corresponding to an RAR grant, then the UCI is not transmitted.

When the third scheme is applied, when the selected uplink channel is the uplink control channel with the second TTI length for transmission, if there are a plurality of uplink control channels with the second TTI length for transmission, in a transmission period of time of the uplink channel with the first TTI length for transmission, then an uplink channel to carry the UCI is selected in the same scheme as in the preset rule 2; and when the selected uplink channel is the uplink channel with the first TTI length for transmission, if there are both the uplink shared channel, and the uplink control channel, with the first TTI length for transmission, or there are a plurality of uplink shared channels with the first TTI length for transmission, then a channel to carry the UCI is selected in the same scheme as in the preset rule 3.

In an implementation, when an uplink shared channel with the first TTI length for transmission overlaps with an uplink shared channel with the second TTI length for transmission, at least one of the following schemes is applied.

Fourth Scheme

The uplink shared channel with the second TTI length for transmission is selected for transmission, and the uplink shared channel with the first TTI length for transmission is dropped, or information in symbol(s) in the uplink shared channel with the first TTI length for transmission, which overlap with symbol(s) in the uplink shared channel with the second TTI length for transmission is punctured.

Fifth Scheme

The uplink shared channel with the first TTI length for transmission is selected for transmission, and the uplink shared channel with the second TTI length for transmission is dropped.

Sixth Scheme

An uplink channel carrying UCI is selected, and when there are a plurality of uplink channels carrying UCI, an uplink channel carrying UCI with a high priority is selected, and the other channels are dropped, or information in symbol(s), in the other channels, which overlap with symbol(s) in the selected uplink channel is punctured; and if the plurality of channels carry the UCI with the same priority, then an uplink channel is selected from the plurality of channels carrying the UCI with the same priority as in the third scheme or the fourth scheme.

In an implementation, when the fourth scheme is applied, UCI carried on the uplink shared channel with the first TTI length for transmission is transferred to and transmitted on the uplink shared channel with the second TTI length for transmission under a preset rule 1 or a preset rule 4.

When the fifth scheme is applied, UCI carried on the uplink shared channel with the second TTI length for transmission is transferred to and transmitted on the uplink shared channel with the first TTI length for transmission under the preset rule 1 or a preset rule 5.

When the sixth scheme is applied, UCI in the uplink channel which is not selected is transferred to and transmitted on the selected uplink channel under the preset rule 1.

In an implementation, when the fourth scheme is applied, the preset rule 4 includes one or a combination of the following schemes:

all the UCI carried on the uplink shared channel with the first TTI length for transmission is transferred to and transmitted on the uplink shared channel with the second TTI length for transmission; or when the UCI carried on the uplink shared channel with the first TTI length for transmission is ACK/NACK and/or an SR, the UCI is transferred to and transmitted on the uplink shared channel with the second TTI length for transmission, and when the UCI carried on the uplink shared channel with the first TTI length for transmission includes P-CSI, the P-CSI carried on the uplink shared channel with the first TTI length for transmission is dropped, or if P-CSI is carried on the uplink shared channel with the second TTI length for transmission, then the P-CSI carried on the uplink shared channel with the first TTI length for transmission is dropped; and if no P-CSI is carried on the uplink shared channel with the second TTI length for transmission, then the P-CSI carried on the uplink shared channel with the first TTI length for transmission is transferred to and transmitted on the uplink shared channel with the second TTI length for transmission;

if there are a plurality of uplink shared channels with the second TTI length for transmission, in a transmission period of time of the uplink shared channel with the first TTI length for transmission, then the first or last one of the uplink shared channels with the second TTI length for transmission is selected to carry the UCI; or when a plurality of carriers are aggregated for the UE, if there is an uplink shared channel with the second TTI length for transmission, on a PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs including the uplink shared channels with the second TTI length for transmission is selected to carry the UCI, and if there are a plurality of uplink shared channels with the second TTI length for transmission, on the selected carrier, then the first or last one of the uplink shared channels with the second TTI length for transmission is selected to carry the UCI; and if the selected uplink shared channel with the second TTI length for transmission is an uplink shared channel corresponding to an RAR grant, then the UCI is not transmitted.

When the fifth scheme is applied, the preset rule 5 includes one or a combination of the following schemes:

all the UCI carried on the uplink shared channel with the second TTI length for transmission is transferred to and transmitted on the uplink shared channel with the first TTI length for transmission; or when the UCI carried on the uplink shared channel with the second TTI length for transmission is ACK/NACK and/or an SR, the UCI is transferred to and transmitted on the uplink shared channel with the first TTI length for transmission; and when the UCI carried on the uplink shared channel with the second TTI length for transmission includes P-CSI, the P-CSI carried on the uplink shared channel with the second TTI length for transmission is dropped, or if P-CSI is carried on the uplink shared channel with the first TTI length for transmission, then the P-CSI carried on the uplink shared channel with the second TTI length for transmission is dropped, and if no P-CSI is carried on the uplink shared channel with the first TTI length for transmission, then the P-CSI carried on the uplink shared channel with the second TTI length for transmission is transferred to and transmitted on the uplink shared channel with the first TTI length for transmission;

if there are a plurality of uplink shared channels with the first TTI length for transmission, then if there is an uplink shared channel with the first TTI length for transmission, on a PCC, then the uplink shared channel with the first TTI length for transmission, on the PCC is selected to carry UCI in the sPUSCH; if there is no uplink shared channel with the first TTI length for transmission, on the PCC, then an uplink shared channel with the first TTI length for transmission, on an SCC with the lowest carrier index among SCCs including the uplink shared channels with the first TTI length for transmission is selected to carry the UCI in the sPUSCH; and if the selected uplink shared channel with the first TTI length for transmission is an uplink shared channel corresponding to an RAR grant, then the UCI is not transmitted.

When the sixth scheme is applied, when the selected uplink channel is the uplink shared channel with the second TTI length for transmission, if there are a plurality of uplink shared channels with the second TTI length for transmission, in a transmission period of time of the uplink shared channel with the first TTI length for transmission, then a channel to carry the UCI is selected as in the scheme as in the preset rule 4; and when the selected uplink channel is the uplink shared channel with the first TTI length for transmission, if there are a plurality of uplink shared channels with the first TTI length for transmission, then a channel to carry the UCI is selected as in the scheme as in the preset rule 5.

In an implementation, when an uplink control channel with the first TTI length for transmission overlaps with an uplink shared channel with the second TTI length for transmission, at least one of the following schemes is applied.

Seventh Scheme

The uplink shared channel with the second TTI length for transmission is selected for transmission, and the uplink control channel with the first TTI length for transmission is dropped, or information in symbol(s) in the uplink control channel with the first TTI length for transmission, which overlap with symbol(s) in the uplink shared channel with the second TTI length for transmission is punctured.

Eighth Scheme

The uplink control channel with the first TTI length for transmission is selected for transmission, and the uplink shared channel with the second TTI length for transmission is dropped.

Ninth Scheme:

An uplink channel carrying UCI is selected, and when there are a plurality of uplink channels carrying UCI, an uplink channel carrying UCI with a high priority is selected, and the other channels are dropped, or information in symbol(s), in the other channels, which overlap with symbol(s) in the selected uplink channel is punctured; and if the plurality of channels carry the UCI with the same priority, then one of the plurality of channels carrying the UCI with the same priority is selected as in the seventh scheme or the eighth scheme.

In an implementation, when the seventh scheme is applied, UCI carried on the uplink control channel with the first TTI length for transmission is transferred to and transmitted on the uplink shared channel with the second TTI length for transmission under a preset rule 1 or a preset rule 6.

When the eighth scheme is applied, if the uplink shared channel with the second TTI length for transmission carries UCI, then the UCI is transferred to and transmitted on the uplink control channel with the first TTI length for transmission under the preset rule 1 or a preset rule 7.

When the ninth scheme is applied, UCI in the uplink channel which is not selected is transferred to and transmitted on the selected uplink channel under the preset rule 1.

In an implementation, when the seventh scheme is applied, the preset rule 6 includes one or a combination of the following schemes:

all the UCI carried on the uplink control channel with the first TTI length for transmission is transferred to and transmitted on the uplink shared channel with the second TTI length for transmission; or when the UCI carried on the uplink control channel with the first TTI length for transmission is ACK/NACK and/or an SR, the UCI is transferred to and transmitted on the uplink shared channel with the second TTI length for transmission, and when the UCI carried on the uplink control channel with the first TTI length for transmission includes P-CSI, the P-CSI carried on the uplink control channel with the first TTI length for transmission is dropped, or if P-CSI is carried on the uplink shared channel with the second TTI length for transmission, then the P-CSI carried on the uplink control channel with the first TTI length for transmission is dropped; and if no P-CSI is carried on the uplink shared channel with the second TTI length for transmission, then the P-CSI carried on the uplink control channel with the first TTI length for transmission is transferred to and transmitted on the uplink shared channel with the second TTI length for transmission;

if there are a plurality of uplink shared channels with the second TTI length for transmission, in a transmission period of time of the uplink control channel with the first TTI length for transmission, then the first or last one of the uplink shared channels with the second TTI length for transmission is selected to carry the UCI; or when a plurality of carriers are aggregated for the UE, if there is an uplink shared channel with the second TTI length for transmission, on a PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs including the uplink shared channels with the second TTI length for transmission is selected to carry the UCI, and if there are a plurality of uplink shared channels with the second TTI length for transmission, on the selected carrier, then the first or last one of the uplink shared channels with the second TTI length for transmission is selected to carry the UCI; and if the selected uplink shared channel with the second TTI length for transmission is an uplink shared channel corresponding to an RAR grant, then the UCI is not transmitted.

When the eighth scheme is applied, the preset rule 7 includes one or a combination of the following schemes:

all the UCI carried on the uplink shared channel with the second TTI length for transmission is transferred to and transmitted on the uplink control channel with the first TTI length for transmission; or when the UCI carried on the uplink shared channel with the second TTI length for transmission is ACK/NACK and/or an SR, the UCI is transferred to and transmitted on the uplink control channel with the first TTI length for transmission; and when the UCI carried on the uplink shared channel with the second TTI length for transmission includes P-CSI, the P-CSI carried on the uplink shared channel with the second TTI length for transmission is dropped, or if P-CSI is carried on the uplink control channel with the first TTI length for transmission, then the P-CSI carried on the uplink shared channel with the second TTI length for transmission is dropped, and if no P-CSI is carried on the uplink control channel with the first TTI length for transmission, then the P-CSI carried on the uplink shared channel with the second TTI length for transmission is transferred to and transmitted on the uplink control channel with the first TTI length for transmission.

When the ninth scheme is applied, when the selected uplink channel is the uplink shared channel with the second TTI length for transmission, if there are a plurality of uplink shared channels with the second TTI length for transmission, in a transmission period of time of the uplink control channel with the first TTI length for transmission, then a channel to carry the UCI is selected as in the scheme in the preset rule 7.

In an implementation, the UCI priorities are sorted so that a UCI priority of an SR is higher than or equal to that of ACK/NACK, and a UCI priority of ACK/NACK is higher than that of P-CSI.

In an implementation, the preset rule 1 includes one or a combination of the following schemes:

UCI in the uplink channel which is not selected is transferred to and transmitted on the selected uplink channel; or when the UCI in the uplink channel which is not selected is ACK/NACK and/or an SR, the UCI is transferred to and transmitted on the selected uplink channel; and when the UCI in the uplink channel which is not selected includes P-CSI, the P-CSI in the uplink channel which is not selected is dropped, or if P-CSI is carried on the selected uplink channel, then the P-CSI in the uplink channel which is not selected is dropped, and if no P-CSI is carried on the selected uplink channel, then the P-CSI in the uplink channel which is not selected is transferred to and transmitted on the selected uplink channel; or when the selected uplink channel is an uplink shared channel with the first TTI length for transmission, and/or an uplink control channel with the first TTI length for transmission, if there are both the uplink shared channel with the first TTI length for transmission, and the uplink control channel with the first TTI length for transmission, then one of them is selected to carry the UCI, or a part of the UCI is carried on the uplink shared channel with the first TTI length for transmission, and the other part of the UCI is carried on the uplink control channel with the first TTI length for transmission; if there are a plurality of uplink shared channels with the first TTI length, then when there is an uplink shared channel with the first TTI length for transmission, on a PCC, then the uplink shared channel with the first TTI length for transmission, on the PCC is selected to carry the UCI, and when there is no uplink shared channel with the first TTI length for transmission, on the PCC, then an uplink shared channel with the first TTI length for transmission, on an SCC with the lowest carrier index among SCCs including the uplink shared channels with the first TTI length for transmission is selected to carry the UCI, where if the selected uplink shared channel is an uplink shared channel corresponding to an RAR grant, then the UCI is not transmitted; or when the selected uplink channel is the uplink control channel with the second TTI length for transmission, if there are a plurality of uplink control channels with the second TTI length for transmission, in the first TTI length, then the first or last uplink control channel with the second TTI length for transmission is selected to carry the UCI, or an uplink control channel with the second TTI length for transmission, which carries P-CSI is selected to carry P-CSI in the uplink channel which is not selected; if there is no uplink control channel with the second TTI length for transmission, which carries P-CSI, then the first or last uplink control channel with the second TTI length for transmission is selected to carry the P-CSI in the uplink channel which is not selected, and an uplink control channel with the second TTI length for transmission, which carries ACK/NACK and/or an SR is selected to carry ACK/NACK and/or an SR in the uplink channel which is not selected; if there is no uplink control channel with the second TTI length for transmission, which carries ACK/NACK and/or an SR, then the first or last uplink control channel with the second TTI length for transmission is selected to carry the ACK/NACK and/or the SR in the uplink channel which is not selected; and if there are a plurality of channels satisfying the condition above, then the first or last one of the plurality of channels satisfying the condition above is selected to carry the corresponding UCI in the uplink channel which is not selected; or when the selected uplink channel is the uplink shared channel with the second TTI length for transmission, if there are a plurality of uplink shared channels with the second TTI length for transmission, in the first TTI length, then the first or last one of the uplink shared channels with the second TTI length for transmission is selected to carry the UCI; or when a plurality of carriers are aggregated for the UE, then if there is an uplink shared channel with the second TTI length for transmission, on the PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs including the uplink shared channels with the second TTI length for transmission is selected to carry the UCI, and if there are a plurality of uplink shared channels with the second TTI length for transmission, on the selected carrier, then the first or last one of the uplink shared channels with the second TTI length for transmission is selected to carry the UCI; and if the selected uplink shared channel with the second TTI length for transmission is an uplink shared channel corresponding to an RAR grant, then the UCI is not transmitted.

In an implementation, the first determining module 501 is further configured:

to determine whether the sum of transmission power of the uplink channel with the first TTI length for transmission, and transmission power of the uplink channel with the second TTI length for transmission exceeds the highest transmission power allowed for the UE, and if so, to determine whether the transmission period of time of the uplink channel with the first TTI length for transmission overlaps with the transmission period of time of the uplink channel with the second TTI length for transmission; and if so, to select at least one uplink channel for transmission, under the preset method, and to drop the remaining uplink channel(s), or to transmit the remaining uplink channel(s) using puncturing; and/or to determine whether there is a support of simultaneous transmission of the uplink channel with the first TTI length for transmission, and the uplink channel with the second TTI length for transmission, and if not, to determine whether the transmission period of time of the uplink channel with the first TTI length for transmission overlaps with the transmission period of time of the uplink channel with the second TTI length for transmission; and if so, to select at least one uplink channel for transmission, under the preset method, and to drop the remaining uplink channel(s), or to transmit the remaining uplink channel(s) using puncturing; and/or to determine whether there is a support of simultaneous transmission of an uplink control channel with the first TTI length for transmission, and an uplink shared channel with the second TTI length for transmission, and/or simultaneous transmission of an uplink shared channel with the first TTI length for transmission, and an uplink control channel with the second TTI length for transmission, and if not, to determine whether the transmission period of time of the uplink channel with the first TTI length for transmission overlaps with the transmission period of time of the uplink channel with the second TTI length for transmission; and if so, to select at least one uplink channel for transmission, under the preset method, and to drop the remaining uplink channel(s), or to transmit the remaining uplink channel(s) using puncturing.

Figure 6:
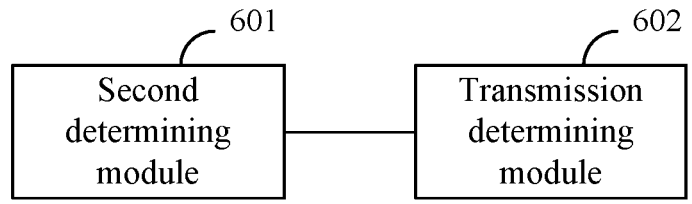
FIG. 6 is a schematic structural diagram of an apparatus for transmitting data at the eNB side according to an embodiment of the invention.

FIG. 6 is a schematic structural diagram of an apparatus for transmitting data at the network side according to an embodiment of the invention, and as illustrated, the apparatus can include:

a second determining module 601 configured to determine whether a transmission period of time of an uplink channel with a first TTI length for transmission overlaps with a transmission period of time of an uplink channel with a second TTI length for transmission; and a transmission determining module 602 configured, if so, to determine that a UE selects a kind of the uplink channels for transmission, under a preset method, and drops the other kind of uplink channels, or to transmit the other kind of uplink channels using puncturing.

In an implementation, the first TTI length is longer than the second TTI length.

In an implementation, the uplink channels are at least one kind of an uplink control channel and an uplink shared channel.

In an implementation, the preset method is one or a combination of the following methods:

an uplink control channel is selected, and an uplink shared channel is dropped or transmitted using puncturing;

the uplink channel with the second TTI length for transmission is selected, and the uplink channel with the first TTI length for transmission is dropped or transmitted using puncturing;

an uplink channel carrying UCI is selected, where if there are a plurality of uplink channels carrying UCI, then an uplink channel carrying UCI with a high priority is selected, and if there are a plurality of uplink channels carrying UCI with a high priority, then an uplink channel is reselected under the methods above, and the other uplink channels are dropped or transmitted using puncturing.

In an implementation, the transmission determining module is further configured:

to determine that the UE transfers UCI in the uplink channel which is not selected to the selected uplink channel, and transmits the UCI on the selected uplink channel, under a preset rule 1.

In an implementation, when an uplink channel (which includes at least one of an uplink shared channel or an uplink control channel) with the first TTI length for transmission, overlaps with an uplink control channel with the second TTI length for transmission, at least one of the following schemes is applied.

First Scheme

It is determined that the uplink control channel with the second TTI length for transmission is selected by the UE for transmission, the uplink channel with the first TTI length for transmission is dropped, or information in symbol(s), in the uplink channel with the first TTI length for transmission, which overlap with symbol(s) in the uplink control channel with the second TTI length for transmission is punctured.

Second Scheme

It is determined that the uplink channel with the first TTI length for transmission is selected by the UE, and the uplink control channel with the second TTI length for transmission is dropped.

Third Scheme

It is determined that an uplink channel carrying UCI is selected by the UE, and when there are a plurality of uplink channels carrying UCI, an uplink channel carrying UCI with a high priority is selected, and the other channels are dropped, or information in symbol(s), in the other channels, which overlap with symbol(s) in the selected uplink channel is punctured; and if the plurality of channels carry the UCI with the same priority, then an uplink channel(s) is selected from the plurality of channels carrying the UCI with the same priority as in the first scheme or the second scheme.

In an implementation, when the first scheme is applied, it is determined that UCI carried on the uplink channel with the first TTI length for transmission is transferred by the UE to and transmitted on the uplink control channel with the second TTI length for transmission under a preset rule 1 or a preset rule 2.

When the second scheme is applied, it is determined that UCI carried on the uplink control channel with the second TTI length for transmission is transferred by the UE to and transmitted on the uplink channel with the first TTI length for transmission, under the preset rule 1 or a preset rule 3.

When the third scheme is applied, it is determined that UCI in the uplink channel which is not selected is transferred by the UE to and transmitted on the selected uplink channel under the preset rule 1.

In an implementation, when the first scheme is applied, the preset rule 2 includes one or a combination of the following schemes:

all the UCI carried on the uplink channel with the first TTI length for transmission is transferred to and transmitted on the uplink control channel with the second TTI length for transmission;

when the UCI carried on the uplink channel with the first TTI length for transmission is ACK/NACK and/or an SR, the UCI is transferred to and transmitted on the uplink control channel with the second TTI length for transmission; and when the UCI carried on the uplink channel with the first TTI length for transmission includes P-CSI, the P-CSI carried on the uplink channel with the first TTI length for transmission is dropped, or when the uplink control channel with the second TTI length for transmission carries P-CSI, the P-CSI carried on the uplink channel with the first TTI length for transmission is dropped, and when the uplink control channel with the second TTI length for transmission does not include any P-CSI, the P-CSI carried on the uplink channel with the first TTI length for transmission is transferred to and transmitted on the uplink control channel with the second TTI length for transmission;

if there are a plurality of uplink control channels with the second TTI length for transmission, in a transmission period of time of the uplink channel with the first TTI length for transmission, then:

the first or last one of the uplink control channels with the second TTI length for transmission is selected to carry the UCI; or an uplink control channel with the second TTI length for transmission, which carries P-CSI is selected to carry P-CSI in the uplink channel with the first TTI length for transmission, and if there is no uplink control channel with the second TTI length for transmission, which carries P-CSI, then the first or last one of the uplink control channels with the second TTI length for transmission is selected to carry the P-CSI in the uplink channel with the first TTI length for transmission, and an uplink control channel with the second TTI length for transmission, which carries ACK/NACK and/or an SR is selected to carry ACK/NACK and/or an SR in the uplink channel with the first TTI length for transmission; if there is no uplink control channel with the second TTI length for transmission, which carries ACK/NACK and/or an SR, then the first or last one of the uplink control channels with the second TTI length for transmission is selected to carry the ACK/NACK and/or the SR in the uplink channel with the first TTI length for transmission; and if there are a plurality of channels satisfying the condition, then the first or last one of the plurality of channels satisfying the condition is selected to carry the corresponding UCI in the uplink channel with the first TTI length for transmission.

When the second scheme is applied, the preset rule 3 includes one or a combination of the following schemes:

all the UCI carried on the uplink control channel with the second TTI length for transmission is transferred to and transmitted on the uplink channel with the first TTI length for transmission;

when the UCI carried on the uplink control channel with the second TTI length for transmission is ACK/NACK and/or an SR, the UCI is transferred to and transmitted on the uplink channel with the first TTI length for transmission; and when the UCI carried on the uplink control channel with the second TTI length for transmission includes P-CSI, the P-CSI carried on the uplink control channel with the second TTI length for transmission is dropped, or if P-CSI is carried on the uplink channel with the first TTI length for transmission, then the P-CSI carried on the uplink control channel with the second TTI length for transmission is dropped, and if no P-CSI is carried on the uplink channel with the first TTI length for transmission, then the P-CSI carried on the uplink control channel with the second TTI length for transmission is transferred to and transmitted on the uplink channel with the first TTI length for transmission;

if there are both the uplink shared channel with the first TTI length for transmission, and the uplink control channel, with the first TTI length for transmission, then one of them is selected to carry the UCI, or a part of the UCI is carried on the uplink shared channel with the first TTI length for transmission, and the other part of the UCI is carried on the uplink control channel with the first TTI length for transmission; and/or if there are a plurality of uplink shared channels with the first TTI length for transmission, when there is an uplink shared channel with the first TTI length for transmission, on a PCC, then the uplink shared channel with the first TTI length for transmission, on the PCC is selected to carry the UCI, and when there is no uplink shared channel with the first TTI length for transmission, on the PCC, an uplink shared channel with the first TTI length for transmission, on an SCC with the lowest carrier index including the uplink shared channel with the first TTI length for transmission is selected to carry the UCI, where if the selected uplink shared channel is an uplink shared channel corresponding to an RAR grant, then the UCI is not transmitted.

When the third scheme is applied, when the selected uplink channel is the uplink control channel with the second TTI length for transmission, if there are a plurality of uplink control channels with the second TTI length for transmission, in a transmission period of time of the uplink channel with the first TTI length for transmission, then an uplink channel to carry the UCI is selected in the same scheme as in the preset rule 2; and when the selected uplink channel is the uplink channel with the first TTI length for transmission, if there are both the uplink shared channel, and the uplink control channel, with the first TTI length for transmission, or there are a plurality of uplink shared channels with the first TTI length for transmission, then a channel to carry the UCI is selected in the same scheme as in the preset rule 3.

In an implementation, when an uplink shared channel with the first TTI length for transmission overlaps with an uplink shared channel with the second TTI length for transmission, at least one of the following schemes is applied.

Fourth Scheme

The uplink shared channel with the second TTI length for transmission is selected for transmission, and the uplink shared channel with the first TTI length for transmission is dropped, or information in symbol(s) in the uplink shared channel with the first TTI length for transmission, which overlap with symbol(s) in the uplink shared channel with the second TTI length for transmission is punctured.

Fifth Scheme

The uplink shared channel with the first TTI length for transmission is selected for transmission, and the uplink shared channel with the second TTI length for transmission is dropped.

Sixth Scheme

An uplink channel carrying UCI is selected, and when there are a plurality of uplink channels carrying UCI, an uplink channel carrying UCI with a high priority is selected, and the other channels are dropped, or information in symbols, in the other channels, which overlap with symbols in the selected uplink channel is punctured; and if the plurality of channels carry the UCI with the same priority, then an uplink channel is selected from the plurality of channels carrying the UCI with the same priority as in the third scheme or the fourth scheme.

In an implementation, when the fourth scheme is applied, UCI carried on the uplink shared channel with the first TTI length for transmission is transferred to and transmitted on the uplink shared channel with the second TTI length for transmission under a preset rule 1 or a preset rule 4.

When the fifth scheme is applied, UCI carried on the uplink shared channel with the second TTI length for transmission is transferred to and transmitted on the uplink shared channel with the first TTI length for transmission under the preset rule 1 or a preset rule 5.

When the sixth scheme is applied, UCI in the uplink channel which is not selected is transferred to and transmitted on the selected uplink channel under the preset rule 1.

In an implementation, when the fourth scheme is applied, the preset rule 4 includes one or a combination of the following schemes:

all the UCI carried on the uplink shared channel with the first TTI length for transmission is transferred to and transmitted on the uplink shared channel with the second TTI length for transmission;

when the UCI carried on the uplink shared channel with the first TTI length for transmission is ACK/NACK and/or an SR, the UCI is transferred to and transmitted on the uplink shared channel with the second TTI length for transmission, and when the UCI carried on the uplink shared channel with the first TTI length for transmission includes P-CSI, the P-CSI carried on the uplink shared channel with the first TTI length for transmission is dropped, or if P-CSI is carried on the uplink shared channel with the second TTI length for transmission, then the P-CSI carried on the uplink shared channel with the first TTI length for transmission is dropped; and if no P-CSI is carried on the uplink shared channel with the second TTI length for transmission, then the P-CSI carried on the uplink shared channel with the first TTI length for transmission is transferred to and transmitted on the uplink shared channel with the second TTI length for transmission;

if there are a plurality of uplink shared channels with the second TTI length for transmission, in a transmission period of time of the uplink shared channel with the first TTI length for transmission, then the first or last one of the uplink shared channels with the second TTI length for transmission is selected to carry the UCI; or when a plurality of carriers are aggregated for the UE, if there is an uplink shared channel with the second TTI length for transmission, on a PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs including the uplink shared channels with the second TTI length for transmission is selected to carry the UCI, and if there are a plurality of uplink shared channels with the second TTI length for transmission, on the selected carrier, then the first or last one of the uplink shared channels with the second TTI length for transmission is selected to carry the UCI; and if the selected uplink shared channel with the second TTI length for transmission is an uplink shared channel corresponding to an RAR grant, then the UCI is not transmitted.

When the fifth scheme is applied, the preset rule 5 includes one or a combination of the following schemes:

all the UCI carried on the uplink shared channel with the second TTI length for transmission is transferred to and transmitted on the uplink shared channel with the first TTI length for transmission;

when the UCI carried on the uplink shared channel with the second TTI length for transmission is ACK/NACK and/or an SR, the UCI is transferred to and transmitted on the uplink shared channel with the first TTI length for transmission; and when the UCI carried on the uplink shared channel with the second TTI length for transmission includes P-CSI, the P-CSI carried on the uplink shared channel with the second TTI length for transmission is dropped, or if P-CSI is carried on the uplink shared channel with the first TTI length for transmission, then the P-CSI carried on the uplink shared channel with the second TTI length for transmission is dropped, and if no P-CSI is carried on the uplink shared channel with the first TTI length for transmission, then the P-CSI carried on the uplink shared channel with the second TTI length for transmission is transferred to and transmitted on the uplink shared channel with the first TTI length for transmission;

if there are a plurality of uplink shared channels with the first TTI length for transmission, then if there is an uplink shared channel with the first TTI length for transmission, on a PCC, then the uplink shared channel with the first TTI length for transmission, on the PCC is selected to carry UCI in the sPUSCH; if there is no uplink shared channel with the first TTI length for transmission, on the PCC, then an uplink shared channel with the first TTI length for transmission, on an SCC with the lowest carrier index among SCCs including the uplink shared channels with the first TTI length for transmission is selected to carry the UCI in the sPUSCH; and if the selected uplink shared channel with the first TTI length for transmission is an uplink shared channel corresponding to an RAR grant, then the UCI is not transmitted.

When the sixth scheme is applied, when the selected uplink channel is the uplink shared channel with the second TTI length for transmission, if there are a plurality of uplink shared channels with the second TTI length for transmission, in a transmission period of time of the uplink shared channel with the first TTI length for transmission, then a channel to carry the UCI is selected as in the scheme as in the preset rule 4; and when the selected uplink channel is the uplink shared channel with the first TTI length for transmission, if there are a plurality of uplink shared channels with the first TTI length for transmission, then a channel to carry the UCI is selected as in the scheme as in the preset rule 5.

In an implementation, when an uplink control channel with the first TTI length for transmission overlaps with an uplink shared channel with the second TTI length for transmission, at least one of the following schemes is applied.

Seventh Scheme

The uplink shared channel with the second TTI length for transmission is selected for transmission, and the uplink control channel with the first TTI length for transmission is dropped, or information in symbol(s) in the uplink control channel with the first TTI length for transmission, which overlap with symbol(s) in the uplink shared channel with the second TTI length for transmission is punctured.

Eighth Scheme

The uplink control channel with the first TTI length for transmission is selected for transmission, and the uplink shared channel with the second TTI length for transmission is dropped.

Ninth Scheme

An uplink channel carrying UCI is selected, and when there are a plurality of uplink channels carrying UCI, an uplink channel carrying UCI with a high priority is selected, and the other channels are dropped, or information in symbol(s), in the other channels, which overlap with symbol(s) in the selected uplink channel is punctured; and if the plurality of channels carry the UCI with the same priority, then an uplink channel(s) is selected from the plurality of channels carrying the UCI with the same priority as in the seventh scheme or the eighth scheme.

In an implementation, when the seventh scheme is applied, UCI carried on the uplink control channel with the first TTI length for transmission is transferred to and transmitted on the uplink shared channel with the second TTI length for transmission under a preset rule 1 or a preset rule 6.

When the eighth scheme is applied, if the uplink shared channel with the second TTI length for transmission carries UCI, then the UCI is transferred to and transmitted on the uplink control channel with the first TTI length for transmission under the preset rule 1 or a preset rule 7.

When the ninth scheme is applied, UCI in the uplink channel which is not selected is transferred to and transmitted on the selected uplink channel under the preset rule 1.

In an implementation, when the seventh scheme is applied, the preset rule 6 includes one or a combination of the following schemes:

all the UCI carried on the uplink control channel with the first TTI length for transmission is transferred to and transmitted on the uplink shared channel with the second TTI length for transmission;

when the UCI carried on the uplink control channel with the first TTI length for transmission is ACK/NACK and/or an SR, the UCI is transferred to and transmitted on the uplink shared channel with the second TTI length for transmission, and when the UCI carried on the uplink control channel with the first TTI length for transmission includes P-CSI, the P-CSI carried on the uplink control channel with the first TTI length for transmission is dropped, or if P-CSI is carried on the uplink shared channel with the second TTI length for transmission, then the P-CSI carried on the uplink control channel with the first TTI length for transmission is dropped; and if no P-CSI is carried on the uplink shared channel with the second TTI length for transmission, then the P-CSI carried on the uplink control channel with the first TTI length for transmission is transferred to and transmitted on the uplink shared channel with the second TTI length for transmission;

if there are a plurality of uplink shared channels with the second TTI length for transmission, in a transmission period of time of the uplink control channel with the first TTI length for transmission, then the first or last one of the uplink shared channels with the second TTI length for transmission is selected to carry the UCI; or when a plurality of carriers are aggregated for the UE, if there is an uplink shared channel with the second TTI length for transmission, on a PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs including the uplink shared channels with the second TTI length for transmission is selected to carry the UCI, and if there are a plurality of uplink shared channels with the second TTI length for transmission, on the selected carrier, then the first or last one of the uplink shared channels with the second TTI length for transmission is selected to carry the UCI; and if the selected uplink shared channel with the second TTI length for transmission is an uplink shared channel corresponding to an RAR grant, then the UCI is not transmitted.

When the eighth scheme is applied, the preset rule 7 includes one or a combination of the following schemes:

all the UCI carried on the uplink shared channel with the second TTI length for transmission is transferred to and transmitted on the uplink control channel with the first TTI length for transmission;

when the UCI carried on the uplink shared channel with the second TTI length for transmission is ACK/NACK and/or an SR, the UCI is transferred to and transmitted on the uplink control channel with the first TTI length for transmission; and when the UCI carried on the uplink shared channel with the second TTI length for transmission includes P-CSI, the P-CSI carried on the uplink shared channel with the second TTI length for transmission is dropped, or if P-CSI is carried on the uplink control channel with the first TTI length for transmission, then the P-CSI carried on the uplink shared channel with the second TTI length for transmission is dropped, and if no P-CSI is carried on the uplink control channel with the first TTI length for transmission, then the P-CSI carried on the uplink shared channel with the second TTI length for transmission is transferred to and transmitted on the uplink control channel with the first TTI length for transmission.

When the ninth scheme is applied, when the selected uplink channel is the uplink shared channel with the second TTI length for transmission, if there are a plurality of uplink shared channels with the second TTI length for transmission, in a transmission period of time of the uplink control channel with the first TTI length for transmission, then a channel to carry the UCI is selected as in the scheme in the preset rule 7.

In an implementation, the UCI priorities are sorted so that a UCI priority of an SR is higher than or equal to that of ACK/NACK, and a UCI priority of ACK/NACK is higher than that of P-CSI.

In an implementation, the preset rule 1 includes one or a combination of the following schemes:

UCI in the uplink channel which is not selected is transferred to and transmitted on the selected uplink channel;

when the UCI in the uplink channel which is not selected is ACK/NACK and/or an SR, the UCI is transferred to and transmitted on the selected uplink channel; and when the UCI in the uplink channel which is not selected includes P-CSI, the P-CSI in the uplink channel which is not selected is dropped, or if P-CSI is carried on the selected uplink channel, then the P-CSI in the uplink channel which is not selected is dropped, and if no P-CSI is carried on the selected uplink channel, then the P-CSI in the uplink channel which is not selected is transferred to and transmitted on the selected uplink channel;

when the selected uplink channel is an uplink shared channel with the first TTI length for transmission, and/or an uplink control channel with the first TTI length for transmission, if there are both the uplink shared channel with the first TTI length for transmission, and the uplink control channel with the first TTI length for transmission, then one of them is selected to carry the UCI, or a part of the UCI is carried on the uplink shared channel with the first TTI length for transmission, and the other part of the UCI is carried on the uplink control channel with the first TTI length for transmission; if there are a plurality of uplink shared channels with the first TTI length, then when there is an uplink shared channel with the first TTI length for transmission, on a PCC, then the uplink shared channel with the first TTI length for transmission, on the PCC is selected to carry the UCI, and when there is no uplink shared channel with the first TTI length for transmission, on the PCC, then an uplink shared channel with the first TTI length for transmission, on an SCC with the lowest carrier index including the uplink shared channel with the first TTI length for transmission is selected to carry the UCI, where if the selected uplink shared channel is an uplink shared channel corresponding to an RAR grant, then the UCI is not transmitted;

when the selected uplink channel is the uplink control channel with the second TTI length for transmission, if there are a plurality of uplink control channels with the second TTI length for transmission, in the first TTI length, then the first or last uplink control channel with the second TTI length for transmission is selected to carry the UCI, or an uplink control channel with the second TTI length for transmission, which carries P-CSI is selected to carry P-CSI in the uplink channel which is not selected; if there is no uplink control channel with the second TTI length for transmission, which carries P-CSI, then the first or last uplink control channel with the second TTI length for transmission is selected to carry the P-CSI in the uplink channel which is not selected, and an uplink control channel with the second TTI length for transmission, which carries ACK/NACK and/or an SR is selected to carry ACK/NACK and/or an SR in the uplink channel which is not selected; if there is no uplink control channel with the second TTI length for transmission, which carries ACK/NACK and/or an SR, then the first or last uplink control channel with the second TTI length for transmission is selected to carry the ACK/NACK and/or the SR in the uplink channel which is not selected; and if there are a plurality of channels satisfying the condition above, then the first or last one of the plurality of channels satisfying the condition above is selected to carry the corresponding UCI in the uplink channel which is not selected;

when the selected uplink channel is the uplink shared channel with the second TTI length for transmission, if there are a plurality of uplink shared channels with the second TTI length for transmission, in the first TTI length, then the first or last one of the uplink shared channels with the second TTI length for transmission is selected to carry the UCI; or when a plurality of carriers are aggregated for the UE, then if there is an uplink shared channel with the second TTI length for transmission, on the PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs including the uplink shared channels with the second TTI length for transmission is selected to carry the UCI, and if there are a plurality of uplink shared channels with the second TTI length for transmission, on the selected carrier, then the first or last one of the uplink shared channels with the second TTI length for transmission is selected to carry the UCI; and if the selected uplink shared channel with the second TTI length for transmission is an uplink shared channel corresponding to an RAR grant, then the UCI is not transmitted.

In an implementation, the second determining module 601 is further configured:

to determine whether the sum of transmission power of the uplink channel with the first TTI length for transmission, and transmission power of the uplink channel with the second TTI length for transmission exceeds the highest transmission power allowed for the UE, and if so, to determine whether the transmission period of time of the uplink channel with the first TTI length for transmission overlaps with the transmission period of time of the uplink channel with the second TTI length for transmission; and if so, to select at least one uplink channel for transmission, under the preset method, and to drop the remaining uplink channel(s), or to transmit the remaining uplink channel(s) using puncturing; and/or to determine whether there is a support of simultaneous transmission of the uplink channel with the first TTI length for transmission, and the uplink channel with the second TTI length for transmission, and if not, to determine whether the transmission period of time of the uplink channel with the first TTI length for transmission overlaps with the transmission period of time of the uplink channel with the second TTI length for transmission; and if so, to select at least one uplink channel for transmission, under the preset method, and to drop the remaining uplink channel(s), or to transmit the remaining uplink channel(s) using puncturing; and/or to determine whether there is a support of simultaneous transmission of an uplink control channel with the first TTI length for transmission, and an uplink shared channel with the second TTI length for transmission, and/or simultaneous transmission of an uplink shared channel with the first TTI length for transmission, and an uplink control with the second TTI length for transmission, and if not, to determine whether the transmission period of time of the uplink channel with the first TTI length for transmission overlaps with the transmission period of time of the uplink channel with the second TTI length for transmission; and if so, to select at least one uplink channel for transmission, under the preset method, and to drop the remaining uplink channel(s), or to transmit the remaining uplink channel(s) using puncturing.

For the sake of a convenient description, the respective components of the apparatuses above have been functionally described respectively as respective modules or units. Of course, the functions of the respective modules or units can be performed in the same one or more pieces of software or hardware in an implementation of the invention.

The technical solutions according to the embodiments of the invention can be embodied as follows.

Figure 7:
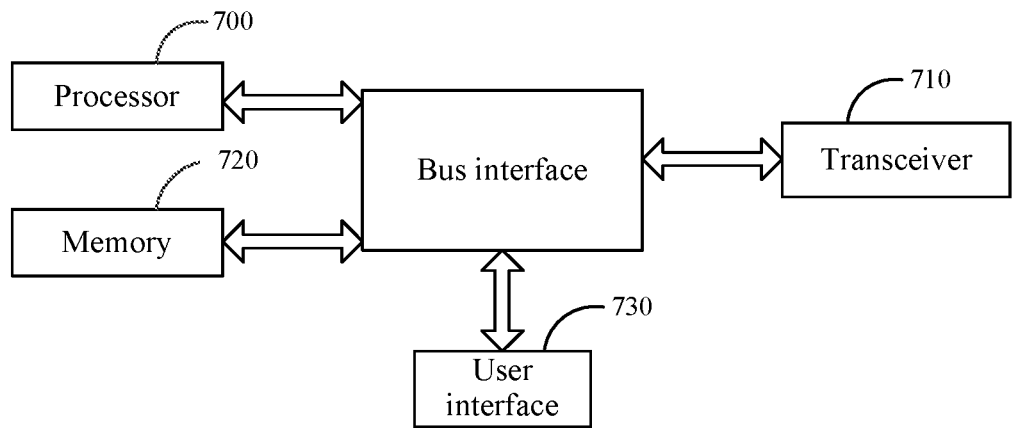
FIG. 7 is a schematic structural diagram of a UE according to an embodiment of the invention.

FIG. 7 is a schematic structural diagram of a UE, and as illustrated, the UE includes:

a processor 700 configured to read and execute program in a memory 720 to determine whether a transmission period of time of an uplink channel with a first TTI length for transmission overlaps with a transmission period of time of an uplink channel with a second TTI length for transmission; and a transceiver 710 configured to receive and transmit data under the control of the processor 700.

when it is determined that the transmission period of time of an uplink channel with the first TTI length for transmission overlaps with the transmission period of time of an uplink channel with the second TTI length for transmission, the transceiver is configured to select at least one uplink channel for transmission, under a preset method, and to drop the remaining uplink channel(s), or to transmit the remaining uplink channel(s) using puncturing.

In an implementation, the first TTI length is longer than the second TTI length.

In an implementation, the uplink channel is an uplink control channel or an uplink shared channel.

In an implementation, the preset method is one or a combination of the following methods:

an uplink control channel is selected, and an uplink shared channel is dropped or transmitted using puncturing;

the uplink channel with the second TTI length for transmission is selected, and the uplink channel with the first TTI length for transmission is dropped or transmitted using puncturing;

an uplink channel carrying UCI is selected, where if there are a plurality of uplink channels carrying UCI, then an uplink channel carrying UCI with a high priority is selected, and if there are a plurality of uplink channels carrying UCI with a high priority, then an uplink channel is reselected under the methods above, and the other uplink channels is dropped or transmitted using puncturing.

In an implementation, the processor is further configured:

to transfer UCI in the uplink channel which is not selected to the selected uplink channel, and to transmit the UCI on the selected uplink channel, under a preset rule 1.

In an implementation, when an uplink channel (which includes at least one of an uplink shared channel or an uplink control channel) with the first TTI length for transmission, overlaps with an uplink control channel with the second TTI length for transmission, at least one of the following schemes is applied.

First Scheme

The uplink control channel with the second TTI length for transmission is selected for transmission, the uplink channel with the first TTI length for transmission is dropped, or information in symbol(s), in the uplink channel with the first TTI length for transmission, which overlap with symbol(s) in the uplink control channel with the second TTI length for transmission is punctured;

Second Scheme

The uplink channel with the first TTI length for transmission is selected, and the uplink control channel with the second TTI length for transmission is dropped.

Third Scheme

An uplink channel carrying UCI is selected, and when there are a plurality of uplink channels carrying UCI, an uplink channel carrying UCI with a high priority is selected, and the other channel(s) are dropped, or information in symbol(s), in the other channel(s), which overlap with symbol(s) in the selected uplink channel is punctured; and if the plurality of channels carry the UCI with the same priority, then an uplink channel(s) is selected from the plurality of channels carrying the UCI with the same priority as in the first scheme or the second scheme.

In an implementation, when the first scheme is applied, UCI carried on the uplink channel with the first TTI length for transmission is transferred to and transmitted on the uplink control channel with the second TTI length for transmission under a preset rule 1 or a preset rule 2.

When the second scheme is applied, UCI carried on the uplink control channel with the second TTI length for transmission is transferred to and transmitted on the uplink channel with the first TTI length for transmission, under the preset rule 1 or a preset rule 3.

When the third scheme is applied, UCI in the uplink channel which is not selected is transferred to and transmitted on the selected uplink channel under the preset rule 1.

In an implementation, when the first scheme is applied, the preset rule 2 includes one or a combination of the following schemes:

all the UCI carried on the uplink channel with the first TTI length for transmission is transferred to and transmitted on the uplink control channel with the second TTI length for transmission;

when the UCI carried on the uplink channel with the first TTI length for transmission is ACK/NACK and/or an SR, the UCI is transferred to and transmitted on the uplink control channel with the second TTI length for transmission; and when the UCI carried on the uplink channel with the first TTI length for transmission includes P-CSI, the P-CSI carried on the uplink channel with the first TTI length for transmission is dropped, or when the uplink control channel with the second TTI length for transmission includes P-CSI, the P-CSI carried on the uplink channel with the first TTI length for transmission is dropped, and when the uplink control channel with the second TTI length for transmission does not include any P-CSI, the P-CSI carried on the uplink channel with the first TTI length for transmission is transferred to and transmitted on the uplink control channel with the second TTI length for transmission;

if there are a plurality of uplink control channels with the second TTI length for transmission, in a transmission period of time of the uplink channel with the first TTI length for transmission, then:

the first or last one of the uplink control channels with the second TTI length for transmission is selected to carry the UCI; or an uplink control channel with the second TTI length for transmission, which carries P-CSI is selected to carry P-CSI in the uplink channel with the first TTI length for transmission, and if there is no uplink control channel with the second TTI length for transmission, which carries P-CSI, then the first or last one of the uplink control channels with the second TTI length for transmission is selected to carry the P-CSI in the uplink channel with the first TTI length for transmission, and an uplink control channel with the second TTI length for transmission, which carries ACK/NACK and/or an SR is selected to carry ACK/NACK and/or an SR in the uplink channel with the first TTI length for transmission; if there is no uplink control channel with the second TTI length for transmission, which carries ACK/NACK and/or an SR, then the first or last one of the uplink control channels with the second TTI length for transmission is selected to carry the ACK/NACK and/or the SR in the uplink channel with the first TTI length for transmission; and if there are a plurality of channels satisfying the condition, then the first or last one of the plurality of channels satisfying the condition is selected to carry the corresponding UCI in the uplink channel with the first TTI length for transmission.

When the second scheme is applied, the preset rule 3 includes one or a combination of the following schemes:

all the UCI carried on the uplink control channel with the second TTI length for transmission is transferred to and transmitted on the uplink channel with the first TTI length for transmission;

when the UCI carried on the uplink control channel with the second TTI length for transmission is ACK/NACK and/or an SR, the UCI is transferred to and transmitted on the uplink channel with the first TTI length for transmission; and when the UCI carried on the uplink control channel with the second TTI length for transmission includes P-CSI, the P-CSI carried on the uplink control channel with the second TTI length for transmission is dropped, or if P-CSI is carried on the uplink channel with the first TTI length for transmission, then the P-CSI carried on the uplink control channel with the second TTI length for transmission is dropped, and if no P-CSI is carried on the uplink channel with the first TTI length for transmission, then the P-CSI carried on the uplink control channel with the second TTI length for transmission is transferred to and transmitted on the uplink channel with the first TTI length for transmission;

if there are both the uplink shared channel with the first TTI length for transmission, and the uplink control channel, with the first TTI length for transmission, then one of them is selected to carry the UCI, or a part of the UCI is carried on the uplink shared channel with the first TTI length for transmission, and the other part of the UCI is carried on the uplink control channel with the first TTI length for transmission; and/or if there are a plurality of uplink shared channels with the first TTI length for transmission, when there is an uplink shared channel with the first TTI length for transmission, on a PCC, then the uplink shared channel with the first TTI length for transmission, on the PCC is selected to carry the UCI, and when there is no uplink shared channel with the first TTI length for transmission, on the PCC, an uplink shared channel with the first TTI length for transmission, on an SCC with the lowest carrier index including the uplink shared channel with the first TTI length for transmission is selected to carry the UCI, where if the selected uplink shared channel is an uplink shared channel corresponding to an RAR grant, then the UCI is not transmitted.

When the third scheme is applied, when the selected uplink channel is the uplink control channel with the second TTI length for transmission, if there are a plurality of uplink control channels with the second TTI length for transmission, in a transmission period of time of the uplink channel with the first TTI length for transmission, then an uplink channel to carry the UCI is selected in the same scheme as in the preset rule 2; and when the selected uplink channel is the uplink channel with the first TTI length for transmission, if there are both the uplink shared channel, and the uplink control channel, with the first TTI length for transmission, or there are a plurality of uplink shared channels with the first TTI length for transmission, then a channel to carry the UCI is selected in the same scheme as in the preset rule 3.

In an implementation, when an uplink shared channel with the first TTI length for transmission overlaps with an uplink shared channel with the second TTI length for transmission, at least one of the following schemes is applied.

Fourth Scheme

The uplink shared channel with the second TTI length for transmission is selected for transmission, and the uplink shared channel with the first TTI length for transmission is dropped, or information in symbol(s) in the uplink shared channel with the first TTI length for transmission, which overlap with symbol(s) in the uplink shared channel with the second TTI length for transmission is punctured.

Fifth Scheme

The uplink shared channel with the first TTI length for transmission is selected for transmission, and the uplink shared channel with the second TTI length for transmission is dropped.

Sixth Scheme:

An uplink channel carrying UCI is selected, and when there are a plurality of uplink channels carrying UCI, an uplink channel carrying UCI with a high priority is selected, and the other channel(s) are dropped, or information in symbol(s), in the other channel(s), which overlap with symbol(s) in the selected uplink channel is punctured; and if the plurality of channels carry the UCI with the same priority, then an uplink channel (s) is selected from the plurality of channels carrying the UCI with the same priority as in the third scheme or the fourth scheme.

In an implementation, when the fourth scheme is applied, UCI carried on the uplink shared channel with the first TTI length for transmission is transferred to and transmitted on the uplink shared channel with the second TTI length for transmission under a preset rule 1 or a preset rule 4.

When the fifth scheme is applied, UCI carried on the uplink shared channel with the second TTI length for transmission is transferred to and transmitted on the uplink shared channel with the first TTI length for transmission under the preset rule 1 or a preset rule 5.

When the sixth scheme is applied, UCI in the uplink channel which is not selected is transferred to and transmitted on the selected uplink channel under the preset rule 1.

In an implementation, when the fourth scheme is applied, the preset rule 4 includes one or a combination of the following schemes:

all the UCI carried on the uplink shared channel with the first TTI length for transmission is transferred to and transmitted on the uplink shared channel with the second TTI length for transmission;

when the UCI carried on the uplink shared channel with the first TTI length for transmission is ACK/NACK and/or an SR, the UCI is transferred to and transmitted on the uplink shared channel with the second TTI length for transmission, and when the UCI carried on the uplink shared channel with the first TTI length for transmission includes P-CSI, the P-CSI carried on the uplink shared channel with the first TTI length for transmission is dropped, or if P-CSI is carried on the uplink shared channel with the second TTI length for transmission, then the P-CSI carried on the uplink shared channel with the first TTI length for transmission is dropped; and if no P-CSI is carried on the uplink shared channel with the second TTI length for transmission, then the P-CSI carried on the uplink shared channel with the first TTI length for transmission is transferred to and transmitted on the uplink shared channel with the second TTI length for transmission;

if there are a plurality of uplink shared channels with the second TTI length for transmission, in a transmission period of time of the uplink shared channel with the first TTI length for transmission, then the first or last one of the uplink shared channels with the second TTI length for transmission is selected to carry the UCI; or when a plurality of carriers are aggregated for the UE, if there is an uplink shared channel with the second TTI length for transmission, on a PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs including the uplink shared channels with the second TTI length for transmission is selected to carry the UCI, and if there are a plurality of uplink shared channels with the second TTI length for transmission, on the selected carrier, then the first or last one of the uplink shared channels with the second TTI length for transmission is selected to carry the UCI; and if the selected uplink shared channel with the second TTI length for transmission is an uplink shared channel corresponding to an RAR grant, then the UCI is not transmitted.

When the fifth scheme is applied, the preset rule 5 includes one or a combination of the following schemes:

all the UCI carried on the uplink shared channel with the second TTI length for transmission is transferred to and transmitted on the uplink shared channel with the first TTI length for transmission;

when the UCI carried on the uplink shared channel with the second TTI length for transmission is ACK/NACK and/or an SR, the UCI is transferred to and transmitted on the uplink shared channel with the first TTI length for transmission; and when the UCI carried on the uplink shared channel with the second TTI length for transmission includes P-CSI, the P-CSI carried on the uplink shared channel with the second TTI length for transmission is dropped, or if P-CSI is carried on the uplink shared channel with the first TTI length for transmission, then the P-CSI carried on the uplink shared channel with the second TTI length for transmission is dropped, and if no P-CSI is carried on the uplink shared channel with the first TTI length for transmission, then the P-CSI carried on the uplink shared channel with the second TTI length for transmission is transferred to and transmitted on the uplink shared channel with the first TTI length for transmission;

if there are a plurality of uplink shared channels with the first TTI length for transmission, then if there is an uplink shared channel with the first TTI length for transmission, on a PCC, then the uplink shared channel with the first TTI length for transmission, on the PCC is selected to carry UCI in the sPUSCH; if there is no uplink shared channel with the first TTI length for transmission, on the PCC, then an uplink shared channel with the first TTI length for transmission, on an SCC with the lowest carrier index among SCCs including the uplink shared channels with the first TTI length for transmission is selected to carry the UCI in the sPUSCH; and if the selected uplink shared channel with the first TTI length for transmission is an uplink shared channel corresponding to an RAR grant, then the UCI is not transmitted;

When the sixth scheme is applied, when the selected uplink channel is the uplink shared channel with the second TTI length for transmission, if there are a plurality of uplink shared channels with the second TTI length for transmission, in a transmission period of time of the uplink shared channel with the first TTI length for transmission, then a channel to carry the UCI is selected as in the scheme as in the preset rule 4; and when the selected uplink channel is the uplink shared channel with the first TTI length for transmission, if there are a plurality of uplink shared channels with the first TTI length for transmission, then a channel to carry the UCI is selected as in the scheme as in the preset rule 5.

In an implementation, when an uplink control channel with the first TTI length for transmission overlaps with an uplink shared channel with the second TTI length for transmission, at least one of the following schemes is applied.

Seventh Scheme

The uplink shared channel with the second TTI length for transmission is selected for transmission, and the uplink control channel with the first TTI length for transmission is dropped, or information in symbol(s) in the uplink control channel with the first TTI length for transmission, which overlap with symbol(s) in the uplink shared channel with the second TTI length for transmission is punctured.

Eighth Scheme

The uplink control channel with the first TTI length for transmission is selected for transmission, and the uplink shared channel with the second TTI length for transmission is dropped.

Ninth Scheme

An uplink channel carrying UCI is selected, and when there are a plurality of uplink channels carrying UCI, an uplink channel carrying UCI with a high priority is selected, and the other channel(s) are dropped, or information in symbol(s), in the other channel(s), which overlap with symbol(s) in the selected uplink channel is punctured; and if the plurality of channels carry the UCI with the same priority, then an uplink channel(s) is selected from the plurality of channels carrying the UCI with the same priority in the seventh scheme or the eighth scheme.

In an implementation, when the seventh scheme is applied, UCI carried on the uplink control channel with the first TTI length for transmission is transferred to and transmitted on the uplink shared channel with the second TTI length for transmission under a preset rule 1 or a preset rule 6.

When the eighth scheme is applied, if the uplink shared channel with the second TTI length for transmission carries UCI, then the UCI is transferred to and transmitted on the uplink control channel with the first TTI length for transmission under the preset rule 1 or a preset rule 7.

When the ninth scheme is applied, UCI in the uplink channel which is not selected is transferred to and transmitted on the selected uplink channel under the preset rule 1.

In an implementation, when the seventh scheme is applied, the preset rule 6 includes one or a combination of the following schemes:

all the UCI carried on the uplink control channel with the first TTI length for transmission is transferred to and transmitted on the uplink shared channel with the second TTI length for transmission;

when the UCI carried on the uplink control channel with the first TTI length for transmission is ACK/NACK and/or an SR, the UCI is transferred to and transmitted on the uplink shared channel with the second TTI length for transmission, and when the UCI carried on the uplink control channel with the first TTI length for transmission includes P-CSI, the P-CSI carried on the uplink control channel with the first TTI length for transmission is dropped, or if P-CSI is carried on the uplink shared channel with the second TTI length for transmission, then the P-CSI carried on the uplink control channel with the first TTI length for transmission is dropped; and if no P-CSI is carried on the uplink shared channel with the second TTI length for transmission, then the P-CSI carried on the uplink control channel with the first TTI length for transmission is transferred to and transmitted on the uplink shared channel with the second TTI length for transmission;

if there are a plurality of uplink shared channels with the second TTI length for transmission, in a transmission period of time of the uplink control channel with the first TTI length for transmission, then the first or last one of the uplink shared channels with the second TTI length for transmission is selected to carry the UCI; or when a plurality of carriers are aggregated for the UE, if there is an uplink shared channel with the second TTI length for transmission, on a PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs including the uplink shared channels with the second TTI length for transmission is selected to carry the UCI, and if there are a plurality of uplink shared channels with the second TTI length for transmission, on the selected carrier, then the first or last one of the uplink shared channels with the second TTI length for transmission is selected to carry the UCI; and if the selected uplink shared channel with the second TTI length for transmission is an uplink shared channel corresponding to an RAR grant, then the UCI is not transmitted.

When the eighth scheme is applied, the preset rule 7 includes one or a combination of the following schemes:

all the UCI carried on the uplink shared channel with the second TTI length for transmission is transferred to and transmitted on the uplink control channel with the first TTI length for transmission;

when the UCI carried on the uplink shared channel with the second TTI length for transmission is ACK/NACK and/or an SR, the UCI is transferred to and transmitted on the uplink control channel with the first TTI length for transmission; and when the UCI carried on the uplink shared channel with the second TTI length for transmission includes P-CSI, the P-CSI carried on the uplink shared channel with the second TTI length for transmission is dropped, or if P-CSI is carried on the uplink control channel with the first TTI length for transmission, then the P-CSI carried on the uplink shared channel with the second TTI length for transmission is dropped, and if no P-CSI is carried on the uplink control channel with the first TTI length for transmission, then the P-CSI carried on the uplink shared channel with the second TTI length for transmission is transferred to and transmitted on the uplink control channel with the first TTI length for transmission.

When the ninth scheme is applied, when the selected uplink channel is the uplink shared channel with the second TTI length for transmission, if there are a plurality of uplink shared channels with the second TTI length for transmission, in a transmission period of time of the uplink control channel with the first TTI length for transmission, then a channel to carry the UCI is selected as in the scheme in the preset rule 7.

In an implementation, the UCI priorities are sorted so that a UCI priority of an SR is higher than or equal to that of ACK/NACK, a UCI priority of ACK/NACK is higher than that of P-CSI.

In an implementation, the preset rule 1 includes one or a combination of the following schemes:

UCI in the uplink channel which is not selected is transferred to and transmitted on the selected uplink channel;

when the UCI in the uplink channel which is not selected is ACK/NACK and/or an SR, the UCI is transferred to and transmitted on the selected uplink channel; and when the UCI in the uplink channel which is not selected includes P-CSI, the P-CSI in the uplink channel which is not selected is dropped, or if P-CSI is carried on the selected uplink channel, then the P-CSI in the uplink channel which is not selected is dropped, and if no P-CSI is carried on the selected uplink channel, then the P-CSI in the uplink channel which is not selected is transferred to and transmitted on the selected uplink channel;

when the selected uplink channel is an uplink shared channel with the first TTI length for transmission, and/or an uplink control channel with the first TTI length for transmission, if there are both the uplink shared channel with the first TTI length for transmission, and the uplink control channel with the first TTI length for transmission, then one of them is selected to carry the UCI, or a part of the UCI is carried on the uplink shared channel with the first TTI length for transmission, and the other part of the UCI is carried on the uplink control channel with the first TTI length for transmission; if there are a plurality of uplink shared channels with the first TTI length, then when there is an uplink shared channel with the first TTI length for transmission, on a PCC, then the uplink shared channel with the first TTI length for transmission, on the PCC is selected to carry the UCI, and when there is no uplink shared channel with the first TTI length for transmission, on the PCC, then an uplink shared channel with the first TTI length for transmission, on an SCC with the lowest carrier index including the uplink shared channel with the first TTI length for transmission is selected to carry the UCI, where if the selected uplink shared channel is an uplink shared channel corresponding to an RAR grant, then the UCI is not transmitted;

when the selected uplink channel is the uplink control channel with the second TTI length for transmission, if there are a plurality of uplink control channels with the second TTI length for transmission, in the first TTI length, then the first or last uplink control channel with the second TTI length for transmission is selected to carry the UCI, or an uplink control channel with the second TTI length for transmission, which carries P-CSI is selected to carry P-CSI in the uplink channel which is not selected; if there is no uplink control channel with the second TTI length for transmission, which carries P-CSI, then the first or last uplink control channel with the second TTI length for transmission is selected to carry the P-CSI in the uplink channel which is not selected, and an uplink control channel with the second TTI length for transmission, which carries ACK/NACK and/or an SR is selected to carry ACK/NACK and/or an SR in the uplink channel which is not selected; if there is no uplink control channel with the second TTI length for transmission, which carries ACK/NACK and/or an SR, then the first or last uplink control channel with the second TTI length for transmission is selected to carry the ACK/NACK and/or the SR in the uplink channel which is not selected; and if there are a plurality of channels satisfying the condition above, then the first or last one of the plurality of channels satisfying the condition above is selected to carry the corresponding UCI in the uplink channel which is not selected;

when the selected uplink channel is the uplink shared channel with the second TTI length for transmission, if there are a plurality of uplink shared channels with the second TTI length for transmission, in the first TTI length, then the first or last one of the uplink shared channels with the second TTI length for transmission is selected to carry the UCI; or when a plurality of carriers are aggregated for the UE, then if there is an uplink shared channel with the second TTI length for transmission, on the PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs including the uplink shared channels with the second TTI length for transmission is selected to carry the UCI, and if there are a plurality of uplink shared channels with the second TTI length for transmission, on the selected carrier, then the first or last one of the uplink shared channels with the second TTI length for transmission is selected to carry the UCI; and if the selected uplink shared channel with the second TTI length for transmission is an uplink shared channel corresponding to an RAR grant, then the UCI is not transmitted.

In an implementation, the processor is further configured:

to determine whether the sum of transmission power of the uplink channel with the first TTI length for transmission, and transmission power of the uplink channel with the second TTI length for transmission exceeds the highest transmission power allowed for the UE, and if so, to determine whether the transmission period of time of the uplink channel with the first TTI length for transmission overlaps with the transmission period of time of the uplink channel with the second TTI length for transmission; and if so, to select at least one uplink channel for transmission, under the preset method, and to drop the remaining uplink channel(s), or to transmit the remaining uplink channel(s) using puncturing; and/or to determine whether there is a support of simultaneous transmission of the uplink channel with the first TTI length for transmission, and the uplink channel with the second TTI length for transmission, and if not, to determine whether the transmission period of time of the uplink channel with the first TTI length for transmission overlaps with the transmission period of time of the uplink channel with the second TTI length for transmission; and if so, to select at least one uplink channel for transmission, under the preset method, and to drop the remaining uplink channel(s), or to transmit the remaining uplink channel(s) using puncturing; and/or to determine whether there is a support of simultaneous transmission of an uplink control channel with the first TTI length for transmission, and an uplink shared channel with the second TTI length for transmission, and/or simultaneous transmission of an uplink shared channel with the first TTI length for transmission, and an uplink control channel with the second TTI length for transmission, and if not, to determine whether the transmission period of time of the uplink channel with the first TTI length for transmission overlaps with the transmission period of time of the uplink channel with the second TTI length for transmission; and if so, to select at least one uplink channel for transmission, under the preset method, and to drop the remaining uplink channel(s), or to transmit the remaining uplink channel(s) using puncturing.

Here in FIG. 7, the bus architecture can include any number of interconnecting buses and bridges to particularly link together various circuits including one or more processors represented by the processor 700, and one or more memories represented by the memory 720. The bus architecture can further link together various other circuits, e.g., a peripheral device, a manostat, a power management circuit, etc., all of which are well known in the art, so a further description thereof is omitted in this context. The bus interface serves as an interface. The transceiver 710 can be a number of elements, e.g., a transmitter and a receiver, which are units for communication with various other devices on a transmission medium. For different user equipments, the user interface 730 can also be an interface via which devices are connected internally and externally as needed, and the connected devices include but are not limited to a keypad, a monitor, a speaker, a microphone, a joystick, etc.

The processor 700 is responsible for managing the bus architecture and performing processes, and the memory 720 can store data for use by the processor 700 in performing the operations.

Figure 8:
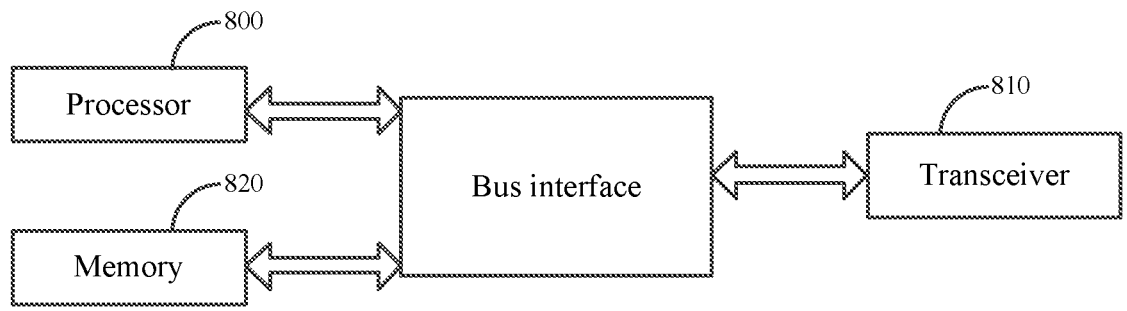
FIG. 8 is a schematic structural diagram of an eNB according to an embodiment of the invention.

FIG. 8 is a schematic structural diagram of an eNB, and as illustrated, the eNB includes:

a processor 800 configured to read and execute program in a memory to perform the following operations:

determining whether a transmission period of time of an uplink channel with a first TTI length for transmission overlaps with a transmission period of time of an uplink channel with a second TTI length for transmission; and if so, determining that a UE selects at least one uplink channel for transmission, under a preset method, and drops the remaining uplink channel(s), or to transmit the remaining uplink channel(s) using puncturing; and a transceiver 810 configured to receive and transmit data under the control of the processor 800 in order to perform the following operations:

transmitting data according to a processing result of the processor.

In an implementation, the first TTI length is longer than the second TTI length.

In an implementation, the uplink channel(s) are at least one kind of an uplink control channel and an uplink shared channel.

In an implementation, the preset method is one or a combination of the following methods:

an uplink control channel is selected, and an uplink shared channel is dropped or transmitted using puncturing;

the uplink channel with the second TTI length for transmission is selected, and the uplink channel with the first TTI length for transmission is dropped or transmitted using puncturing;

an uplink channel carrying UCI is selected, where if there are a plurality of uplink channels carrying UCI, then an uplink channel carrying UCI with a high priority is selected, and if there are a plurality of uplink channels carrying UCI with a high priority, then an uplink channel is selected under the methods above, and the other uplink channels are dropped or transmitted using puncturing.

In an implementation, the processor is further configured:

to determine that the UE transfers UCI in the uplink channel which is not selected to the selected uplink channel, and transmits the UCI on the selected uplink channel, under a preset rule 1.

In an implementation, when an uplink shared channel with the first TTI length for transmission, and/or an uplink control channel with the first TTI length for transmission overlaps with an uplink control channel with the second TTI length for transmission, at least one of the following schemes is applied.

First Scheme

It is determined that the uplink control channel with the second TTI length for transmission is selected by the UE for transmission, the uplink shared channel with the first TTI length for transmission, and/or the uplink control channel with the first TTI length for transmission is dropped, or information in symbol(s), in the uplink shared channel with the first TTI length for transmission, and/or the uplink control channel with the first TTI length for transmission, which overlap with symbol(s) in the uplink control channel with the second TTI length for transmission is punctured.

Second Scheme

It is determined that the uplink shared channel with the first TTI length for transmission, and/or the uplink control channel with the first TTI length for transmission is selected, and the uplink control channel with the second TTI length for transmission is dropped.

Third Scheme

It is determined that an uplink channel carrying UCI is selected, and when there are a plurality of uplink channels carrying UCI, an uplink channel carrying UCI with a high priority is selected, and the other channels are dropped, or information in symbol(s), in the other channels, which overlap with symbol(s) in the selected uplink channel is punctured; and if the plurality of channels carry the UCI with the same priority, then an uplink channel is selected from the plurality of channels carrying the UCI with the same priority as in the first scheme or the second scheme.

In an implementation, when the first scheme is applied, it is determined that UCI carried on the uplink shared channel with the first TTI length for transmission, and/or the uplink control channel with the first TTI length for transmission is transferred by the UE to and transmitted on the uplink control channel with the second TTI length for transmission under a preset rule 1 or a preset rule 2.

When the second scheme is applied, it is determined that UCI carried on the uplink control channel with the second TTI length for transmission is transferred by the UE to and transmitted on the uplink shared channel with the first TTI length for transmission, and/or the uplink control channel with the first TTI length for transmission, under the preset rule 1 or a preset rule 3.

When the third scheme is applied, it is determined that UCI in the uplink channel which is not selected is transferred by the UE to and transmitted on the selected uplink channel under the preset rule 1.

In an implementation, when the first scheme is applied, the preset rule 2 includes one or a combination of the following schemes:

all the UCI carried on the uplink shared channel with the first TTI length for transmission, and/or the uplink control channel with the first TTI length for transmission is transferred to and transmitted on the uplink control channel with the second TTI length for transmission;

when the UCI carried on the uplink shared channel with the first TTI length for transmission, and/or the uplink control channel with the first TTI length for transmission is ACK/NACK and/or an SR, the UCI is transferred to and transmitted on the uplink control channel with the second TTI length for transmission; and when the UCI carried on the uplink shared channel with the first TTI length for transmission, and/or the uplink control channel with the first TTI length for transmission includes P-CSI, the P-CSI carried on the uplink shared channel with the first TTI length for transmission, and/or the uplink control channel with the first TTI length for transmission is dropped, or when the uplink control channel with the second TTI length for transmission includes P-CSI, the P-CSI carried on the uplink shared channel with the first TTI length for transmission, and/or the uplink control channel with the first TTI length for transmission is dropped, and when the uplink control channel with the second TTI length for transmission does not include any P-CSI, the P-CSI carried on the uplink shared channel with the first TTI length for transmission, and/or the uplink control channel with the first TTI length for transmission is transferred to and transmitted on the uplink control channel with the second TTI length for transmission;

if there are a plurality of uplink control channels with the second TTI length for transmission, in a transmission period of time of the uplink shared channel with the first TTI length for transmission, and/or the uplink control channel with the first TTI length for transmission, then:

the first or last one of the uplink control channels with the second TTI length for transmission is selected to carry the UCI; or an uplink control channel with the second TTI length for transmission, which carries P-CSI is selected to carry P-CSI in the uplink shared channel with the first TTI length for transmission, and/or the uplink control channel with the first TTI length for transmission, and if there is no uplink control channel with the second TTI length for transmission, which carries P-CSI, then the first or last one of the uplink control channels with the second TTI length for transmission is selected to carry the P-CSI in the uplink shared channel with the first TTI length for transmission, and/or the uplink control channel with the first TTI length for transmission, and an uplink control channel with the second TTI length for transmission, which carries ACK/NACK and/or an SR is selected to carry ACK/NACK and/or an SR in the uplink shared channel with the first TTI length for transmission, and/or the uplink control channel with the first TTI length for transmission; if there is no uplink control channel with the second TTI length for transmission, which carries ACK/NACK and/or an SR, then the first or last one of the uplink control channels with the second TTI length for transmission is selected to carry the ACK/NACK and/or the SR in the uplink shared channel with the first TTI length for transmission, and/or the uplink control channel with the first TTI length for transmission; and if there are a plurality of channels satisfying the condition, then the first or last one of the plurality of channels satisfying the condition is selected to carry the corresponding UCI in the uplink shared channel with the first TTI length for transmission, and/or the uplink control channel with the first TTI length for transmission.

When the second scheme is applied, the preset rule 3 includes one or a combination of the following schemes:

all the UCI carried on the uplink control channel with the second TTI length for transmission is transferred to and transmitted on the uplink shared channel with the first TTI length for transmission, and/or the uplink control channel with the first TTI length for transmission;

when the UCI carried on the uplink control channel with the second TTI length for transmission is ACK/NACK and/or an SR, the UCI is transferred to and transmitted on the uplink shared channel with the first TTI length for transmission, and/or the uplink control channel with the first TTI length for transmission; and when the UCI carried on the uplink control channel with the second TTI length for transmission includes P-CSI, the P-CSI carried on the uplink control channel with the second TTI length for transmission is dropped, or if P-CSI is carried on the uplink shared channel with the first TTI length for transmission, and/or the uplink control channel with the first TTI length for transmission, then the P-CSI carried on the uplink control channel with the second TTI length for transmission is dropped, and if no P-CSI is carried on the uplink shared channel with the first TTI length for transmission, and/or the uplink control channel with the first TTI length for transmission, then the P-CSI carried on the uplink control channel with the second TTI length for transmission is transferred to and transmitted on the uplink shared channel with the first TTI length for transmission, and/or the uplink control channel with the first TTI length for transmission;

if there are both the uplink shared channel with the first TTI length for transmission, and the uplink control channel, with the first TTI length for transmission, then one of them is selected to carry the UCI, or a part of the UCI is carried on the uplink shared channel with the first TTI length for transmission, and the other part of the UCI is carried on the uplink control channel with the first TTI length for transmission; and/or if there are a plurality of uplink shared channels with the first TTI length for transmission, when there is an uplink shared channel with the first TTI length for transmission, on a PCC, then the uplink shared channel with the first TTI length for transmission, on the PCC is selected to carry the UCI, and when there is no uplink shared channel with the first TTI length for transmission, on the PCC, an uplink shared channel with the first TTI length for transmission, on an SCC with the lowest carrier index including the uplink shared channel with the first TTI length for transmission is selected to carry the UCI, where if the selected uplink shared channel is an uplink shared channel corresponding to an RAR grant, then the UCI is not transmitted.

When the third scheme is applied, when the selected uplink channel is the uplink control channel with the second TTI length for transmission, if there are a plurality of uplink control channels with the second TTI length for transmission, in a transmission period of time of the uplink shared channel with the first TTI length for transmission, and/or the uplink control channel with the first TTI length for transmission, then an uplink channel to carry the UCI is selected in the same scheme as in the preset rule 2; and when the selected uplink channel is the uplink shared channel with the first TTI length for transmission, and/or the uplink control channel with the first TTI length for transmission, if there are both the uplink shared channel, and the uplink control channel, with the first TTI length for transmission, or if there are a plurality of uplink shared channels with the first TTI length for transmission, then a channel to carry the UCI is selected in the same scheme as in the preset rule 3.

In an implementation, when an uplink shared channel with the first TTI length for transmission overlaps with an uplink shared channel with the second TTI length for transmission, at least one of the following schemes is applied.

Fourth Scheme

The uplink shared channel with the second TTI length for transmission is selected for transmission, and the uplink shared channel with the first TTI length for transmission is dropped, or information in symbol(s) in the uplink shared channel with the first TTI length for transmission, which overlap with symbol(s) in the uplink shared channel with the second TTI length for transmission is punctured.

Fifth Scheme

The uplink shared channel with the first TTI length for transmission is selected for transmission, and the uplink shared channel with the second TTI length for transmission is dropped.

Sixth Scheme

An uplink channel carrying UCI is selected, and when there are a plurality of uplink channels carrying UCI, an uplink channel carrying UCI with a high priority is selected, and the other channels are dropped, or information in symbol(s), in the other channels, which overlap with symbol(s) in the selected uplink channel is punctured; and if the plurality of channels carry the UCI with the same priority, then an uplink channel is selected from the plurality of channels carrying the UCI with the same priority as in the third scheme or the fourth scheme.

In an implementation, when the fourth scheme is applied, UCI carried on the uplink shared channel with the first TTI length for transmission is transferred to and transmitted on the uplink shared channel with the second TTI length for transmission under a preset rule 1 or a preset rule 4.

When the fifth scheme is applied, UCI carried on the uplink shared channel with the second TTI length for transmission is transferred to and transmitted on the uplink shared channel with the first TTI length for transmission under the preset rule 1 or a preset rule 5.

When the sixth scheme is applied, UCI in the uplink channel which is not selected is transferred to and transmitted on the selected uplink channel under the preset rule 1.

In an implementation, when the fourth scheme is applied, the preset rule 4 includes one or a combination of the following schemes:

all the UCI carried on the uplink shared channel with the first TTI length for transmission is transferred to and transmitted on the uplink shared channel with the second TTI length for transmission;

when the UCI carried on the uplink shared channel with the first TTI length for transmission is ACK/NACK and/or an SR, the UCI is transferred to and transmitted on the uplink shared channel with the second TTI length for transmission, and when the UCI carried on the uplink shared channel with the first TTI length for transmission includes P-CSI, the P-CSI carried on the uplink shared channel with the first TTI length for transmission is dropped, or if P-CSI is carried on the uplink shared channel with the second TTI length for transmission, then the P-CSI carried on the uplink shared channel with the first TTI length for transmission is dropped; and if no P-CSI is carried on the uplink shared channel with the second TTI length for transmission, then the P-CSI carried on the uplink shared channel with the first TTI length for transmission is transferred to and transmitted on the uplink shared channel with the second TTI length for transmission;

if there are a plurality of uplink shared channels with the second TTI length for transmission, in a transmission period of time of the uplink shared channel with the first TTI length for transmission, then the first or last one of the uplink shared channels with the second TTI length for transmission is selected to carry the UCI; or when a plurality of carriers are aggregated for the UE, if there is an uplink shared channel with the second TTI length for transmission, on a PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs including the uplink shared channels with the second TTI length for transmission is selected to carry the UCI, and if there are a plurality of uplink shared channels with the second TTI length for transmission, on the selected carrier, then the first or last one of the uplink shared channels with the second TTI length for transmission is selected to carry the UCI; and if the selected uplink shared channel with the second TTI length for transmission is an uplink shared channel corresponding to an RAR grant, then the UCI is not transmitted.

When the fifth scheme is applied, the preset rule 5 includes one or a combination of the following schemes:

all the UCI carried on the uplink shared channel with the second TTI length for transmission is transferred to and transmitted on the uplink shared channel with the first TTI length for transmission;

when the UCI carried on the uplink shared channel with the second TTI length for transmission is ACK/NACK and/or an SR, the UCI is transferred to and transmitted on the uplink shared channel with the first TTI length for transmission; and when the UCI carried on the uplink shared channel with the second TTI length for transmission includes P-CSI, the P-CSI carried on the uplink shared channel with the second TTI length for transmission is dropped, or if P-CSI is carried on the uplink shared channel with the first TTI length for transmission, then the P-CSI carried on the uplink shared channel with the second TTI length for transmission is dropped, and if no P-CSI is carried on the uplink shared channel with the first TTI length for transmission, then the P-CSI carried on the uplink shared channel with the second TTI length for transmission is transferred to and transmitted on the uplink shared channel with the first TTI length for transmission;

if there are a plurality of uplink shared channels with the first TTI length for transmission, then if there is an uplink shared channel with the first TTI length for transmission, on a PCC, then the uplink shared channel with the first TTI length for transmission, on the PCC is selected to carry UCI in the sPUSCH; if there is no uplink shared channel with the first TTI length for transmission, on the PCC, then an uplink shared channel with the first TTI length for transmission, on an SCC with the lowest carrier index among SCCs including the uplink shared channels with the first TTI length for transmission is selected to carry the UCI in the sPUSCH; and if the selected uplink shared channel with the first TTI length for transmission is an uplink shared channel corresponding to an RAR grant, then the UCI is not transmitted.

When the sixth scheme is applied, when the selected uplink channel is the uplink shared channel with the second TTI length for transmission, if there are a plurality of uplink shared channels with the second TTI length for transmission, in a transmission period of time of the uplink shared channel with the first TTI length for transmission, then a channel to carry the UCI is selected as in the scheme as in the preset rule 4; and when the selected uplink channel is the uplink shared channel with the first TTI length for transmission, if there are a plurality of uplink shared channels with the first TTI length for transmission, then a channel to carry the UCI is selected as in the scheme as in the preset rule 5.

In an implementation, when an uplink control channel with the first TTI length for transmission overlaps with an uplink shared channel with the second TTI length for transmission, at least one of the following schemes is applied.

Seventh Scheme

The uplink shared channel with the second TTI length for transmission is selected for transmission, and the uplink control channel with the first TTI length for transmission is dropped, or information in symbol(s) in the uplink control channel with the first TTI length for transmission, which overlap with symbol(s) in the uplink shared channel with the second TTI length for transmission is punctured.

Eighth Scheme

The uplink control channel with the first TTI length for transmission is selected for transmission, and the uplink shared channel with the second TTI length for transmission is dropped.

Ninth Scheme

An uplink channel carrying UCI is selected, and when there are a plurality of uplink channels carrying UCI, an uplink channel carrying UCI with a high priority is selected, and the other channels are dropped, or information in symbol(s), in the other channels, which overlap with symbol(s) in the selected uplink channel is punctured; and if the plurality of channels carry the UCI with the same priority, then an uplink channel is selected from the plurality of channels carrying the UCI with the same priority as in the seventh scheme or the eighth scheme.

In an implementation, when the seventh scheme is applied, UCI carried on the uplink control channel with the first TTI length for transmission is transferred to and transmitted on the uplink shared channel with the second TTI length for transmission under a preset rule 1 or a preset rule 6.

When the eighth scheme is applied, if the uplink shared channel with the second TTI length for transmission carries UCI, then the UCI is transferred to and transmitted on the uplink control channel with the first TTI length for transmission under the preset rule 1 or a preset rule 7.

When the ninth scheme is applied, UCI in the uplink channel which is not selected is transferred to and transmitted on the selected uplink channel under the preset rule 1.

In an implementation, when the seventh scheme is applied, the preset rule 6 includes one or a combination of the following schemes:

all the UCI carried on the uplink control channel with the first TTI length for transmission is transferred to and transmitted on the uplink shared channel with the second TTI length for transmission;

when the UCI carried on the uplink control channel with the first TTI length for transmission is ACK/NACK and/or an SR, the UCI is transferred to and transmitted on the uplink shared channel with the second TTI length for transmission, and when the UCI carried on the uplink control channel with the first TTI length for transmission includes P-CSI, the P-CSI carried on the uplink control channel with the first TTI length for transmission is dropped, or if P-CSI is carried on the uplink shared channel with the second TTI length for transmission, then the P-CSI carried on the uplink control channel with the first TTI length for transmission is dropped; and if no P-CSI is carried on the uplink shared channel with the second TTI length for transmission, then the P-CSI carried on the uplink control channel with the first TTI length for transmission is transferred to and transmitted on the uplink shared channel with the second TTI length for transmission;

if there are a plurality of uplink shared channels with the second TTI length for transmission, in a transmission period of time of the uplink control channel with the first TTI length for transmission, then the first or last one of the uplink shared channels with the second TTI length for transmission is selected to carry the UCI; or when a plurality of carriers are aggregated for the UE, if there is an uplink shared channel with the second TTI length for transmission, on a PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs including the uplink shared channels with the second TTI length for transmission is selected to carry the UCI, and if there are a plurality of uplink shared channels with the second TTI length for transmission, on the selected carrier, then the first or last one of the uplink shared channels with the second TTI length for transmission is selected to carry the UCI; and if the selected uplink shared channel with the second TTI length for transmission is an uplink shared channel corresponding to an RAR grant, then the UCI is not transmitted.

When the eighth scheme is applied, the preset rule 7 includes one or a combination of the following schemes:

all the UCI carried on the uplink shared channel with the second TTI length for transmission is transferred to and transmitted on the uplink control channel with the first TTI length for transmission; and when the UCI carried on the uplink shared channel with the second TTI length for transmission is ACK/NACK and/or an SR, the UCI is transferred to and transmitted on the uplink control channel with the first TTI length for transmission; and when the UCI carried on the uplink shared channel with the second TTI length for transmission includes P-CSI, the P-CSI carried on the uplink shared channel with the second TTI length for transmission is dropped, or if P-CSI is carried on the uplink control channel with the first TTI length for transmission, then the P-CSI carried on the uplink shared channel with the second TTI length for transmission is dropped, and if no P-CSI is carried on the uplink control channel with the first TTI length for transmission, then the P-CSI carried on the uplink shared channel with the second TTI length for transmission is transferred to and transmitted on the uplink control channel with the first TTI length for transmission.

When the ninth scheme is applied, when the selected uplink channel is the uplink shared channel with the second TTI length for transmission, if there are a plurality of uplink shared channels with the second TTI length for transmission, in a transmission period of time of the uplink control channel with the first TTI length for transmission, then a channel to carry the UCI is selected as in the scheme in the preset rule 7.

In an implementation, the UCI priorities are sorted so that a UCI priority of an SR is higher than or equal to that of ACK/NACK, and a UCI priority of ACK/NACK is higher than that of P-CSI.

In an implementation, the preset rule 1 includes one or a combination of the following schemes:

UCI in the uplink channel which is not selected is transferred to and transmitted on the selected uplink channel;

when the UCI in the uplink channel which is not selected is ACK/NACK and/or an SR, the UCI is transferred to and transmitted on the selected uplink channel; and when the UCI in the uplink channel which is not selected includes P-CSI, the P-CSI in the uplink channel which is not selected is dropped, or if P-CSI is carried on the selected uplink channel, then the P-CSI in the uplink channel which is not selected is dropped, and if no P-CSI is carried on the selected uplink channel, then the P-CSI in the uplink channel which is not selected is transferred to and transmitted on the selected uplink channel;

when the selected uplink channel is an uplink shared channel with the first TTI length for transmission, and/or an uplink control channel with the first TTI length for transmission, if there are both the uplink shared channel with the first TTI length for transmission, and the uplink control channel with the first TTI length for transmission, then one of them is selected to carry the UCI, or a part of the UCI is carried on the uplink shared channel with the first TTI length for transmission, and the other part of the UCI is carried on the uplink control channel with the first TTI length for transmission; if there are a plurality of uplink shared channels with the first TTI length, then when there is an uplink shared channel with the first TTI length for transmission, on a PCC, then the uplink shared channel with the first TTI length for transmission, on the PCC is selected to carry the UCI, and when there is no uplink shared channel with the first TTI length for transmission, on the PCC, then an uplink shared channel with the first TTI length for transmission, on an SCC with the lowest carrier index including the uplink shared channel with the first TTI length for transmission is selected to carry the UCI, where if the selected uplink shared channel is an uplink shared channel corresponding to an RAR grant, then the UCI is not transmitted;

when the selected uplink channel is the uplink control channel with the second TTI length for transmission, if there are a plurality of uplink control channels with the second TTI length for transmission, in the first TTI length, then the first or last uplink control channel with the second TTI length for transmission is selected to carry the UCI, or an uplink control channel with the second TTI length for transmission, which carries P-CSI is selected to carry P-CSI in the uplink channel which is not selected; if there is no uplink control channel with the second TTI length for transmission, which carries P-CSI, then the first or last uplink control channel with the second TTI length for transmission is selected to carry the P-CSI in the uplink channel which is not selected, and an uplink control channel with the second TTI length for transmission, which carries ACK/NACK and/or an SR is selected to carry ACK/NACK and/or an SR in the uplink channel which is not selected; if there is no uplink control channel with the second TTI length for transmission, which carries ACK/NACK and/or an SR, then the first or last uplink control channel with the second TTI length for transmission is selected to carry the ACK/NACK and/or the SR in the uplink channel which is not selected; and if there are a plurality of channels satisfying the condition above, then the first or last one of the plurality of channels satisfying the condition above is selected to carry the corresponding UCI in the uplink channel which is not selected;

when the selected uplink channel is the uplink shared channel with the second TTI length for transmission, if there are a plurality of uplink shared channels with the second TTI length for transmission, in the first TTI length, then the first or last one of the uplink shared channels with the second TTI length for transmission is selected to carry the UCI; or when a plurality of carriers are aggregated for the UE, then if there is an uplink shared channel with the second TTI length for transmission, on the PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs including the uplink shared channels with the second TTI length for transmission is selected to carry the UCI, and if there are a plurality of uplink shared channels with the second TTI length for transmission, on the selected carrier, then the first or last one of the uplink shared channels with the second TTI length for transmission is selected to carry the UCI; and if the selected uplink shared channel with the second TTI length for transmission is an uplink shared channel corresponding to an RAR grant, then the UCI is not transmitted.

In an implementation, the processor is further configured:

to determine whether the sum of transmission power of the uplink channel with the first TTI length for transmission, and transmission power of the uplink channel with the second TTI length for transmission exceeds the highest transmission power allowed for the UE, and if so, to determine whether the transmission period of time of the uplink channel with the first TTI length for transmission overlaps with the transmission period of time of the uplink channel with the second TTI length for transmission; and if so, to select at least one uplink channel for transmission, under the preset method, and to drop the remaining uplink channel(s), or to transmit the remaining uplink channel(s) using puncturing; and/or to determine whether there is a support of simultaneous transmission of the uplink channel with the first TTI length for transmission, and the uplink channel with the second TTI length for transmission, and if not, to determine whether the transmission period of time of the uplink channel with the first TTI length for transmission overlaps with the transmission period of time of the uplink channel with the second TTI length for transmission; and if so, to select at least one uplink channel for transmission, under the preset method, and to drop the remaining uplink channel(s), or to transmit the remaining uplink channel(s) using puncturing; and/or to determine whether there is a support of simultaneous transmission of an uplink control channel with the first TTI length for transmission, and an uplink shared channel with the second TTI length for transmission, and/or simultaneous transmission of an uplink shared channel with the first TTI length for transmission, and an uplink control channel with the second TTI length for transmission, and if not, to determine whether the transmission period of time of the uplink channel with the first TTI length for transmission overlaps with the transmission period of time of the uplink channel with the second TTI length for transmission; and if so, to select at least one uplink channel for transmission, under the preset method, and to drop transmission on the remaining uplink channel(s), or to transmit data on the remaining uplink channel(s) using puncturing.

Here in FIG. 8, the bus architecture can include any number of interconnecting buses and bridges to particularly link together various circuits including one or more processors represented by the processor 800, and one or more memories represented by the memory 820. The bus architecture can further link together various other circuits, e.g., a peripheral device, a manostat, a power management circuit, etc., all of which are well known in the art, so a further description thereof is omitted in this context. The bus interface serves as an interface. The transceiver 810 can be a number of elements, e.g., a transmitter and a receiver, which are units for communication with various other devices on a transmission medium. The processor 800 is responsible for managing the bus architecture and performing processes, and the memory 820 can store data for use by the processor 800 in performing the operations.

In summary, in the technical solutions according to the embodiments of the invention, there is proposed a solution to transmission on overlapping channels with different TTI lengths, and in an implementation, one (kind) of the channels is selected under a preset method, and transmission on the other (kind of) channel is dropped, or data are transmitted on the other (kind of) channel using puncturing. In the solution to transmission on overlapping channels with different TTI lengths according to the embodiments of the invention, one (kind) of the channels are selected under the preset rule, and transmission on the other (kind of) channel is dropped, or data are transmitted on the other (kind of) channel using puncturing, so that the UE can transmit data correctly.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method for transmitting data, comprising:
   determining whether a transmission period of time of an uplink channel with a first Transmission Time (TTI) length for transmission overlaps with a transmission period of time of an uplink channel with a second TTI length for transmission, wherein the first TTI length is longer than the second TTI length; and
   when it is determined that the transmission period of time of the uplink channel with the first TTI length for transmission overlaps with the transmission period of time of the uplink channel with the second TTI length for transmission, selecting at least one uplink channel from the uplink channels for transmission, under a preset method, and dropping a remaining uplink channel of the uplink channels, or transmitting the remaining uplink channel of the uplink channels using puncturing;

wherein the selecting at least one uplink channel from the uplink channels for transmission under the preset method, and dropping the remaining uplink channel of the uplink channels or transmitting the remaining uplink channel of the uplink channels using puncturing are performed in one of following methods:

method 2: the uplink channel with the second TTI length for transmission is selected, and the uplink channel with the first TTI length for transmission is dropped or transmitted using puncturing;

method 7: the uplink channel with the first TTI length for transmission is selected, and the uplink channel with the second TTI length for transmission is dropped;

method 3: an uplink channel carrying uplink control information (UCI) is selected, and when there are a plurality of uplink channels carrying UCI, an uplink channel carrying UCI with a high priority is selected, and when there are a plurality of uplink channels carrying UCI with the high priority, an uplink channel is selected under the above method 2 or method 7; and a remaining uplink channel is dropped or transmitted using puncturing;

wherein when the selecting at least one uplink channel from the uplink channels for transmission under the preset method, and dropping the remaining uplink channel of the uplink channels or transmitting the remaining uplink channel of the uplink channels using puncturing are performed in one of the method 2, method 7 or method 3, the method for transmitting data further comprises: transferring Uplink Control Information, UCI, in an unselected uplink channel to the selected uplink channel under a preset rule 1, and transmitting the UCI on the selected uplink channel; wherein the preset rule 1 comprises one or a combination of the following rules:

rule 1-1: UCI in the uplink channel which is not selected is transferred to and transmitted on the selected uplink channel;

rule 1-2: when the UCI in the uplink channel which is not selected is Acknowledgement/Negative Acknowledgement, ACK/NACK, and/or a Scheduling Request, SR, the UCI is transferred to and transmitted on the selected uplink channel; when the UCI in the uplink channel which is not selected comprises Periodical Channel State Information, P-CSI, the P-CSI in the uplink channel which is not selected is dropped, or if P-CSI is carried on the selected uplink channel, then the P-CSI in the uplink channel which is not selected is dropped, or if no P-CSI is carried on the selected uplink channel, then the P-CSI in the uplink channel which is not selected is transferred to and transmitted on the selected uplink channel;

rule 1-3: when the selected uplink channel is an uplink channel with the first TTI length for transmission, if there are both an uplink shared channel with the first TTI length for transmission, and an uplink control channel with the first TTI length for transmission, then the uplink shared channel with the first TTI length for transmission or the uplink control channel with the first TTI length for transmission is selected to carry the UCI, or a part of the UCI is carried on the uplink shared channel with the first TTI length for transmission, and the other part of the UCI is carried on the uplink control channel with the first TTI length for transmission; when there are a plurality of uplink shared channels with the first TTI length, and when there is an uplink shared channel with the first TTI length for transmission on a Primary Carrier Component, PCC, the uplink shared channel with the first TTI length for transmission on the PCC is selected to carry the UCI; when there is no uplink shared channel with the first TTI length for transmission on the PCC, an uplink shared channel with the first TTI length for transmission, on a Secondary Carrier Component, SCC, with the lowest carrier index among SCCs comprising the uplink shared channels with the first TTI length for transmission is selected to carry the UCI; wherein when the selected uplink shared channel is an uplink shared channel corresponding to a Radom Access Response, RAR, grant, the UCI is not transmitted;

rule 1-4: when the selected uplink channel is the uplink control channel with the second TTI length for transmission, if there are a plurality of uplink control channels with the second TTI length for transmission, in the first TTI length, then the first or last uplink control channel with the second TTI length for transmission is selected to carry the UCI, or an uplink control channel with the second TTI length for transmission, which carries P-CSI is selected to carry P-CSI in the uplink channel which is not selected; if there is no uplink control channel with the second TTI length for transmission, which carries P-CSI, then the first or last uplink control channel with the second TTI length for transmission is selected to carry the P-CSI in the uplink channel which is not selected; an uplink control channel with the second TTI length for transmission, which carries ACK/NACK and/or an SR is selected to carry ACK/NACK and/or an SR in the uplink channel which is not selected; if there is no uplink control channel with the second TTI length for transmission, which carries ACK/NACK and/or an SR, then the first or last uplink control channel with the second TTI length for transmission is selected to carry the ACK/NACK and/or the SR in the uplink channel which is not selected; wherein when there are a plurality of uplink control channels with the second TTI length for transmission, which carries P-CSI, the first or last one of the plurality of uplink control channels with the second TTI length for transmission is selected to carry the P-CSI in the uplink channel which is not selected; and when there are a plurality of uplink control channels with the second TTI length for transmission, which carries ACK/NACK and/or an SR, the first or last one of the plurality of uplink control channels with the second TTI length for transmission is selected to carry the ACK/NACK and/or an SR in the uplink channel which is not selected;

rule 1-5: when the selected uplink channel is the uplink shared channel with the second TTI length for transmission, if there are a plurality of uplink shared channels with the second TTI length for transmission, in the first TTI length, then the first or last one of the uplink shared channels with the second TTI length for transmission is selected to carry the UCI; or when a plurality of carriers are aggregated for a UE, and if there is an uplink shared channel with the second TTI length for transmission on the PCC, then the uplink shared channel with the second TTI length for transmission on the PCC is selected to carry the UCI; if there is no uplink shared channel with the second TTI length for transmission on the PCC, then an uplink shared channel with the second TTI length for transmission, on an SCC with the lowest carrier index among SCCs comprising the uplink shared channels with the second TTI length for transmission is selected to carry the UCI; and when there are a plurality of uplink shared channels with the second TTI length for transmission on the selected carrier, the first or last one of the uplink shared channels with the second TTI length for transmission is selected to carry the UCI; wherein when the selected uplink shared channel with the second TTI length for transmission is an uplink shared channel corresponding to an RAR grant, the UCI is not transmitted.

2. The method according to claim 1, wherein the selecting at least one uplink channel from the uplink channels for transmission under the preset method, and dropping the remaining uplink channel of the uplink channels or transmitting the remaining uplink channel of the uplink channels using puncturing are performed in the method 2 or method 3 or method 7, the method for transmitting data further comprises one or a combination of following methods:

method 4: when the uplink channel with the first TTI length for transmission overlaps with an uplink control channel with the second TTI length for transmission, at least one of the following schemes is applied, wherein the uplink channel with the first TTI length for transmission comprises at least one of an uplink shared channel or an uplink control channel:

in a first scheme, the uplink control channel with the second TTI length for transmission is selected for transmission, the uplink channel with the first TTI length for transmission is dropped, or information in a symbol, in the uplink channel with the first TTI length for transmission which overlaps with the symbol in the uplink control channel with the second TTI length for transmission is punctured;

in a second scheme, the uplink channel with the first TTI length for transmission is selected, and the uplink control channel with the second TTI length for transmission is dropped; or in a third scheme, an uplink channel carrying UCI is selected, and when there are a plurality of uplink channels carrying UCI, an uplink channel carrying UCI with a high priority is selected, and a remaining uplink channel is dropped, or information in a symbol, in the remaining uplink channel, which overlaps with the symbol in the selected uplink channel, is punctured; and when there are a plurality of uplink channels carrying UCI with the same high priority, an uplink channel is selected from the plurality of uplink channels carrying the UCI with the same high priority as in the first scheme or the second scheme;

method 5: when an uplink shared channel with the first TTI length for transmission overlaps with an uplink shared channel with the second TTI length for transmission, at least one of the following schemes is applied:

in a fourth scheme, the uplink shared channel with the second TTI length for transmission is selected for transmission, and the uplink shared channel with the first TTI length for transmission is dropped, or information, in a symbol in the uplink shared channel with the first TTI length for transmission, which overlaps with the symbol in the uplink shared channel with the second TTI length for transmission is punctured;

in a fifth scheme, the uplink shared channel with the first TTI length for transmission is selected for transmission, and the uplink shared channel with the second TTI length for transmission is dropped; or in a sixth scheme, an uplink channel carrying UCI is selected, and when there are a plurality of uplink channels carrying UCI, an uplink channel carrying UCI with a high priority is selected, and a remaining uplink channel is dropped, or information, in a symbol, in the remaining uplink channel, which overlaps with the symbol in the selected uplink channel, is punctured; and when the plurality of channels carry the UCI with a same priority, an uplink channel is selected from the plurality of channels carrying the UCI with the same priority as in the third scheme or the fourth scheme; or method 6: when an uplink control channel with the first TTI length for transmission overlaps with an uplink shared channel with the second TTI length for transmission, at least one of the following schemes is applied:

in a seventh scheme, the uplink shared channel with the second TTI length for transmission is selected for transmission, and the uplink control channel with the first TTI length for transmission is dropped, or information in a symbol in the uplink control channel with the first TTI length for transmission, which overlaps with the symbol in the uplink shared channel with the second TTI length for transmission is punctured;

in an eighth scheme, the uplink control channel with the first TTI length for transmission is selected for transmission, and the uplink shared channel with the second TTI length for transmission is dropped; or in a ninth scheme, an uplink channel carrying UCI is selected, and when there are a plurality of uplink channels carrying UCI, an uplink channel carrying UCI with a high priority is selected, and a remaining uplink channel is dropped, or information in a symbol, in the remaining uplink channel, which overlaps with the symbol in the selected uplink channel, is punctured; and when the plurality of channels carry the UCI with a same priority, an uplink channel is selected from the plurality of channels carrying the UCI with the same priority as in the seventh scheme or the eighth scheme.

3. The method according to claim 2, wherein, when the selecting at least one uplink channel from the uplink channels for transmission under the preset method, and dropping the remaining uplink channel of the uplink channels or transmitting the remaining uplink channel of the uplink channels using puncturing is performed in method 4, the method for transmitting data further comprises:

when the first scheme is applied, UCI carried on the uplink channel with the first TTI length for transmission is transferred to and transmitted on the uplink control channel with the second TTI length for transmission under a preset rule 1 or a preset rule 2;

when the second scheme is applied, UCI carried on the uplink control channel with the second TTI length for transmission is transferred to and transmitted on the uplink channel with the first TTI length for transmission, under the preset rule 1 or a preset rule 3; and when the third scheme is applied, UCI in an unselected uplink channel is transferred to and transmitted on the selected uplink channel under the preset rule 1;

when the selecting at least one uplink channel from the uplink channels for transmission under the preset method, and dropping the remaining uplink channel of the uplink channels or transmitting the remaining uplink channel of the uplink channels using puncturing is performed in method 5, the method for transmitting data further comprises:

when the fourth scheme is applied, UCI carried on the uplink shared channel with the first TTI length for transmission is transferred to and transmitted on the uplink shared channel with the second TTI length for transmission under a preset rule 1 or a preset rule 4;

when the fifth scheme is applied, UCI carried on the uplink shared channel with the second TTI length for transmission is transferred to and transmitted on the uplink shared channel with the first TTI length for transmission under the preset rule 1 or a preset rule 5; and when the sixth scheme is applied, UCI in an unselected uplink channel is transferred to and transmitted on the selected uplink channel under the preset rule 1; or when the selecting at least one uplink channel from the uplink channels for transmission under the preset method, and dropping the remaining uplink channel of the uplink channels or transmitting the remaining uplink channel of the uplink channels using puncturing is performed in method 6, the method for transmitting data further comprises:

when the seventh scheme is applied, UCI carried on the uplink control channel with the first TTI length for transmission is transferred to and transmitted on the uplink shared channel with the second TTI length for transmission under a preset rule 1 or a preset rule 6;

when the eighth scheme is applied, when the uplink shared channel with the second TTI length for transmission carries UCI, the UCI is transferred to and transmitted on the uplink control channel with the first TTI length for transmission under the preset rule 1 or a preset rule 7; and when the ninth scheme is applied, UCI in an unselected uplink channel is transferred to and transmitted on the selected uplink channel under the preset rule 1.

4. The method according to claim 3, wherein:

when the first scheme is applied, the preset rule 2 comprises one or a combination of the following schemes:

all the UCI carried on the uplink channel with the first TTI length for transmission is transferred to and transmitted on the uplink control channel with the second TTI length for transmission;

when the UCI carried on the uplink channel with the first TTI length for transmission is ACK/NACK and/or a Scheduling Request (SR), the UCI is transferred to and transmitted on the uplink control channel with the second TTI length for transmission; and when the UCI carried on the uplink channel with the first TTI length for transmission comprises Periodical Channel State Information (P-CSI), the P-CSI carried on the uplink channel with the first TTI length for transmission is dropped, or when the uplink control channel with the second TTI length for transmission carries P-CSI, the P-CSI carried on the uplink channel with the first TTI length for transmission is dropped, and when the uplink control channel with the second TTI length for transmission does not carry any P-CSI, the P-CSI carried on the uplink channel with the first TTI length for transmission is transferred to and transmitted on the uplink control channel with the second TTI length for transmission; or when there are a plurality of uplink control channels with the second TTI length for transmission, in a transmission period of time of the uplink channel with the first TTI length for transmission, then:

the first or last one of the uplink control channels with the second TTI length for transmission is selected to carry the UCI; or an uplink control channel with the second TTI length for transmission, which carries P-CSI, is selected to carry P-CSI in the uplink channel with the first TTI length for transmission, and when there is no uplink control channel with the second TTI length for transmission, which carries P-CSI, the first or last one of the uplink control channels with the second TTI length for transmission is selected to carry the P-CSI in the uplink channel with the first TTI length for transmission; and an uplink control channel with the second TTI length for transmission, which carries ACK/NACK and/or an SR, is selected to carry ACK/NACK and/or an SR in the uplink channel with the first TTI length for transmission; and when there is no uplink control channel with the second TTI length for transmission, which carries ACK/NACK and/or an SR, the first or last one of the uplink control channels with the second TTI length for transmission is selected to carry the ACK/NACK and/or the SR in the uplink channel with the first TTI length for transmission; and when there are a plurality of uplink control channels with the second TTI length for transmission, which carries P-CSI, the first or last one of the plurality of uplink control channels is selected to carry the P-CSI in the uplink channel with the first TTI length for transmission; and when there are a plurality of uplink control channels with the second TTI length for transmission, which carries ACK/NACK and/or an SR, the first or last one of the plurality of uplink control channels is selected to carry the ACK/NACK and or the SR in the uplink channel with the first TTI length for transmission;

when the second scheme is applied, the preset rule 3 comprises one or a combination of the following schemes:

all the UCI carried on the uplink control channel with the second TTI length for transmission is transferred to and transmitted on the uplink channel with the first TTI length for transmission;

when the UCI carried on the uplink control channel with the second TTI length for transmission is ACK/NACK and/or an SR, the UCI is transferred to and transmitted on the uplink channel with the first TTI length for transmission; and when the UCI carried on the uplink control channel with the second TTI length for transmission comprises P-CSI, the P-CSI carried on the uplink control channel with the second TTI length for transmission is dropped, or if P-CSI is carried on the uplink channel with the first TTI length for transmission, then the P-CSI carried on the uplink control channel with the second TTI length for transmission is dropped, and if no P-CSI is carried on the uplink channel with the first TTI length for transmission, then the P-CSI carried on the uplink control channel with the second TTI length for transmission is transferred to and transmitted on the uplink channel with the first TTI length for transmission; or when there are both an uplink shared channel with the first TTI length for transmission, and an uplink control channel with the first TTI length for transmission, one of the uplink shared channel with the first TTI length for transmission, and the uplink control channel with the first TTI length for transmission, is selected to carry the UCI, or a part of the UCI is carried on the uplink shared channel with the first TTI length for transmission, and the other part of the UCI is carried on the uplink control channel with the first TTI length for transmission; and/or when there are a plurality of uplink shared channels with the first TTI length for transmission, if there is an uplink shared channel with the first TTI length for transmission on a Primary Carrier Component, PCC, then the uplink shared channel with the first TTI length for transmission on the PCC is selected to carry the UCI, or if there is no uplink shared channel with the first TTI length for transmission on the PCC, an uplink shared channel with the first TTI length for transmission on an Secondary Carrier Component, SCC, with a lowest carrier index is selected to carry the UCI; wherein when the selected uplink shared channel is an uplink shared channel corresponding to a Radom Access Response (RAR) grant, the UCI is not transmitted;

when the third scheme is applied:
when the selected uplink channel is the uplink control channel with the second TTI length for transmission, and when there are a plurality of uplink control channels with the second TTI length for transmission, in a transmission period of time of the uplink channel with the first TTI length for transmission, an uplink channel to carry the UCI is selected in the same scheme as in the preset rule 2; and when the selected uplink channel is the uplink channel with the first TTI length for transmission, and when there are both an uplink shared channel with the first TTI length for transmission, and an uplink control channel, with the first TTI length for transmission, or there are a plurality of uplink shared channels with the first TTI length for transmission, a channel to carry the UCI is selected in the same scheme as in the preset rule 3;

when the fourth scheme is applied, the preset rule 4 comprises one or a combination of the following schemes:
all the UCI carried on the uplink shared channel with the first TTI length for transmission is transferred to and transmitted on the uplink shared channel with the second TTI length for transmission;
when the UCI carried on the uplink shared channel with the first TTI length for transmission is ACK/NACK and/or an SR, the UCI is transferred to and transmitted on the uplink shared channel with the second TTI length for transmission, and when the UCI carried on the uplink shared channel with the first TTI length for transmission comprises P-CSI, the P-CSI carried on the uplink shared channel with the first TTI length for transmission is dropped, or if P-CSI is carried on the uplink shared channel with the second TTI length for transmission, then the P-CSI carried on the uplink shared channel with the first TTI length for transmission is dropped; and if no P-CSI is carried on the uplink shared channel with the second TTI length for transmission, then the P-CSI carried on the uplink shared channel with the first TTI length for transmission is transferred to and transmitted on the uplink shared channel with the second TTI length for transmission; or
when there are a plurality of uplink shared channels with the second TTI length for transmission, in a transmission period of time of the uplink shared channel with the first TTI length for transmission, the first or last one of the uplink shared channels with the second TTI length for transmission is selected to carry the UCI; or when a plurality of carriers are aggregated for a UE, if there is an uplink shared channel with the second TTI length for transmission on a Primary Component Carrier, PCC, then the uplink shared channel with the second TTI length for transmission on the PCC is selected to carry the UCI; if there is no uplink shared channel with the second TTI length for transmission on the PCC, then an uplink shared channel with the second TTI length for transmission on a Secondary Component Carrier, SCC, with the lowest carrier index among SCCs comprising the uplink shared channels with the second TTI length for transmission is selected to carry the UCI; and if there are a plurality of uplink shared channels with the second TTI length for transmission on the selected carrier, then the first or last one of the uplink shared channels with the second TTI length for transmission is selected to carry the UCI; wherein when the selected uplink shared channel with the second TTI length for transmission is an uplink shared channel corresponding to an RAR grant, the UCI is not transmitted;

when the fifth scheme is applied, the preset rule 5 comprises one or a combination of the following schemes:
all the UCI carried on the uplink shared channel with the second TTI length for transmission is transferred to and transmitted on the uplink shared channel with the first TTI length for transmission;
when the UCI carried on the uplink shared channel with the second TTI length for transmission is ACK/NACK and/or an SR, the UCI is transferred to and transmitted on the uplink shared channel with the first TTI length for transmission; and when the UCI carried on the uplink shared channel with the second TTI length for transmission comprises P-CSI, the P-CSI carried on the uplink shared channel with the second TTI length for transmission is dropped, or if P-CSI is carried on the uplink shared channel with the first TTI length for transmission, then the P-CSI carried on the uplink shared channel with the second TTI length for transmission is dropped, and if no P-CSI is carried on the uplink shared channel with the first TTI length for transmission, then the P-CSI carried on the uplink shared channel with the second TTI length for transmission is transferred to and transmitted on the uplink shared channel with the first TTI length for transmission; or
when there are a plurality of uplink shared channels with the first TTI length for transmission, and if there is an uplink shared channel with the first TTI length for transmission on a PCC, then the uplink shared channel with the first TTI length for transmission on the PCC is selected to carry UCI in the Short Physical Uplink Shared Channel (sPUSCH); if there is no uplink shared channel with the first TTI length for transmission on the PCC, then an uplink shared channel with the first TTI length for transmission on an SCC with the lowest carrier index among SCCs comprising the uplink shared channels with the first TTI length for transmission is selected to carry the UCI in the sPUSCH; wherein when the selected uplink shared channel with the first TTI length for transmission is an uplink shared channel corresponding to an RAR grant, the UCI is not transmitted;

when the sixth scheme is applied:
  when the selected uplink channel is the uplink shared channel with the second TTI length for transmission, and when there are a plurality of uplink shared channels with the second TTI length for transmission, in a transmission period of time of the uplink shared channel with the first TTI length for transmission, a channel to carry the UCI is selected as in the scheme as in the preset rule 4; or when the selected uplink channel is the uplink shared channel with the first TTI length for transmission, and when there are a plurality of uplink shared channels with the first TTI length for transmission, a channel to carry the UCI is selected as in the scheme as in the preset rule 5;

when the seventh scheme is applied, the preset rule 6 comprises one or a combination of the following schemes:
  all the UCI carried on the uplink control channel with the first TTI length for transmission is transferred to and transmitted on the uplink shared channel with the second TTI length for transmission;
  when the UCI carried on the uplink control channel with the first TTI length for transmission is ACK/NACK and/or an SR, the UCI is transferred to and transmitted on the uplink shared channel with the second TTI length for transmission; when the UCI carried on the uplink control channel with the first TTI length for transmission comprises P-CSI, the P-CSI carried on the uplink control channel with the first TTI length for transmission is dropped, or if P-CSI is carried on the uplink shared channel with the second TTI length for transmission, then the P-CSI carried on the uplink control channel with the first TTI length for transmission is dropped; and if no P-CSI is carried on the uplink shared channel with the second TTI length for transmission, then the P-CSI carried on the uplink control channel with the first TTI length for transmission is transferred to and transmitted on the uplink shared channel with the second TTI length for transmission; or
  when there are a plurality of uplink shared channels with the second TTI length for transmission, in a transmission period of time of the uplink control channel with the first TTI length for transmission, the first or last one of the uplink shared channels with the second TTI length for transmission is selected to carry the UCI; or when a plurality of carriers are aggregated for a UE, if there is an uplink shared channel with the second TTI length for transmission on a PCC, then the uplink shared channel with the second TTI length for transmission on the PCC is selected to carry the UCI; if there is no uplink shared channel with the second TTI length for transmission on the PCC, then an uplink shared channel with the second TTI length for transmission, on an SCC with the lowest carrier index among SCCs comprising the uplink shared channels with the second TTI length for transmission, is selected to carry the UCI, and if there are a plurality of uplink shared channels with the second TTI length for transmission, on the selected carrier, then the first or last one of the uplink shared channels with the second TTI length for transmission is selected to carry the UCI; wherein when the selected uplink shared channel with the second TTI length for transmission is an uplink shared channel corresponding to an RAR grant, the UCI is not transmitted;

when the eighth scheme is applied, the preset rule 7 comprises one or a combination of the following schemes:
  all the UCI carried on the uplink shared channel with the second TTI length for transmission is transferred to and transmitted on the uplink control channel with the first TTI length for transmission; or
  when the UCI carried on the uplink shared channel with the second TTI length for transmission is ACK/NACK and/or an SR, the UCI is transferred to and transmitted on the uplink control channel with the first TTI length for transmission; when the UCI carried on the uplink shared channel with the second TTI length for transmission comprises P-CSI, the P-CSI carried on the uplink shared channel with the second TTI length for transmission is dropped, or if P-CSI is carried on the uplink control channel with the first TTI length for transmission, then the P-CSI carried on the uplink shared channel with the second TTI length for transmission is dropped, and if no P-CSI is carried on the uplink control channel with the first TTI length for transmission, then the P-CSI carried on the uplink shared channel with the second TTI length for transmission is transferred to and transmitted on the uplink control channel with the first TTI length for transmission;

when the ninth scheme is applied:
  when the selected uplink channel is the uplink shared channel with the second TTI length for transmission, and when there are a plurality of uplink shared channels with the second TTI length for transmission, in a transmission period of time of the uplink control channel with the first TTI length for transmission, a channel to carry the UCI is selected as in the scheme in the preset rule 7;

when the preset rule 1 is applied, the preset rule 1 comprises one or a combination of the following schemes:
  UCI in the uplink channel which is not selected is transferred to and transmitted on the selected uplink channel;
  when the UCI in the uplink channel which is not selected is ACK/NACK and/or an SR, the UCI is transferred to and transmitted on the selected uplink channel; when the UCI in the uplink channel which is not selected comprises P-CSI, the P-CSI in the uplink channel which is not selected is dropped, or if P-CSI is carried on the selected uplink channel, then the P-CSI in the uplink channel which is not selected is dropped, or if no P-CSI is carried on the selected uplink channel, then the P-CSI in the uplink channel which is not selected is transferred to and transmitted on the selected uplink channel;

when the selected uplink channel is an uplink channel with the first TTI length for transmission, if there are both an uplink shared channel with the first TTI length for transmission, and an uplink control channel with the first TTI length for transmission, then the uplink shared channel with the first TTI length for transmission or the uplink control channel with the first TTI length for transmission is selected to carry the UCI, or a part of the UCI is carried on the uplink shared channel with the first TTI length for transmission, and the other part of the UCI is carried on the uplink control channel with the first TTI length for transmission; when there are a plurality of uplink shared channels with the first TTI length, and when there is an uplink shared channel with the first TTI length for transmission on a PCC, the uplink shared channel with the first TTI length for transmission on the PCC is selected to carry the UCI; when there is no uplink shared channel with the first TTI length for transmission on the PCC, an uplink shared channel with the first TTI length for transmission, on an SCC with the lowest carrier index among SCCs comprising the uplink shared channels with the first TTI length for transmission is selected to carry the UCI; wherein when the selected uplink shared channel is an uplink shared channel corresponding to an RAR grant, the UCI is not transmitted;

when the selected uplink channel is the uplink control channel with the second TTI length for transmission, if there are a plurality of uplink control channels with the second TTI length for transmission, in the first TTI length, then the first or last uplink control channel with the second TTI length for transmission is selected to carry the UCI, or an uplink control channel with the second TTI length for transmission, which carries P-CSI is selected to carry P-CSI in the uplink channel which is not selected; if there is no uplink control channel with the second TTI length for transmission, which carries P-CSI, then the first or last uplink control channel with the second TTI length for transmission is selected to carry the P-CSI in the uplink channel which is not selected; an uplink control channel with the second TTI length for transmission, which carries ACK/NACK and/or an SR is selected to carry ACK/NACK and/or an SR in the uplink channel which is not selected; if there is no uplink control channel with the second TTI length for transmission, which carries ACK/NACK and/or an SR, then the first or last uplink control channel with the second TTI length for transmission is selected to carry the ACK/NACK and/or the SR in the uplink channel which is not selected; wherein when there are a plurality of uplink control channels with the second TTI length for transmission, which carries P-CSI, the first or last one of the plurality of uplink control channels with the second TTI length for transmission is selected to carry the P-CSI in the uplink channel which is not selected; and when there are a plurality of uplink control channels with the second TTI length for transmission, which carries ACK/NACK and/or an SR, the first or last one of the plurality of uplink control channels with the second TTI length for transmission is selected to carry the ACK/NACK and/or an SR in the uplink channel which is not selected; or when the selected uplink channel is the uplink shared channel with the second TTI length for transmission, if there are a plurality of uplink shared channels with the second TTI length for transmission, in the first TTI length, then the first or last one of the uplink shared channels with the second TTI length for transmission is selected to carry the UCI; or when a plurality of carriers are aggregated for a UE, and if there is an uplink shared channel with the second TTI length for transmission on the PCC, then the uplink shared channel with the second TTI length for transmission on the PCC is selected to carry the UCI; if there is no uplink shared channel with the second TTI length for transmission on the PCC, then an uplink shared channel with the second TTI length for transmission, on an SCC with the lowest carrier index among SCCs comprising the uplink shared channels with the second TTI length for transmission is selected to carry the UCI; and when there are a plurality of uplink shared channels with the second TTI length for transmission on the selected carrier, the first or last one of the uplink shared channels with the second TTI length for transmission is selected to carry the UCI; wherein when the selected uplink shared channel with the second TTI length for transmission is an uplink shared channel corresponding to an RAR grant, the UCI is not transmitted.

5. The method according to claim 2, wherein priorities of UCI are as follows: a priority of an SR is higher than or equal to that of ACK/NACK, and a priority of ACK/NACK is higher than that of P-CSI.

6. The method according to claim 1, wherein the method for transmitting data further comprises:
determining whether a sum of transmission power of the uplink channel with the first TTI length for transmission, and transmission power of the uplink channel with the second TTI length for transmission exceeds a highest transmission power allowed for a UE, and when the sum of transmission powers exceeds the highest transmission power, determining whether the transmission period of time of the uplink channel with the first TTI length for transmission overlaps with the transmission period of time of the uplink channel with the second TTI length for transmission; and when the transmission period of time of the uplink channel with the first TTI length for transmission overlaps with the transmission period of time of the uplink channel with the second TTI length for transmission, selecting at least one uplink channel from the uplink channels for transmission, under the preset method, and dropping the remaining uplink channel of the uplink channels, or transmitting the remaining uplink channel using puncturing; and/or determining whether there is a support of simultaneous transmission of the uplink channel with the first TTI length for transmission, and the uplink channel with the second TTI length for transmission, and when there is no support, determining whether the transmission period of time of the uplink channel with the first TTI length for transmission overlaps with the transmission period of time of the uplink channel with the second TTI length for transmission; and when the transmission period of time of the uplink channel with the first TTI length for transmission overlaps with the transmission period of time of the uplink channel with the second TTI length for transmission, selecting at least one uplink channel from the uplink channels for transmission, under the preset method, and dropping the remaining uplink channel, or transmitting the remaining uplink channel using puncturing; and/or determining whether there is a support of simultaneous transmission of an uplink control channel with the first TTI length for transmission, and an uplink shared channel with the second TTI length for transmission, and/or simultaneous transmission of an uplink shared channel with the first TTI length for transmission, and an uplink control channel with the second TTI length for transmission, and when there is no support, determining whether the transmission period of time of the uplink channel with the first TTI length for transmission overlaps with the transmission period of time of the uplink channel with the second TTI length for transmission; and when the transmission period of time of the uplink channel with the first TTI length for transmission overlaps with the transmission period of time of the uplink channel with the second TTI length for transmission, selecting at least one uplink channel from the uplink channels for transmission, under the preset method, and dropping the remaining uplink channel, or transmitting the remaining uplink channel using puncturing.

7. A method for transmitting data, comprising:

determining whether a transmission period of time of an uplink channel with a first Transmission Time (TTI) length for transmission overlaps with a transmission period of time of an uplink channel with a second TTI length for transmission, wherein the first TTI length is longer than the second TTI length; and when it is determined that the transmission period of time of the uplink channel with the first TTI length for transmission overlaps with the transmission period of time of the uplink channel with the second TTI length for transmission, determining that a UE selects an uplink channel from the uplink channels for transmission, under a preset method, and drops a remaining uplink channel or transmitting the remaining uplink channel using puncturing;

wherein the determining that the UE selects an uplink channel from the uplink channels for transmission, under the preset method, and drops the remaining uplink channel or transmitting the remaining uplink channel using puncturing is performed in one of the following methods:

method 2: the uplink channel with the second TTI length for transmission is selected, and the uplink channel with the first TTI length for transmission is dropped or transmitted using puncturing;

method 7: the uplink channel with the first TTI length for transmission is selected, and the uplink channel with the second TTI length for transmission is dropped;

method 3: an uplink channel carrying uplink control information (UCI) is selected, and when there are a plurality of uplink channels carrying UCI, an uplink channel carrying UCI with a high priority is selected, and when there are a plurality of uplink channels carrying UCI with the high priority, an uplink channel is selected under the above method 2 or method 7, and a remaining uplink channel is dropped or transmitted using puncturing;

wherein when the determining that the UE selects an uplink channel from the uplink channels for transmission, under the preset method, and drops the remaining uplink channel or transmitting the remaining uplink channel using puncturing is performed in one of the method 2, method 7 or method 3, the method for transmitting data further comprises: determining that the UE transfers Uplink Control Information, UCI, in an unselected uplink channel to the selected uplink channel under a preset rule 1, and transmits the UCI on the selected uplink channel; the preset rule 1 comprises one or a combination of the following rules:

rule 1-1: UCI in the uplink channel which is not selected is transferred to and transmitted on the selected uplink channel;

rule 1-2: when the UCI in the uplink channel which is not selected is Acknowledgement/Negative Acknowledgement, ACK/NACK, and/or a Scheduling Request, SR, the UCI is transferred to and transmitted on the selected uplink channel; and when the UCI in the uplink channel which is not selected comprises Periodical Channel State Information, P-CSI, the P-CSI in the uplink channel which is not selected is dropped, or if P-CSI is carried on the selected uplink channel, then the P-CSI in the uplink channel which is not selected is dropped, and if no P-CSI is carried on the selected uplink channel, then the P-CSI in the uplink channel which is not selected is transferred to and transmitted on the selected uplink channel;

rule 1-3: when the selected uplink channel is an uplink channel with the first TTI length for transmission, if there are both an uplink shared channel with the first TTI length for transmission, and an uplink control channel with the first TTI length for transmission, then the uplink shared channel with the first TTI length for transmission or the uplink control channel with the first TTI length for transmission is selected to carry the UCI, or a part of the UCI is carried on the uplink shared channel with the first TTI length for transmission, and the other part of the UCI is carried on the uplink control channel with the first TTI length for transmission; if there are a plurality of uplink shared channels with the first TTI length, then when there is an uplink shared channel with the first TTI length for transmission, on a Primary Carrier Component, PCC, the uplink shared channel with the first TTI length for transmission, on the PCC is selected to carry the UCI, and when there is no uplink shared channel with the first TTI length for transmission, on the PCC, an uplink shared channel with the first TTI length for transmission, on a Secondary Carrier Component, SCC, with the lowest carrier index among SCCs comprising the uplink shared channels with the first TTI length for transmission is selected to carry the UCI, wherein if the selected uplink shared channel is an uplink shared channel corresponding to a Radom Access Response, RAR, grant, then the UCI is not transmitted;

rule 1-4: when the selected uplink channel is the uplink control channel with the second TTI length for transmission, if there are a plurality of uplink control channels with the second TTI length for transmission, in the first TTI length, then the first or last uplink control channel with the second TTI length for transmission is selected to carry the UCI, or an uplink control channel with the second TTI length for transmission, which carries P-CSI is selected to carry P-CSI in the uplink channel which is not selected; if there is no uplink control channel with the second TTI length for transmission, which carries P-CSI, then the first or last uplink control channel with the second TTI length for transmission is selected to carry the P-CSI in the uplink channel which is not selected, and an uplink control channel with the second TTI length for transmission, which carries ACK/NACK and/or an SR is selected to carry ACK/NACK and/or an SR in the uplink channel which is not selected; if there is no uplink control channel with the second TTI length for transmission, which carries ACK/NACK and/or an SR, then the first or last uplink control channel with the second TTI length for transmission is selected to carry the ACK/NACK and/or the SR in the uplink channel which is not selected; and if there are a plurality of uplink control channels with the second TTI length for transmission, which carries P-CSI, the first or last one of the plurality of uplink control channels with the second TTI length for transmission is selected to carry the P-CSI in the uplink channel which is not selected; and when there are a plurality of uplink control channels with the second TTI length for transmission, which carries ACK/NACK and/or an SR, the first or last one of the plurality of uplink control channels with the second TTI length for transmission is selected to carry the ACK/NACK and/or an SR in the uplink channel which is not selected;

rule 1-5: when the selected uplink channel is the uplink shared channel with the second TTI length for transmission, if there are a plurality of uplink shared channels with the second TTI length for transmission, in the first TTI length, then the first or last one of the uplink shared channels with the second TTI length for transmission is selected to carry the UCI; or when a plurality of carriers are aggregated for the UE, if there is an uplink shared channel with the second TTI length for transmission, on the PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs comprising the uplink shared channels with the second TTI length for transmission is selected to carry the UCI, and if there are a plurality of uplink shared channels with the second TTI length for transmission, on the selected carrier, then the first or last one of the uplink shared channels with the second TTI length for transmission is selected to carry the UCI; and if the selected uplink shared channel with the second TTI length for transmission is an uplink shared channel corresponding to an RAR grant, then the UCI is not transmitted.

8. The method according to claim 7, wherein the determining that the UE selects an uplink channel from the uplink channels for transmission, under the preset method, and drops the remaining uplink channel or transmitting the remaining uplink channel using puncturing is performed in the method 2 or method 3 or method 7, the method for transmitting data further comprises one or a combination of the following methods:

method 4: when the uplink channel with the first TTI length for transmission overlaps with an uplink control channel with the second TTI length for transmission, at least one of the following schemes is applied, wherein the uplink channel with the first TTI length for transmission comprises at least one of an uplink shared channel or an uplink control channel:

in a first scheme, it is determined that the uplink control channel with the second TTI length for transmission is selected by the UE for transmission, the uplink channel with the first TTI length for transmission is dropped, or information in a symbol in the uplink channel with the first TTI length for transmission, which overlaps with the symbol in the uplink control channel with the second TTI length for transmission is punctured;

in a second scheme, it is determined that that the uplink channel with the first TTI length for transmission is selected by the UE, and the uplink control channel with the second TTI length for transmission is dropped; or in a third scheme, it is determined that an uplink channel carrying UCI is selected, and when there are a plurality of uplink channels carrying UCI, an uplink channel carrying UCI with a high priority is selected, and a remaining uplink channel is dropped, or information in a symbol, in the remaining uplink channel, which overlaps with the symbol in the selected uplink channel, is punctured; and when there are a plurality of uplink channels carrying UCI with the same high priority, an uplink channel is selected from the plurality of uplink channels carrying UCI with the same high priority as in the first scheme or the second scheme;

method 5: when an uplink shared channel with the first TTI length for transmission overlaps with an uplink shared channel with the second TTI length for transmission, at least one of the following schemes is applied:

in a fourth scheme, it is determined that the uplink shared channel with the second TTI length for transmission is selected by the UE for transmission, and the uplink shared channel with the first TTI length for transmission is dropped, or information, in a symbol in the uplink shared channel with the first TTI length for transmission, which overlaps with the symbol in the uplink shared channel with the second TTI length for transmission, is punctured;

in a fifth scheme, it is determined that the uplink shared channel with the first TTI length for transmission is selected by the UE for transmission, and the uplink shared channel with the second TTI length for transmission is dropped; or in a sixth scheme, it is determined that an uplink channel carrying UCI is selected by the UE, and when there are a plurality of uplink channels carrying UCI, an uplink channel carrying UCI with a high priority is selected, and a remaining uplink channel is dropped, or information in a symbol, in the remaining uplink channel, which overlaps with the symbol in the selected uplink channel is punctured; and when there are a plurality of channels carrying the UCI with the same high priority, an uplink channel is selected from the plurality of channels carrying the UCI with the same high priority as in the third scheme or the fourth scheme;

method 6: when an uplink control channel with the first TTI length for transmission overlaps with an uplink shared channel with the second TTI length for transmission, at least one of the following schemes is applied:
  in a seventh scheme, it is determined that the uplink shared channel with the second TTI length for transmission is selected by the UE for transmission, and the uplink control channel with the first TTI length for transmission is dropped, or information in a symbol in the uplink control channel with the first TTI length for transmission, which overlaps with the symbol in the uplink shared channel with the second TTI length for transmission is punctured;
  in an eighth scheme, it is determined that the uplink control channel with the first TTI length for transmission is selected by the UE for transmission, and the uplink shared channel with the second TTI length for transmission is dropped; or
  in a ninth scheme, it is determined that an uplink channel carrying UCI is selected by the UE, and when there are a plurality of uplink channels carrying UCI, an uplink channel carrying UCI with a high priority is selected, and a remaining uplink channel is dropped, or information in a symbol, in the remaining uplink channel, which overlaps with the symbol in the selected uplink channel is punctured; and when there are a plurality of channels carrying the UCI with the same high priority, an uplink channel is selected from the plurality of channels carrying the UCI with the same high priority as in the seventh scheme or the eighth scheme.

9. The method according to claim 8, wherein,
when the determining that the UE selects an uplink channel from the uplink channels for transmission, under the preset method, and drops the remaining uplink channel or transmitting the remaining uplink channel using puncturing is performed in method 4, the method for transmitting data further comprises:
  when the first scheme is applied, it is determined that UCI carried on the uplink channel with the first TTI length for transmission is transferred by the UE to and transmitted on the uplink control channel with the second TTI length for transmission under a preset rule 1 or a preset rule 2;
  when the second scheme is applied, it is determined that UCI carried on the uplink control channel with the second TTI length for transmission is transferred by the UE to and transmitted on the uplink channel with the first TTI length for transmission, under the preset rule 1 or a preset rule 3; and
  when the third scheme is applied, it is determined that UCI in an unselected uplink channel is transferred by the UE to and transmitted on the selected uplink channel under the preset rule 1;
when the determining that the UE selects an uplink channel from the uplink channels for transmission, under the preset method, and drops the remaining uplink channel or transmitting the remaining uplink channel using puncturing is performed in method 5, the method for transmitting data further comprises:
  when the fourth scheme is applied, it is determined that UCI carried on the uplink shared channel with the first TTI length for transmission is transferred by the UE to and transmitted on the uplink shared channel with the second TTI length for transmission under a preset rule 1 or a preset rule 4;
  when the fifth scheme is applied, it is determined that UCI carried on the uplink shared channel with the second TTI length for transmission is transferred by the UE to and transmitted on the uplink shared channel with the first TTI length for transmission under the preset rule 1 or a preset rule 5; and
  when the sixth scheme is applied, it is determined that UCI in an unselected uplink channel is transferred by the UE to and transmitted on the selected uplink channel under the preset rule 1;
when the determining that the UE selects an uplink channel from the uplink channels for transmission, under the preset method, and drops the remaining uplink channel or transmitting the remaining uplink channel using puncturing is performed in method 6, the method for transmitting data further comprises:
  when the seventh scheme is applied, it is determined that UCI carried on the uplink control channel with the first TTI length for transmission is transferred by the UE to and transmitted on the uplink shared channel with the second TTI length for transmission under a preset rule 1 or a preset rule 6;
  when the eighth scheme is applied, when the uplink shared channel with the second TTI length for transmission carries UCI, then it is determined that the UCI is transferred by the UE to and transmitted on the uplink control channel with the first TTI length for transmission under the preset rule 1 or a preset rule 7; and
  when the ninth scheme is applied, it is determined that UCI in an unselected uplink channel is transferred by the UE to and transmitted on the selected uplink channel under the preset rule 1.

10. The method according to claim 9, wherein:
when the first scheme is applied, the preset rule 2 comprises one or a combination of the following schemes:
  all the UCI carried on the uplink channel with the first TTI length for transmission is transferred to and transmitted on the uplink control channel with the second TTI length for transmission;
  when the UCI carried on the uplink channel with the first TTI length for transmission, is ACK/NACK and/or an SR, the UCI is transferred to and transmitted on the uplink control channel with the second TTI length for transmission; when the UCI carried on the uplink channel with the first TTI length for transmission comprises P-CSI, the P-CSI carried on the uplink channel with the first TTI length for transmission is dropped, or if the uplink control channel with the second TTI length for transmission carries P-CSI, then the P-CSI carried on the uplink channel with the first TTI length for transmission is dropped, and if the uplink control channel with the second TTI length for transmission does not carry any P-CSI, then the P-CSI carried on the uplink channel with the first TTI length for transmission is transferred to and transmitted on the uplink control channel with the second TTI length for transmission; or
  when there are a plurality of uplink control channels with the second TTI length for transmission, in a transmission period of time of the uplink channel with the first TTI length for transmission, then:
    the first or last one of the uplink control channels with the second TTI length for transmission is selected to carry the UCI; or
    an uplink control channel with the second TTI length for transmission, which carries P-CSI is selected to carry P-CSI in the uplink channel with the first TTI length for transmission, and if there is no uplink control channel with the second TTI length for transmission, which carries P-CSI, the first or last one of the uplink control channels with the second TTI length for transmission is selected to carry the P-CSI in the uplink channel with the first TTI length for transmission; and an uplink control channel with the second TTI length for transmission, which carries ACK/NACK and/or an SR is selected to carry ACK/NACK and/or an SR in the uplink channel with the first TTI length for transmission; and if there is no uplink control channel with the second TTI length for transmission, which carries ACK/NACK and/or an SR, then the first or last one of the uplink control channels with the second TTI length for transmission is selected to carry the ACK/NACK and/or the SR in the uplink channel with the first TTI length for transmission; wherein when there are a plurality of uplink control channels with the second TTI length for transmission, which carries P-CSI, the first or last one of the plurality of uplink control channels is selected to carry the P-CSI in the uplink channel with the first TTI length for transmission; and when there are a plurality of uplink control channels with the second TTI length for transmission, which carries ACK/NACK and/or an SR, the first or last one of the plurality of uplink control channels is selected to carry the ACK/NACK and or the SR in the uplink channel with the first TTI length for transmission;

when the second scheme is applied, the preset rule 3 comprises one or a combination of the following schemes:

all the UCI carried on the uplink control channel with the second TTI length for transmission is transferred to and transmitted on the uplink channel with the first TTI length for transmission;

when the UCI carried on the uplink control channel with the second TTI length for transmission is ACK/NACK and/or an SR, the UCI is transferred to and transmitted on the uplink channel with the first TTI length for transmission; and when the UCI carried on the uplink control channel with the second TTI length for transmission comprises P-CSI, the P-CSI carried on the uplink control channel with the second TTI length for transmission is dropped, or if P-CSI is carried on the uplink channel with the first TTI length for transmission, then the P-CSI carried on the uplink control channel with the second TTI length for transmission is dropped, and if no P-CSI is carried on the uplink channel with the first TTI length for transmission, then the P-CSI carried on the uplink control channel with the second TTI length for transmission is transferred to and transmitted on the uplink channel with the first TTI length for transmission; or when there are both an uplink shared channel with the first TTI length for transmission, and an uplink control channel with the first TTI length for transmission, one of the uplink shared channel with the first TTI length for transmission, and the uplink control channel with the first TTI length for transmission, is selected to carry the UCI, or a part of the UCI is carried on the uplink shared channel with the first TTI length for transmission, and the other part of the UCI is carried on the uplink control channel with the first TTI length for transmission; and/or when there are a plurality of uplink shared channels with the first TTI length for transmission, and if there is an uplink shared channel with the first TTI length for transmission on a PCC, then the uplink shared channel with the first TTI length for transmission on the PCC is selected to carry the UCI, and if there is no uplink shared channel with the first TTI length for transmission on the PCC, then an uplink shared channel with the first TTI length for transmission on an SCC with the lowest carrier index among SCCs comprising the uplink shared channels with the first TTI length for transmission is selected to carry the UCI, wherein if the selected uplink shared channel is an uplink shared channel corresponding to an RAR grant, then the UCI is not transmitted;

when the third scheme is applied:

when the selected uplink channel is the uplink control channel with the second TTI length for transmission, if there are a plurality of uplink control channels with the second TTI length for transmission, in a transmission period of time of the uplink channel with the first TTI length for transmission, then an uplink channel to carry the UCI is selected in the same scheme as in the preset rule 2; and when the selected uplink channel is the uplink channel with the first TTI length for transmission, if there are both an uplink shared channel with the first TTI length for transmission and an uplink control channel with the first TTI length for transmission, or there are a plurality of uplink shared channels with the first TTI length for transmission, then a channel to carry the UCI is selected in the same scheme as in the preset rule 3;

when the fourth scheme is applied, the preset rule 4 comprises one or a combination of the following schemes:

all the UCI carried on the uplink shared channel with the first TTI length for transmission is transferred to and transmitted on the uplink shared channel with the second TTI length for transmission;

when the UCI carried on the uplink shared channel with the first TTI length for transmission is ACK/NACK and/or an SR, the UCI is transferred to and transmitted on the uplink shared channel with the second TTI length for transmission, and when the UCI carried on the uplink shared channel with the first TTI length for transmission comprises P-CSI, the P-CSI carried on the uplink shared channel with the first TTI length for transmission is dropped, or if P-CSI is carried on the uplink shared channel with the second TTI length for transmission, then the P-CSI carried on the uplink shared channel with the first TTI length for transmission is dropped; and if no P-CSI is carried on the uplink shared channel with the second TTI length for transmission, then the P-CSI carried on the uplink shared channel with the first TTI length for transmission is transferred to and transmitted on the uplink shared channel with the second TTI length for transmission; or when there are a plurality of uplink shared channels with the second TTI length for transmission, in a transmission period of time of the uplink shared channel with the first TTI length for transmission, the first or last one of the uplink shared channels with the second TTI length for transmission is selected to carry the UCI; or when a plurality of carriers are aggregated for the UE, if there is an uplink shared channel with the second TTI length for transmission on a PCC, then the uplink shared channel with the second TTI length for transmission on the PCC is selected to carry the UCI; if there is no uplink shared channel with the second TTI length for transmission on the PCC, then an uplink shared channel with the second TTI length for transmission on an SCC with the lowest carrier index among SCCs comprising the uplink shared channels with the second TTI length for transmission is selected to carry the UCI; and if there are a plurality of uplink shared channels with the second TTI length for transmission on the selected carrier, then the first or last one of the uplink shared channels with the second TTI length for transmission is selected to carry the UCI; and when the selected uplink shared channel with the second TTI length for transmission is an uplink shared channel corresponding to an RAR grant, the UCI is not transmitted;

when the fifth scheme is applied, the preset rule 5 comprises one or a combination of the following schemes:
all the UCI carried on the uplink shared channel with the second TTI length for transmission is transferred to and transmitted on the uplink shared channel with the first TTI length for transmission;
when the UCI carried on the uplink shared channel with the second TTI length for transmission is ACK/NACK and/or an SR, the UCI is transferred to and transmitted on the uplink shared channel with the first TTI length for transmission; and when the UCI carried on the uplink shared channel with the second TTI length for transmission comprises P-CSI, the P-CSI carried on the uplink shared channel with the second TTI length for transmission is dropped, or if P-CSI is carried on the uplink shared channel with the first TTI length for transmission, then the P-CSI carried on the uplink shared channel with the second TTI length for transmission is dropped, and if no P-CSI is carried on the uplink shared channel with the first TTI length for transmission, then the P-CSI carried on the uplink shared channel with the second TTI length for transmission is transferred to and transmitted on the uplink shared channel with the first TTI length for transmission; or
when there are a plurality of uplink shared channels with the first TTI length for transmission, if there is an uplink shared channel with the first TTI length for transmission on a PCC, then the uplink shared channel with the first TTI length for transmission on the PCC is selected to carry UCI in the sPUSCH; if there is no uplink shared channel with the first TTI length for transmission on the PCC, then an uplink shared channel with the first TTI length for transmission on an SCC with the lowest carrier index among SCCs comprising the uplink shared channels with the first TTI length for transmission is selected to carry the UCI in the sPUSCH; and when the selected uplink shared channel with the first TTI length for transmission is an uplink shared channel corresponding to an RAR grant, then the UCI is not transmitted;

when the sixth scheme is applied:
when the selected uplink channel is the uplink shared channel with the second TTI length for transmission, and when there are a plurality of uplink shared channels with the second TTI length for transmission, in a transmission period of time of the uplink shared channel with the first TTI length for transmission, then a channel to carry the UCI is selected as in the scheme as in the preset rule 4; and when the selected uplink channel is the uplink shared channel with the first TTI length for transmission, and when there are a plurality of uplink shared channels with the first TTI length for transmission, then a channel to carry the UCI is selected as in the scheme as in the preset rule 5;

when the seventh scheme is applied, the preset rule 6 comprises one or a combination of the following schemes:
all the UCI carried on the uplink control channel with the first TTI length for transmission is transferred to and transmitted on the uplink shared channel with the second TTI length for transmission;
when the UCI carried on the uplink control channel with the first TTI length for transmission is ACK/NACK and/or an SR, the UCI is transferred to and transmitted on the uplink shared channel with the second TTI length for transmission; when the UCI carried on the uplink control channel with the first TTI length for transmission comprises P-CSI, the P-CSI carried on the uplink control channel with the first TTI length for transmission is dropped, or if P-CSI is carried on the uplink shared channel with the second TTI length for transmission, then the P-CSI carried on the uplink control channel with the first TTI length for transmission is dropped; and if no P-CSI is carried on the uplink shared channel with the second TTI length for transmission, then the P-CSI carried on the uplink control channel with the first TTI length for transmission is transferred to and transmitted on the uplink shared channel with the second TTI length for transmission; or
when there are a plurality of uplink shared channels with the second TTI length for transmission, in a transmission period of time of the uplink control channel with the first TTI length for transmission, the first or last one of the uplink shared channels with the second TTI length for transmission is selected to carry the UCI; or when a plurality of carriers are aggregated for the UE, if there is an uplink shared channel with the second TTI length for transmission on a PCC, then the uplink shared channel with the second TTI length for transmission on the PCC is selected to carry the UCI; if there is no uplink shared channel with the second TTI length for transmission on the PCC, then an uplink shared channel with the second TTI length for transmission on an SCC with the lowest carrier index among SCCs comprising the uplink shared channels with the second TTI length for transmission is selected to carry the UCI, and if there are a plurality of uplink shared channels with the second TTI length for transmission on the selected carrier, then the first or last one of the uplink shared channels with the second TTI length for transmission is selected to carry the UCI; and if the selected uplink shared channel with the second TTI length for transmission is an uplink shared channel corresponding to an RAR grant, then the UCI is not transmitted;

when the eighth scheme is applied, the preset rule 7 comprises one or a combination of the following schemes:
all the UCI carried on the uplink shared channel with the second TTI length for transmission is transferred to and transmitted on the uplink control channel with the first TTI length for transmission; or when the UCI carried on the uplink shared channel with the second TTI length for transmission is ACK/NACK and/or an SR, the UCI is transferred to and transmitted on the uplink control channel with the first TTI length for transmission; and when the UCI carried on the uplink shared channel with the second TTI length for transmission comprises P-CSI, the P-CSI carried on the uplink shared channel with the second TTI length for transmission is dropped, or if P-CSI is carried on the uplink control channel with the first TTI length for transmission, then the P-CSI carried on the uplink shared channel with the second TTI length for transmission is dropped, and if no P-CSI is carried on the uplink control channel with the first TTI length for transmission, then the P-CSI carried on the uplink shared channel with the second TTI length for transmission is transferred to and transmitted on the uplink control channel with the first TTI length for transmission;

when the ninth scheme is applied:

when the selected uplink channel is the uplink shared channel with the second TTI length for transmission, if there are a plurality of uplink shared channels with the second TTI length for transmission, in a transmission period of time of the uplink control channel with the first TTI length for transmission, then a channel to carry the UCI is selected as in the scheme in the preset rule 7;

when the preset rule 1 is applied, the preset rule 1 comprises one or a combination of the following schemes:

UCI in the uplink channel which is not selected is transferred to and transmitted on the selected uplink channel;

when the UCI in the uplink channel which is not selected is ACK/NACK and/or an SR, the UCI is transferred to and transmitted on the selected uplink channel; and when the UCI in the uplink channel which is not selected comprises P-CSI, the P-CSI in the uplink channel which is not selected is dropped, or if P-CSI is carried on the selected uplink channel, then the P-CSI in the uplink channel which is not selected is dropped, and if no P-CSI is carried on the selected uplink channel, then the P-CSI in the uplink channel which is not selected is transferred to and transmitted on the selected uplink channel;

when the selected uplink channel is an uplink channel with the first TTI length for transmission, if there are both an uplink shared channel with the first TTI length for transmission, and an uplink control channel with the first TTI length for transmission, then the uplink shared channel with the first TTI length for transmission or the uplink control channel with the first TTI length for transmission is selected to carry the UCI, or a part of the UCI is carried on the uplink shared channel with the first TTI length for transmission, and the other part of the UCI is carried on the uplink control channel with the first TTI length for transmission; if there are a plurality of uplink shared channels with the first TTI length, then when there is an uplink shared channel with the first TTI length for transmission, on a PCC, the uplink shared channel with the first TTI length for transmission, on the PCC is selected to carry the UCI, and when there is no uplink shared channel with the first TTI length for transmission, on the PCC, an uplink shared channel with the first TTI length for transmission, on an SCC with the lowest carrier index among SCCs comprising the uplink shared channels with the first TTI length for transmission is selected to carry the UCI, wherein if the selected uplink shared channel is an uplink shared channel corresponding to an RAR grant, then the UCI is not transmitted;

when the selected uplink channel is the uplink control channel with the second TTI length for transmission, if there are a plurality of uplink control channels with the second TTI length for transmission, in the first TTI length, then the first or last uplink control channel with the second TTI length for transmission is selected to carry the UCI, or an uplink control channel with the second TTI length for transmission, which carries P-CSI is selected to carry P-CSI in the uplink channel which is not selected; if there is no uplink control channel with the second TTI length for transmission, which carries P-CSI, then the first or last uplink control channel with the second TTI length for transmission is selected to carry the P-CSI in the uplink channel which is not selected, and an uplink control channel with the second TTI length for transmission, which carries ACK/NACK and/or an SR is selected to carry ACK/NACK and/or an SR in the uplink channel which is not selected; if there is no uplink control channel with the second TTI length for transmission, which carries ACK/NACK and/or an SR, then the first or last uplink control channel with the second TTI length for transmission is selected to carry the ACK/NACK and/or the SR in the uplink channel which is not selected; and if there are a plurality of uplink control channels with the second TTI length for transmission, which carries P-CSI, the first or last one of the plurality of uplink control channels with the second TTI length for transmission is selected to carry the P-CSI in the uplink channel which is not selected; and when there are a plurality of uplink control channels with the second TTI length for transmission, which carries ACK/NACK and/or an SR, the first or last one of the plurality of uplink control channels with the second TTI length for transmission is selected to carry the ACK/NACK and/or an SR in the uplink channel which is not selected; or when the selected uplink channel is the uplink shared channel with the second TTI length for transmission, if there are a plurality of uplink shared channels with the second TTI length for transmission, in the first TTI length, then the first or last one of the uplink shared channels with the second TTI length for transmission is selected to carry the UCI; or when a plurality of carriers are aggregated for the UE, if there is an uplink shared channel with the second TTI length for transmission, on the PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs comprising the uplink shared channels with the second TTI length for transmission is selected to carry the UCI, and if there are a plurality of uplink shared channels with the second TTI length for transmission, on the selected carrier, then the first or last one of the uplink shared channels with the second TTI length for transmission is selected to carry the UCI; and if the selected uplink shared channel with the second TTI length for transmission is an uplink shared channel corresponding to an RAR grant, then the UCI is not transmitted.

11. The method according to claim 8, wherein the priorities of UCI are as follows: a priority of an SR is higher than or equal to that of ACK/NACK, and a priority of ACK/NACK is higher than that of P-CSI.

12. The method according to claim 7, wherein the method for transmitting data further comprises: determining that the UE operates in the following steps of:

determining whether a sum of transmission power of the uplink channel with the first TTI length for transmission, and transmission power of the uplink channel with the second TTI length for transmission exceeds a highest transmission power allowed for the UE, and when the sum of transmission powers exceeds the highest transmission power, determining whether the transmission period of time of the uplink channel with the first TTI length for transmission overlaps with the transmission period of time of the uplink channel with the second TTI length for transmission; and when the transmission period of time of the uplink channel with the first TTI length for transmission overlaps with the transmission period of time of the uplink channel with the second TTI length for transmission, selecting an uplink channels for transmission, under the preset method, and dropping the remaining uplink channel or transmitting the remaining uplink channel using puncturing; and/or determining whether there is a support of simultaneous transmission of the uplink channel with the first TTI length for transmission, and the uplink channel with the second TTI length for transmission, and when there is no support, determining whether the transmission period of time of the uplink channel with the first TTI length for transmission overlaps with the transmission period of time of the uplink channel with the second TTI length for transmission; and when the transmission period of time of the uplink channel with the first TTI length for transmission overlaps with the transmission period of time of the uplink channel with the second TTI length for transmission, selecting an uplink channel for transmission under the preset method, and dropping the remaining uplink channel or transmitting the remaining uplink channel using puncturing; and/or determining whether there is a support of simultaneous transmission of an uplink control channel with the first TTI length for transmission, and an uplink shared channel with the second TTI length for transmission, and/or simultaneous transmission of an uplink shared channel with the first TTI length for transmission, and an uplink control channel with the second TTI length for transmission, and when there is no support, determining whether the transmission period of time of the uplink channel with the first TTI length for transmission overlaps with the transmission period of time of the uplink channel with the second TTI length for transmission; and when the transmission period of time of the uplink channel with the first TTI length for transmission overlaps with the transmission period of time of the uplink channel with the second TTI length for transmission, selecting an uplink channel for transmission under the preset method, and dropping the remaining uplink channel or transmitting the remaining uplink channel using puncturing.

13. An apparatus, comprising: a processor, a transceiver, and a memory, wherein:

the processor is configured to read program in the memory: to determine whether a transmission period of time of an uplink channel with a first Transmission Time (TTI) length for transmission overlaps with a transmission period of time of an uplink channel with a second TTI length for transmission, wherein the first TTI length is longer than the second TTI length; and when the transmission period of time of the uplink channel with the first TTI length for transmission overlaps with the transmission period of time of the uplink channel with the second TTI length for transmission, to select an uplink channels for transmission, under a preset method, and to drop a remaining uplink channel, or to transmit the remaining uplink channel using puncturing; and the transceiver is configured to receive and transmit data under a control of the processor;

wherein the processor configured to select at least one uplink channel for transmission under the preset method, and to drop the remaining uplink channel or to transmit the remaining uplink channel using puncturing is performed in one of the following methods:

method 2: the uplink channel with the second TTI length for transmission is selected, and the uplink channel with the first TTI length for transmission is dropped or transmitted using puncturing;

method 7: the uplink channel with the first TTI length for transmission is selected, and the uplink channel with the second TTI length for transmission is dropped;

method 3: an uplink channel carrying uplink control information (UCI) is selected, if there are a plurality of uplink channels carrying UCI, then an uplink channel carrying UCI with a high priority is selected, and if there are a plurality of uplink channels carrying UCI with the high priority, then an uplink channel is selected under the above method 2 or method 7; and a remaining uplink channel is dropped or transmitted using puncturing;

when the processor configured to select at least one uplink channel for transmission under the preset method, and to drop the remaining uplink channel or to transmit the remaining uplink channel using puncturing is performed in one of the method 2, method 7 or method 3, the processor is further configured: to transfer Uplink Control Information, UCI, in an unselected uplink channel to the selected uplink channel under a preset rule 1, and to transmit the UCI on the selected uplink channel; wherein the preset rule 1 comprises one or a combination of the following rules:

rule 1-1: UCI in the uplink channel which is not selected is transferred to and transmitted on the selected uplink channel;

rule 1-2: when the UCI in the uplink channel which is not selected is Acknowledgement/Negative Acknowledgement, ACK/NACK, and/or a Scheduling Request, SR, the UCI is transferred to and transmitted on the selected uplink channel; when the UCI in the uplink channel which is not selected comprises Periodical Channel State Information, P-CSI, the P-CSI in the uplink channel which is not selected is dropped, or if P-CSI is carried on the selected uplink channel, then the P-CSI in the uplink channel which is not selected is dropped, or if no P-CSI is carried on the selected uplink channel, then the P-CSI in the uplink channel which is not selected is transferred to and transmitted on the selected uplink channel;

rule 1-3: when the selected uplink channel is an uplink channel with the first TTI length for transmission, if there are both an uplink shared channel with the first TTI length for transmission, and an uplink control channel with the first TTI length for transmission, then the uplink shared channel with the first TTI length for transmission or the uplink control channel with the first TTI length for transmission is selected to carry the UCI, or a part of the UCI is carried on the uplink shared channel with the first TTI length for transmission, and the other part of the UCI is carried on the uplink control channel with the first TTI length for transmission; when there are a plurality of uplink shared channels with the first TTI length, and when there is an uplink shared channel with the first TTI length for transmission on a Primary Carrier Component, PCC, the uplink shared channel with the first TTI length for transmission on the PCC is selected to carry the UCI; when there is no uplink shared channel with the first TTI length for transmission on the PCC, an uplink shared channel with the first TTI length for transmission, on a Secondary Carrier Component, SCC, with the lowest carrier index among SCCs comprising the uplink shared channels with the first TTI length for transmission is selected to carry the UCI; wherein when the selected uplink shared channel is an uplink shared channel corresponding to a Radom Access Response, RAR, grant, the UCI is not transmitted;

rule 1-4: when the selected uplink channel is the uplink control channel with the second TTI length for transmission, if there are a plurality of uplink control channels with the second TTI length for transmission, in the first TTI length, then the first or last uplink control channel with the second TTI length for transmission is selected to carry the UCI, or an uplink control channel with the second TTI length for transmission, which carries P-CSI is selected to carry P-CSI in the uplink channel which is not selected; if there is no uplink control channel with the second TTI length for transmission, which carries P-CSI, then the first or last uplink control channel with the second TTI length for transmission is selected to carry the P-CSI in the uplink channel which is not selected; an uplink control channel with the second TTI length for transmission, which carries ACK/NACK and/or an SR is selected to carry ACK/NACK and/or an SR in the uplink channel which is not selected; if there is no uplink control channel with the second TTI length for transmission, which carries ACK/NACK and/or an SR, then the first or last uplink control channel with the second TTI length for transmission is selected to carry the ACK/NACK and/or the SR in the uplink channel which is not selected; wherein when there are a plurality of uplink control channels with the second TTI length for transmission, which carries P-CSI, the first or last one of the plurality of uplink control channels with the second TTI length for transmission is selected to carry the P-CSI in the uplink channel which is not selected; and when there are a plurality of uplink control channels with the second TTI length for transmission, which carries ACK/NACK and/or an SR, the first or last one of the plurality of uplink control channels with the second TTI length for transmission is selected to carry the ACK/NACK and/or an SR in the uplink channel which is not selected;

rule 1-5: when the selected uplink channel is the uplink shared channel with the second TTI length for transmission, if there are a plurality of uplink shared channels with the second TTI length for transmission, in the first TTI length, then the first or last one of the uplink shared channels with the second TTI length for transmission is selected to carry the UCI; or when a plurality of carriers are aggregated for a UE, and if there is an uplink shared channel with the second TTI length for transmission on the PCC, then the uplink shared channel with the second TTI length for transmission on the PCC is selected to carry the UCI; if there is no uplink shared channel with the second TTI length for transmission on the PCC, then an uplink shared channel with the second TTI length for transmission, on an SCC with the lowest carrier index among SCCs comprising the uplink shared channels with the second TTI length for transmission is selected to carry the UCI; and when there are a plurality of uplink shared channels with the second TTI length for transmission on the selected carrier, the first or last one of the uplink shared channels with the second TTI length for transmission is selected to carry the UCI; wherein when the selected uplink shared channel with the second TTI length for transmission is an uplink shared channel corresponding to an RAR grant, the UCI is not transmitted.

14. The apparatus according to claim 13, wherein the processor configured to select an uplink channel for transmission under the preset method, and to drop the remaining uplink channel or to transmit the remaining uplink channel using puncturing in the method 2 or method 3 or method 7 is further configured to perform one or a combination of the following methods:

method 4: when the uplink channel with the first TTI length for transmission overlaps with an uplink control channel with the second TTI length for transmission, at least one of the following schemes is applied, wherein the uplink channel with the first TTI length for transmission comprises at least one of an uplink shared channel or an uplink control channel:

in a first scheme, the uplink control channel with the second TTI length for transmission is selected for transmission, the uplink channel with the first TTI length for transmission is dropped, or information in a symbol, in the uplink channel with the first TTI length for transmission, which overlaps with the symbol in the uplink control channel with the second TTI length for transmission, is punctured;

in a second scheme, the uplink channel with the first TTI length for transmission is selected, and the uplink control channel with the second TTI length for transmission is dropped; or in a third scheme, an uplink channel carrying UCI is selected, and when there are a plurality of uplink channels carrying UCI, an uplink channel carrying UCI with a high priority is selected, and a remaining uplink channel is dropped, or information in a symbol, in the remaining uplink channel, which overlaps with the symbol in the selected uplink channel, is punctured; and when the plurality of uplink channels carry the UCI with a same high priority, then an uplink channel is selected from the plurality of uplink channels carrying the UCI with the same priority as in the first scheme or the second scheme;

method 5: when an uplink shared channel with the first TTI length for transmission overlaps with an uplink shared channel with the second TTI length for transmission, at least one of the following schemes is applied:

in a fourth scheme, the uplink shared channel with the second TTI length for transmission is selected for transmission, and the uplink shared channel with the first TTI length for transmission is dropped, or information in a symbol in the uplink shared channel with the first TTI length for transmission, which overlaps with the symbol in the uplink shared channel with the second TTI length for transmission is punctured;

in a fifth scheme, the uplink shared channel with the first TTI length for transmission is selected for transmission, and the uplink shared channel with the second TTI length for transmission is dropped; or in a sixth scheme, an uplink channel carrying UCI is selected, and when there are a plurality of uplink channels carrying UCI, an uplink channel carrying UCI with a high priority is selected, and a remaining uplink channel is dropped, or information in a symbol, in the remaining uplink channel, which overlaps with the symbol in the selected uplink channel is punctured; and when the plurality of channels carry the UCI with a same priority, an uplink channel is selected from the plurality of channels carrying the UCI with the same priority as in the third scheme or the fourth scheme;

method 6: when an uplink control channel with the first TTI length for transmission overlaps with an uplink shared channel with the second TTI length for transmission, at least one of the following schemes is applied:

in a seventh scheme, the uplink shared channel with the second TTI length for transmission is selected for transmission, and the uplink control channel with the first TTI length for transmission is dropped, or information in a symbol in the uplink control channel with the first TTI length for transmission, which overlaps with the symbol in the uplink shared channel with the second TTI length for transmission is punctured;

in an eighth scheme, the uplink control channel with the first TTI length for transmission is selected for transmission, and the uplink shared channel with the second TTI length for transmission is dropped; or in a ninth scheme, an uplink channel carrying UCI is selected, and when there are a plurality of uplink channels carrying UCI, an uplink channel carrying UCI with a high priority is selected, and a remaining uplink channel is dropped, or information in a symbol, in the remaining uplink channel, which overlaps with the symbol in the selected uplink channel is punctured; and when the plurality of channels carry the UCI with a same priority, an uplink channel is selected from the plurality of channels carrying the UCI with the same priority as in the seventh scheme or the eighth scheme.

15. The apparatus according to claim 14, wherein, when the processor configured to select an uplink channel for transmission under the preset method, and to drop the remaining uplink channel or to transmit the remaining uplink channel using puncturing is performed in method 4, the processor is further configured:

when the first scheme is applied, to transfer UCI, carried on the uplink channel with the first TTI length for transmission, to the uplink control channel with the second TTI length for transmission under a preset rule 1 or a preset rule 2, and to transmit the UCI on the uplink control channel with the second TTI length for transmission;

when the second scheme is applied, to transfer UCI, carried on the uplink control channel with the second TTI length for transmission, to the uplink channel with the first TTI length for transmission, under the preset rule 1 or a preset rule 3, and to transmit the UCI on the uplink channel with the first TTI length for transmission; and when the third scheme is applied, to transfer UCI, in an uplink channel which is not selected, to the selected uplink channel under the preset rule 1, and to transmit the UCI on the selected uplink channel;

when the processor configured to select at least one uplink channel for transmission under the preset method, and to drop the remaining uplink channel or to transmit the remaining uplink channel using puncturing is performed in method 5, the processor is further configured:

when the fourth scheme is applied, to transfer UCI, carried on the uplink shared channel with the first TTI length for transmission, to the uplink shared channel with the second TTI length for transmission under a preset rule 1 or a preset rule 4, and to transmit the UCI on the uplink shared channel with the second TTI length for transmission;

when the fifth scheme is applied, to transfer UCI, carried on the uplink shared channel with the second TTI length for transmission, to the uplink shared channel with the first TTI length for transmission under the preset rule 1 or a preset rule 5, and to transmit the UCI on the uplink shared channel with the first TTI length for transmission; and when the sixth scheme is applied, to transfer UCI, in an uplink channel which is not selected, to the selected uplink channel under the preset rule 1, and to transmit the UCI on the selected uplink channel;

when the processor configured to select at least one uplink channel for transmission under the preset method, and to drop the remaining uplink channel or to transmit the remaining uplink channel using puncturing is performed in method 6, the processor is further configured:

when the seventh scheme is applied, to transfer UCI, carried on the uplink control channel with the first TTI length for transmission, to the uplink shared channel with the second TTI length for transmission under a preset rule 1 or a preset rule 6, and to transmit the UCI on the uplink shared channel with the second TTI length for transmission;

when the eighth scheme is applied, when the uplink shared channel with the second TTI length for transmission carries UCI, to transfer the UCI to the uplink control channel with the first TTI length for transmission under the preset rule 1 or a preset rule 7, and to transmit the UCI on the uplink control channel with the first TTI length for transmission; and when the ninth scheme is applied, to transfer UCI in an uplink channel which is not selected to the selected uplink channel under the preset rule 1, and to transmit the UCI on the selected uplink channel.

16. The apparatus according to claim 15, wherein:
when the first scheme is applied, the preset rule 2 comprises one or a combination of the following schemes:
all the UCI carried on the uplink channel with the first TTI length for transmission is transferred to and transmitted on the uplink control channel with the second TTI length for transmission;
when the UCI carried on the uplink channel with the first TTI length for transmission is ACK/NACK and/or an SR, the UCI is transferred to and transmitted on the uplink control channel with the second TTI length for transmission; and when the UCI carried on the uplink channel with the first TTI length for transmission comprises P-CSI, the P-CSI carried on the uplink channel with the first TTI length for transmission is dropped, or if the uplink control channel with the second TTI length for transmission carries P-CSI, then the P-CSI carried on the uplink channel with the first TTI length for transmission is dropped, and if the uplink control channel with the second TTI length for transmission does not carry any P-CSI, the P-CSI carried on the uplink channel with the first TTI length for transmission is transferred to and transmitted on the uplink control channel with the second TTI length for transmission; or
when there are a plurality of uplink control channels with the second TTI length for transmission, in a transmission period of time of the uplink channel with the first TTI length for transmission, then:
the first or last one of the uplink control channels with the second TTI length for transmission is selected to carry the UCI; or
an uplink control channel with the second TTI length for transmission, which carries P-CSI is selected to carry P-CSI in the uplink channel with the first TTI length for transmission, and when there is no uplink control channel with the second TTI length for transmission, which carries P-CSI, then the first or last one of the uplink control channels with the second TTI length for transmission is selected to carry the P-CSI in the uplink channel with the first TTI length for transmission; and an uplink control channel with the second TTI length for transmission, which carries ACK/NACK and/or an SR is selected to carry ACK/NACK and/or an SR in the uplink channel with the first TTI length for transmission; and when there is no uplink control channel with the second TTI length for transmission, which carries ACK/NACK and/or an SR, then the first or last one of the uplink control channels with the second TTI length for transmission is selected to carry the ACK/NACK and/or the SR in the uplink channel with the first TTI length for transmission; and when there are a plurality of uplink control channels with the second TTI length for transmission, which carries P-CSI, the first or last one of the plurality of uplink control channels is selected to carry the P-CSI in the uplink channel with the first TTI length for transmission; and when there are a plurality of uplink control channels with the second TTI length for transmission, which carries ACK/NACK and/or an SR, the first or last one of the plurality of uplink control channels is selected to carry the ACK/NACK and or the SR in the uplink channel with the first TTI length for transmission;

when the second scheme is applied, the preset rule 3 comprises one or a combination of the following schemes:
all the UCI carried on the uplink control channel with the second TTI length for transmission is transferred to and transmitted on the uplink channel with the first TTI length for transmission;
when the UCI carried on the uplink control channel with the second TTI length for transmission is ACK/NACK and/or an SR, the UCI is transferred to and transmitted on the uplink channel with the first TTI length for transmission; and when the UCI carried on the uplink control channel with the second TTI length for transmission comprises P-CSI, the P-CSI carried on the uplink control channel with the second TTI length for transmission is dropped, or if P-CSI is carried on the uplink channel with the first TTI length for transmission, then the P-CSI carried on the uplink control channel with the second TTI length for transmission is dropped, and if no P-CSI is carried on the uplink channel with the first TTI length for transmission, then the P-CSI carried on the uplink control channel with the second TTI length for transmission is transferred to and transmitted on the uplink channel with the first TTI length for transmission; or
when there are both an uplink shared channel with the first TTI length for transmission, and an uplink control channel, with the first TTI length for transmission, one of the uplink shared channel with the first TTI length for transmission, and the uplink control channel with the first TTI length for transmission, is selected to carry the UCI, or a part of the UCI is carried on the uplink shared channel with the first TTI length for transmission, and the other part of the UCI is carried on the uplink control channel with the first TTI length for transmission; and/or when there are a plurality of uplink shared channels with the first TTI length for transmission if there is an uplink shared channel with the first TTI length for transmission, on a PCC, then the uplink shared channel with the first TTI length for transmission, on the PCC is selected to carry the UCI, or if there is no uplink shared channel with the first TTI length for transmission, on the PCC, an uplink shared channel with the first TTI length for transmission, on an SCC with a lowest carrier index is selected to carry the UCI, wherein when the selected uplink shared channel is an uplink shared channel corresponding to an RAR grant, then the UCI is not transmitted;
when the third scheme is applied:
when the selected uplink channel is the uplink control channel with the second TTI length for transmission, and when there are a plurality of uplink control channels with the second TTI length for transmission, in a transmission period of time of the uplink channel with the first TTI length for transmission, an uplink channel to carry the UCI is selected in the same scheme as in the preset rule 2; and when the selected uplink channel is the uplink channel with the first TTI length for transmission, and when there are both an uplink shared channel with the first TTI length for transmission and an uplink control channel with the first TTI length for transmission, or there are a plurality of uplink shared channels with the first TTI length for transmission, then a channel to carry the UCI is selected in the same scheme as in the preset rule 3;

when the fourth scheme is applied, the preset rule 4 comprises one or a combination of the following schemes:

all the UCI carried on the uplink shared channel with the first TTI length for transmission is transferred to and transmitted on the uplink shared channel with the second TTI length for transmission;

when the UCI carried on the uplink shared channel with the first TTI length for transmission is ACK/NACK and/or an SR, the UCI is transferred to and transmitted on the uplink shared channel with the second TTI length for transmission, and when the UCI carried on the uplink shared channel with the first TTI length for transmission comprises P-CSI, the P-CSI carried on the uplink shared channel with the first TTI length for transmission is dropped, or if P-CSI is carried on the uplink shared channel with the second TTI length for transmission, then the P-CSI carried on the uplink shared channel with the first TTI length for transmission is dropped; and if no P-CSI is carried on the uplink shared channel with the second TTI length for transmission, then the P-CSI carried on the uplink shared channel with the first TTI length for transmission is transferred to and transmitted on the uplink shared channel with the second TTI length for transmission; or when there are a plurality of uplink shared channels with the second TTI length for transmission, in a transmission period of time of the uplink shared channel with the first TTI length for transmission, the first or last one of the uplink shared channels with the second TTI length for transmission is selected to carry the UCI; or when a plurality of carriers are aggregated for a UE, if there is an uplink shared channel with the second TTI length for transmission, on a PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs comprising the uplink shared channels with the second TTI length for transmission is selected to carry the UCI; and if there are a plurality of uplink shared channels with the second TTI length for transmission, on the selected carrier, then the first or last one of the uplink shared channels with the second TTI length for transmission is selected to carry the UCI; wherein when the selected uplink shared channel with the second TTI length for transmission is an uplink shared channel corresponding to an RAR grant, the UCI is not transmitted;

when the fifth scheme is applied, the preset rule 5 comprises one or a combination of the following schemes:

all the UCI carried on the uplink shared channel with the second TTI length for transmission is transferred to and transmitted on the uplink shared channel with the first TTI length for transmission;

when the UCI carried on the uplink shared channel with the second TTI length for transmission is ACK/NACK and/or an SR, the UCI is transferred to and transmitted on the uplink shared channel with the first TTI length for transmission; and when the UCI carried on the uplink shared channel with the second TTI length for transmission comprises P-CSI, the P-CSI carried on the uplink shared channel with the second TTI length for transmission is dropped, or if P-CSI is carried on the uplink shared channel with the first TTI length for transmission, then the P-CSI carried on the uplink shared channel with the second TTI length for transmission is dropped, and if no P-CSI is carried on the uplink shared channel with the first TTI length for transmission, then the P-CSI carried on the uplink shared channel with the second TTI length for transmission is transferred to and transmitted on the uplink shared channel with the first TTI length for transmission; or when there are a plurality of uplink shared channels with the first TTI length for transmission, and if there is an uplink shared channel with the first TTI length for transmission, on a PCC, then the uplink shared channel with the first TTI length for transmission, on the PCC is selected to carry UCI in the sPUSCH; if there is no uplink shared channel with the first TTI length for transmission, on the PCC, then an uplink shared channel with the first TTI length for transmission, on an SCC with the lowest carrier index among SCCs comprising the uplink shared channels with the first TTI length for transmission is selected to carry the UCI in the sPUSCH; wherein when the selected uplink shared channel with the first TTI length for transmission is an uplink shared channel corresponding to an RAR grant, the UCI is not transmitted;

when the sixth scheme is applied:

when the selected uplink channel is the uplink shared channel with the second TTI length for transmission, and when there are a plurality of uplink shared channels with the second TTI length for transmission, in a transmission period of time of the uplink shared channel with the first TTI length for transmission, a channel to carry the UCI is selected as in the scheme as in the preset rule 4; or when the selected uplink channel is the uplink shared channel with the first TTI length for transmission, and when there are a plurality of uplink shared channels with the first TTI length for transmission, a channel to carry the UCI is selected as in the scheme as in the preset rule 5;

when the seventh scheme is applied, the preset rule 6 comprises one or a combination of the following schemes:

all the UCI carried on the uplink control channel with the first TTI length for transmission is transferred to and transmitted on the uplink shared channel with the second TTI length for transmission;

when the UCI carried on the uplink control channel with the first TTI length for transmission is ACK/NACK and/or an SR, the UCI is transferred to and transmitted on the uplink shared channel with the second TTI length for transmission; when the UCI carried on the uplink control channel with the first TTI length for transmission comprises P-CSI, the P-CSI carried on the uplink control channel with the first TTI length for transmission is dropped, or if P-CSI is carried on the uplink shared channel with the second TTI length for transmission, then the P-CSI carried on the uplink control channel with the first TTI length for transmission is dropped; and if no P-CSI is carried on the uplink shared channel with the second TTI length for transmission, then the P-CSI carried on the uplink control channel with the first TTI length for transmission is transferred to and transmitted on the uplink shared channel with the second TTI length for transmission; or
when there are a plurality of uplink shared channels with the second TTI length for transmission, in a transmission period of time of the uplink control channel with the first TTI length for transmission, the first or last one of the uplink shared channels with the second TTI length for transmission is selected to carry the UCI; or when a plurality of carriers are aggregated for a UE, if there is an uplink shared channel with the second TTI length for transmission, on a PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs comprising the uplink shared channels with the second TTI length for transmission is selected to carry the UCI, and if there are a plurality of uplink shared channels with the second TTI length for transmission, on the selected carrier, then the first or last one of the uplink shared channels with the second TTI length for transmission is selected to carry the UCI; wherein when the selected uplink shared channel with the second TTI length for transmission is an uplink shared channel corresponding to an RAR grant, the UCI is not transmitted;
when the eighth scheme is applied, the preset rule 7 comprises one or a combination of the following schemes:
all the UCI carried on the uplink shared channel with the second TTI length for transmission is transferred to and transmitted on the uplink control channel with the first TTI length for transmission; or
when the UCI carried on the uplink shared channel with the second TTI length for transmission is ACK/NACK and/or an SR, the UCI is transferred to and transmitted on the uplink control channel with the first TTI length for transmission; when the UCI carried on the uplink shared channel with the second TTI length for transmission comprises P-CSI, the P-CSI carried on the uplink shared channel with the second TTI length for transmission is dropped, or if P-CSI is carried on the uplink control channel with the first TTI length for transmission, then the P-CSI carried on the uplink shared channel with the second TTI length for transmission is dropped, and if no P-CSI is carried on the uplink control channel with the first TTI length for transmission, then the P-CSI carried on the uplink shared channel with the second TTI length for transmission is transferred to and transmitted on the uplink control channel with the first TTI length for transmission;
when the ninth scheme is applied:
when the selected uplink channel is the uplink shared channel with the second TTI length for transmission, and when there are a plurality of uplink shared channels with the second TTI length for transmission, in a transmission period of time of the uplink control channel with the first TTI length for transmission, a channel to carry the UCI is selected as in the scheme in the preset rule 7; or when the preset rule 1 is applied, the preset rule 1 comprises one or a combination of the following schemes:
UCI in the uplink channel which is not selected is transferred to and transmitted on the selected uplink channel;
when the UCI in the uplink channel which is not selected is ACK/NACK and/or an SR, the UCI is transferred to and transmitted on the selected uplink channel; when the UCI in the uplink channel which is not selected comprises P-CSI, the P-CSI in the uplink channel which is not selected is dropped, or if P-CSI is carried on the selected uplink channel, then the P-CSI in the uplink channel which is not selected is dropped, or if no P-CSI is carried on the selected uplink channel, then the P-CSI in the uplink channel which is not selected is transferred to and transmitted on the selected uplink channel;
when the selected uplink channel is an uplink channel with the first TTI length for transmission, if there are both an uplink shared channel with the first TTI length for transmission, and an uplink control channel with the first TTI length for transmission, then the uplink shared channel with the first TTI length for transmission or the uplink control channel with the first TTI length for transmission is selected to carry the UCI, or a part of the UCI is carried on the uplink shared channel with the first TTI length for transmission, and the other part of the UCI is carried on the uplink control channel with the first TTI length for transmission; when there are a plurality of uplink shared channels with the first TTI length, and when there is an uplink shared channel with the first TTI length for transmission, on a PCC, the uplink shared channel with the first TTI length for transmission, on the PCC is selected to carry the UCI; when there is no uplink shared channel with the first TTI length for transmission, on the PCC, an uplink shared channel with the first TTI length for transmission, on an SCC with the lowest carrier index among SCCs comprising the uplink shared channels with the first TTI length for transmission is selected to carry the UCI; wherein when the selected uplink shared channel is an uplink shared channel corresponding to an RAR grant, the UCI is not transmitted;
when the selected uplink channel is the uplink control channel with the second TTI length for transmission, if there are a plurality of uplink control channels with the second TTI length for transmission, in the first TTI length, then the first or last uplink control channel with the second TTI length for transmission is selected to carry the UCI, or an uplink control channel with the second TTI length for transmission, which carries P-CSI is selected to carry P-CSI in the uplink channel which is not selected; if there is no uplink control channel with the second TTI length for transmission, which carries P-CSI, then the first or last uplink control channel with the second TTI length for transmission is selected to carry the P-CSI in the uplink channel which is not selected; an uplink control channel with the second TTI length for transmission, which carries ACK/NACK and/or an SR is selected to carry ACK/NACK and/or an SR in the uplink channel which is not selected; if there is no uplink control channel with the second TTI length for transmission, which carries ACK/NACK and/or an SR, then the first or last uplink control channel with the second TTI length for transmission is selected to carry the ACK/NACK and/or the SR in the uplink channel which is not selected; wherein when there are a plurality of uplink control channels with the second TTI length for transmission, which carries P-CSI, the first or last one of the plurality of uplink control channels with the second TTI length for transmission is selected to carry the P-CSI in the uplink channel which is not selected; and when there are a plurality of uplink control channels with the second TTI length for transmission, which carries ACK/NACK and/or an SR, the first or last one of the plurality of uplink control channels with the second TTI length for transmission is selected to carry the ACK/NACK and/or an SR in the uplink channel which is not selected; or when the selected uplink channel is the uplink shared channel with the second TTI length for transmission, if there are a plurality of uplink shared channels with the second TTI length for transmission, in the first TTI length, then the first or last one of the uplink shared channels with the second TTI length for transmission is selected to carry the UCI; or when a plurality of carriers are aggregated for a UE, and if there is an uplink shared channel with the second TTI length for transmission, on the PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs comprising the uplink shared channels with the second TTI length for transmission is selected to carry the UCI; and when there are a plurality of uplink shared channels with the second TTI length for transmission, on the selected carrier, the first or last one of the uplink shared channels with the second TTI length for transmission is selected to carry the UCI; wherein when the selected uplink shared channel with the second TTI length for transmission is an uplink shared channel corresponding to an RAR grant, the UCI is not transmitted.

17. The apparatus according to claim 14, wherein priorities of UCI are as follows: a priority of an SR is higher than or equal to that of ACK/NACK, and a priority of ACK/NACK is higher than that of P-CSI.

18. The apparatus according to claim 13, wherein the processor is further configured:
  to determine whether a sum of transmission power of the uplink channel with the first TTI length for transmission, and transmission power of the uplink channel with the second TTI length for transmission exceeds a highest transmission power allowed for a UE, and when the sum of transmission powers exceeds the highest transmission power, to determine whether the transmission period of time of the uplink channel with the first TTI length for transmission overlaps with the transmission period of time of the uplink channel with the second TTI length for transmission; and when the transmission period of time of the uplink channel with the first TTI length for transmission overlaps with the transmission period of time of the uplink channel with the second TTI length for transmission, to select at least one uplink channel for transmission, under the preset method, and to drop the remaining uplink channel, or to transmit the remaining uplink channel using puncturing; and/or
  to determine whether there is a support of simultaneous transmission of the uplink channel with the first TTI length for transmission, and the uplink channel with the second TTI length for transmission, and when there is no support, to determine whether the transmission period of time of the uplink channel with the first TTI length for transmission overlaps with the transmission period of time of the uplink channel with the second TTI length for transmission; and when the transmission period of time of the uplink channel with the first TTI length for transmission overlaps with the transmission period of time of the uplink channel with the second TTI length for transmission, to select at least one uplink channel for transmission, under the preset method, and to drop the remaining uplink channel, or to transmit the remaining uplink channel using puncturing; and/or
  to determine whether there is a support of simultaneous transmission of an uplink control channel with the first TTI length for transmission, and an uplink shared channel with the second TTI length for transmission, and/or simultaneous transmission of an uplink shared channel with the first TTI length for transmission, and an uplink control channel with the second TTI length for transmission, and when there is no support, to determine whether the transmission period of time of the uplink channel with the first TTI length for transmission overlaps with the transmission period of time of the uplink channel with the second TTI length for transmission; and when the transmission period of time of the uplink channel with the first TTI length for transmission overlaps with the transmission period of time of the uplink channel with the second TTI length for transmission, to select at least one uplink channel for transmission, under the preset method, and to drop the remaining uplink channel, or to transmit the remaining uplink channel using puncturing.

19. An apparatus, comprising: a processor, a transceiver, and a memory, wherein:
  the processor is configured to read program in the memory: to determine whether a transmission period of time of an uplink channel with a first Transmission Time (TTI) length for transmission overlaps with a transmission period of time of an uplink channel with a second TTI length for transmission, wherein the first TTI length is longer than the second TTI length; and when the transmission period of time of the uplink channel with the first TTI length for transmission overlaps with the transmission period of time of the uplink channel with the second TTI length for transmission, to determine that a UE selects an uplink channel for transmission, under a preset method, and drops a remaining uplink channel, or transmits the remaining uplink channel using puncturing; and
  the transceiver is configured to receive and transmit data under a control of the processor;
  wherein the processor configured to determine that the UE selects an uplink channel of the uplink channels for transmission under the preset method, and drops the remaining uplink channel or transmits the remaining uplink channel using puncturing is performed in one of the following methods:
    method 2: the uplink channel with the second TTI length for transmission is selected, and the uplink channel with the first TTI length for transmission is dropped or transmitted using puncturing;

method 7: the uplink channel with the first TTI length for transmission is selected, and the uplink channel with the second TTI length for transmission is dropped;

method 3: an uplink channel carrying UCI is selected, and when there are a plurality of uplink channels carrying UCI, an uplink channel carrying UCI with a high priority is selected, and when there are a plurality of uplink channels carrying UCI with the high priority, an uplink channel is selected under any of the methods above, and a remaining uplink channel is dropped or transmitted using puncturing;

when the processor configured to determine that the UE selects an uplink channel of the uplink channels for transmission under the preset method, and drops the remaining uplink channel or transmits the remaining uplink channel using puncturing is performed in one of the method 2, method 7, and method 3, the processor is further configured: to determine that the UE transfers Uplink Control Information, UCI, in an uplink channel which is not selected to the selected uplink channel under a preset rule 1, and transmits the UCI on the selected uplink channel; the preset rule 1 comprises one or a combination of the following rules:

rule 1-1: UCI in the uplink channel which is not selected is transferred to and transmitted on the selected uplink channel;

rule 1-2: when the UCI in the uplink channel which is not selected is Acknowledgement/Negative Acknowledgement, ACK/NACK, and/or a Scheduling Request, SR, the UCI is transferred to and transmitted on the selected uplink channel; and when the UCI in the uplink channel which is not selected comprises Periodical Channel State Information, P-CSI, the P-CSI in the uplink channel which is not selected is dropped, or if P-CSI is carried on the selected uplink channel, then the P-CSI in the uplink channel which is not selected is dropped, and if no P-CSI is carried on the selected uplink channel, then the P-CSI in the uplink channel which is not selected is transferred to and transmitted on the selected uplink channel;

rule 1-3: when the selected uplink channel is an uplink channel with the first TTI length for transmission, if there are both an uplink shared channel with the first TTI length for transmission, and an uplink control channel with the first TTI length for transmission, then the uplink shared channel with the first TTI length for transmission or the uplink control channel with the first TTI length for transmission is selected to carry the UCI, or a part of the UCI is carried on the uplink shared channel with the first TTI length for transmission, and the other part of the UCI is carried on the uplink control channel with the first TTI length for transmission; if there are a plurality of uplink shared channels with the first TTI length, then when there is an uplink shared channel with the first TTI length for transmission, on a Primary Carrier Component, PCC, the uplink shared channel with the first TTI length for transmission, on the PCC is selected to carry the UCI, and when there is no uplink shared channel with the first TTI length for transmission, on the PCC, an uplink shared channel with the first TTI length for transmission, on a Secondary Carrier Component, SCC, with the lowest carrier index among SCCs comprising the uplink shared channels with the first TTI length for transmission is selected to carry the UCI, wherein if the selected uplink shared channel is an uplink shared channel corresponding to a Radom Access Response, RAR, grant, then the UCI is not transmitted;

rule 1-4: when the selected uplink channel is the uplink control channel with the second TTI length for transmission, if there are a plurality of uplink control channels with the second TTI length for transmission, in the first TTI length, then the first or last uplink control channel with the second TTI length for transmission is selected to carry the UCI, or an uplink control channel with the second TTI length for transmission, which carries P-CSI is selected to carry P-CSI in the uplink channel which is not selected; if there is no uplink control channel with the second TTI length for transmission, which carries P-CSI, then the first or last uplink control channel with the second TTI length for transmission is selected to carry the P-CSI in the uplink channel which is not selected, and an uplink control channel with the second TTI length for transmission, which carries ACK/NACK and/or an SR is selected to carry ACK/NACK and/or an SR in the uplink channel which is not selected; if there is no uplink control channel with the second TTI length for transmission, which carries ACK/NACK and/or an SR, then the first or last uplink control channel with the second TTI length for transmission is selected to carry the ACK/NACK and/or the SR in the uplink channel which is not selected; and if there are a plurality of uplink control channels with the second TTI length for transmission, which carries P-CSI, the first or last one of the plurality of uplink control channels with the second TTI length for transmission is selected to carry the P-CSI in the uplink channel which is not selected; and when there are a plurality of uplink control channels with the second TTI length for transmission, which carries ACK/NACK and/or an SR, the first or last one of the plurality of uplink control channels with the second TTI length for transmission is selected to carry the ACK/NACK and/or an SR in the uplink channel which is not selected;

rule 1-5: when the selected uplink channel is the uplink shared channel with the second TTI length for transmission, if there are a plurality of uplink shared channels with the second TTI length for transmission, in the first TTI length, then the first or last one of the uplink shared channels with the second TTI length for transmission is selected to carry the UCI; or when a plurality of carriers are aggregated for the UE, if there is an uplink shared channel with the second TTI length for transmission, on the PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs comprising the uplink shared channels with the second TTI length for transmission is selected to carry the UCI, and if there are a plurality of uplink shared channels with the second TTI length for transmission, on the selected carrier, then the first or last one of the uplink shared channels with the second TTI length for transmission is selected to carry the UCI; and if the selected uplink shared channel with the second TTI length for transmission is an uplink shared channel corresponding to an RAR grant, then the UCI is not transmitted.

20. The apparatus according to claim 19, wherein the processor configured to determine that the UE selects an uplink channel of the uplink channels for transmission under the preset method, and drops the remaining uplink channel or transmits the remaining uplink channel using puncturing in the method 2 or method 3 or method 7 is further configured to perform one or a combination of the following methods:

method 4: when the uplink channel with the first TTI length for transmission overlaps with an uplink control channel with the second TTI length for transmission, at least one of the following schemes is applied, wherein the uplink channel with the first TTI length for transmission comprises at least one of an uplink shared channel or an uplink control channel:

in a first scheme, it is determined that the uplink control channel with the second TTI length for transmission is selected by the UE for transmission, the uplink channel with the first TTI length for transmission is dropped, or information in a symbol in the uplink channel with the first TTI length for transmission, which overlaps with the symbol in the uplink control channel with the second TTI length for transmission is punctured;

in a second scheme, it is determined that that the uplink channel with the first TTI length for transmission is selected by the UE, and the uplink control channel with the second TTI length for transmission is dropped; or in a third scheme, it is determined that an uplink channel carrying UCI is selected, and when there are a plurality of uplink channels carrying UCI, an uplink channel carrying UCI with a high priority is selected by the UE, and a remaining uplink channel is dropped, or information in a symbol, in the remaining uplink channel, which overlaps with the symbol in the selected uplink channel is punctured; and when there are a plurality of uplink channels carrying UCI with the same high priority, an uplink channel is selected from the plurality of uplink channels carrying the UCI with the same high priority as in the first scheme or the second scheme;

method 5: when an uplink shared channel with the first TTI length for transmission overlaps with an uplink shared channel with the second TTI length for transmission, at least one of the following schemes is applied:

in a fourth scheme, it is determined that the uplink shared channel with the second TTI length for transmission is selected by the UE for transmission, and the uplink shared channel with the first TTI length for transmission is dropped, or information in a symbol in the uplink shared channel with the first TTI length for transmission, which overlaps with the symbol in the uplink shared channel with the second TTI length for transmission is punctured;

in a fifth scheme, it is determined that the uplink shared channel with the first TTI length for transmission is selected by the UE for transmission, and the uplink shared channel with the second TTI length for transmission is dropped; or in a sixth scheme, it is determined that an uplink channel carrying UCI is selected by the UE, and when there are a plurality of uplink channels carrying UCI, an uplink channel carrying UCI with a high priority is selected, and a remaining uplink channel is dropped, or information in a symbol, in the remaining uplink channel, which overlaps with the symbol in the selected uplink channel is punctured; and when there are a plurality of channels carrying the UCI with the same high priority, an uplink channel is selected from the plurality of channels carrying the UCI with the same high priority as in the third scheme or the fourth scheme;

method 6: when an uplink control channel with the first TTI length for transmission overlaps with an uplink shared channel with the second TTI length for transmission, at least one of the following schemes is applied:

in a seventh scheme, it is determined that the uplink shared channel with the second TTI length for transmission is selected by the UE for transmission, and the uplink control channel with the first TTI length for transmission is dropped, or information in a symbol in the uplink control channel with the first TTI length for transmission, which overlaps with the symbol in the uplink shared channel with the second TTI length for transmission is punctured;

in an eighth scheme, it is determined that the uplink control channel with the first TTI length for transmission is selected by the UE for transmission, and the uplink shared channel with the second TTI length for transmission is dropped; or in a ninth scheme, it is determined that an uplink channel carrying UCI is selected by the UE, and when there are a plurality of uplink channels carrying UCI, an uplink channel carrying UCI with a high priority is selected, and a remaining uplink channel is dropped, or information in a symbol, in the remaining uplink channel, which overlaps with the symbol in the selected uplink channel is punctured; and when there are a plurality of channels carrying the UCI with the same high priority, an uplink channel is selected from the plurality of channels carrying the UCI with the same high priority as in the seventh scheme or the eighth scheme.

21. The apparatus according to claim 20, wherein, when the processor configured to determine that the UE selects an uplink channel of the uplink channels for transmission under the preset method, and drops the remaining uplink channel or transmits the remaining uplink channel using puncturing is performed in method 4, the processor is further configured:

when the first scheme is applied, to determine that UCI carried on the uplink channel with the first TTI length for transmission is transferred by the UE to and transmitted on the uplink control channel with the second TTI length for transmission under a preset rule 1 or a preset rule 2;

when the second scheme is applied, to determine that UCI carried on the uplink control channel with the second TTI length for transmission is transferred by the UE to and transmitted on the uplink channel with the first TTI length for transmission, under the preset rule 1 or a preset rule 3; and when the third scheme is applied, to determine that UCI in an uplink channel which is not selected is transferred by the UE to and transmitted on the selected uplink channel under the preset rule 1;

when the processor configured to determine that the UE selects an uplink channel of the uplink channels for transmission under the preset method, and drops the remaining uplink channel or transmits the remaining uplink channel using puncturing is performed in method 5, the processor is further configured:
  when the fourth scheme is applied, to determine that UCI carried on the uplink shared channel with the first TTI length for transmission is transferred by the UE to and transmitted on the uplink shared channel with the second TTI length for transmission under a preset rule 1 or a preset rule 4;
  when the fifth scheme is applied, to determine that UCI carried on the uplink shared channel with the second TTI length for transmission is transferred by the UE to and transmitted on the uplink shared channel with the first TTI length for transmission under the preset rule 1 or a preset rule 5; and
  when the sixth scheme is applied, to determine that UCI in an uplink channel which is not selected is transferred by the UE to and transmitted on the selected uplink channel under the preset rule 1;
when the processor configured to determine that the UE selects an uplink channel of the uplink channels for transmission under the preset method, and drops the remaining uplink channel or transmits the remaining uplink channel using puncturing is performed in method 6, the processor is further configured:
  when the seventh scheme is applied, to determine that UCI carried on the uplink control channel with the first TTI length for transmission is transferred by the UE to and transmitted on the uplink shared channel with the second TTI length for transmission under a preset rule 1 or a preset rule 6;
  when the eighth scheme is applied, if the uplink shared channel with the second TTI length for transmission carries UCI, then to determine that the UCI is transferred by the UE to and transmitted on the uplink control channel with the first TTI length for transmission under the preset rule 1 or a preset rule 7; and
  when the ninth scheme is applied, to determine that UCI in an uplink channel which is not selected is transferred by the UE to and transmitted on the selected uplink channel under the preset rule 1.

22. The apparatus according to claim 21, wherein:
when the first scheme is applied, the preset rule 2 comprises one or a combination of the following schemes:
  all the UCI carried on the uplink channel with the first TTI length for transmission is transferred to and transmitted on the uplink control channel with the second TTI length for transmission;
  when the UCI carried on the uplink channel with the first TTI length for transmission is ACK/NACK and/or an SR, the UCI is transferred to and transmitted on the uplink control channel with the second TTI length for transmission; when the UCI carried on the uplink channel with the first TTI length for transmission comprises P-CSI, the P-CSI carried on the uplink channel with the first TTI length for transmission is dropped, or if the uplink control channel with the second TTI length for transmission comprises P-CSI, then the P-CSI carried on the uplink channel with the first TTI length for transmission is dropped, and if the uplink control channel with the second TTI length for transmission does not comprise any P-CSI, then the P-CSI carried on the uplink channel with the first TTI length for transmission is transferred to and transmitted on the uplink control channel with the second TTI length for transmission; or
  when there are a plurality of uplink control channels with the second TTI length for transmission, in a transmission period of time of the uplink channel with the first TTI length for transmission, then:
    the first or last one of the uplink control channels with the second TTI length for transmission is selected to carry the UCI; or
    an uplink control channel with the second TTI length for transmission, which carries P-CSI is selected to carry P-CSI in the uplink channel with the first TTI length for transmission, and if there is no uplink control channel with the second TTI length for transmission, which carries P-CSI, then the first or last one of the uplink control channels with the second TTI length for transmission is selected to carry the P-CSI in the uplink channel with the first TTI length for transmission; an uplink control channel with the second TTI length for transmission, which carries ACK/NACK and/or an SR is selected to carry ACK/NACK and/or an SR in the uplink channel with the first TTI length for transmission; if there is no uplink control channel with the second TTI length for transmission, which carries ACK/NACK and/or an SR, then the first or last one of the uplink control channels with the second TTI length for transmission is selected to carry the ACK/NACK and/or the SR in the uplink channel with the first TTI length for transmission; wherein there are a plurality of uplink control channels with the second TTI length for transmission, which carries P-CSI, the first or last one of the plurality of uplink control channels is selected to carry the P-CSI in the uplink channel with the first TTI length for transmission; and when there are a plurality of uplink control channels with the second TTI length for transmission, which carries ACK/NACK and/or an SR, the first or last one of the plurality of uplink control channels is selected to carry the ACK/NACK and or the SR in the uplink channel with the first TTI length for transmission;
when the second scheme is applied, the preset rule 3 comprises one or a combination of the following schemes:
  all the UCI carried on the uplink control channel with the second TTI length for transmission is transferred to and transmitted on the uplink channel with the first TTI length for transmission;
  when the UCI carried on the uplink control channel with the second TTI length for transmission is ACK/NACK and/or an SR, the UCI is transferred to and transmitted on the uplink channel with the first TTI length for transmission; and when the UCI carried on the uplink control channel with the second TTI length for transmission comprises P-CSI, the P-CSI carried on the uplink control channel with the second TTI length for transmission is dropped, or if P-CSI is carried on the uplink channel with the first TTI length for transmission, then the P-CSI carried on the uplink control channel with the second TTI length for transmission is dropped, and if no P-CSI is carried on the uplink channel with the first TTI length for transmission, then the P-CSI carried on the uplink control channel with the second TTI length for transmission is transferred to and transmitted on the uplink channel with the first TTI length for transmission; or when there are both an uplink shared channel with the first TTI length for transmission, and an uplink control channel with the first TTI length for transmission, one of the uplink shared channel with the first TTI length for transmission, and the uplink control channel with the first TTI length for transmission, is selected to carry the UCI, or a part of the UCI is carried on the uplink shared channel with the first TTI length for transmission, and the other part of the UCI is carried on the uplink control channel with the first TTI length for transmission; and/or when there are a plurality of uplink shared channels with the first TTI length for transmission, and if there is an uplink shared channel with the first TTI length for transmission, on a PCC, then the uplink shared channel with the first TTI length for transmission, on the PCC is selected to carry the UCI, and if there is no uplink shared channel with the first TTI length for transmission, on the PCC, then an uplink shared channel with the first TTI length for transmission, on an SCC with the lowest carrier index among SCCs comprising the uplink shared channels with the first TTI length for transmission is selected to carry the UCI, wherein if the selected uplink shared channel is an uplink shared channel corresponding to an RAR grant, then the UCI is not transmitted;

when the third scheme is applied:
  when the selected uplink channel is the uplink control channel with the second TTI length for transmission, if there are a plurality of uplink control channels with the second TTI length for transmission, in a transmission period of time of the uplink channel with the first TTI length for transmission, then an uplink channel to carry the UCI is selected in the same scheme as in the preset rule 2; and when the selected uplink channel is the uplink channel with the first TTI length for transmission, if there are both an uplink shared channel with the first TTI length for transmission and an uplink control channel with the first TTI length for transmission, or there are a plurality of uplink shared channels with the first TTI length for transmission, then a channel to carry the UCI is selected in the same scheme as in the preset rule 3;

when the fourth scheme is applied, the preset rule 4 comprises one or a combination of the following schemes:
  all the UCI carried on the uplink shared channel with the first TTI length for transmission is transferred to and transmitted on the uplink shared channel with the second TTI length for transmission;
  when the UCI carried on the uplink shared channel with the first TTI length for transmission is ACK/NACK and/or an SR, the UCI is transferred to and transmitted on the uplink shared channel with the second TTI length for transmission, and when the UCI carried on the uplink shared channel with the first TTI length for transmission comprises P-CSI, the P-CSI carried on the uplink shared channel with the first TTI length for transmission is dropped, or if P-CSI is carried on the uplink shared channel with the second TTI length for transmission, then the P-CSI carried on the uplink shared channel with the first TTI length for transmission is dropped; and if no P-CSI is carried on the uplink shared channel with the second TTI length for transmission, then the P-CSI carried on the uplink shared channel with the first TTI length for transmission is transferred to and transmitted on the uplink shared channel with the second TTI length for transmission; or when there are a plurality of uplink shared channels with the second TTI length for transmission, in a transmission period of time of the uplink shared channel with the first TTI length for transmission, the first or last one of the uplink shared channels with the second TTI length for transmission is selected to carry the UCI; or when a plurality of carriers are aggregated for the UE, if there is an uplink shared channel with the second TTI length for transmission, on a PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs comprising the uplink shared channels with the second TTI length for transmission is selected to carry the UCI, and if there are a plurality of uplink shared channels with the second TTI length for transmission, on the selected carrier, then the first or last one of the uplink shared channels with the second TTI length for transmission is selected to carry the UCI; and if the selected uplink shared channel with the second TTI length for transmission is an uplink shared channel corresponding to an RAR grant, then the UCI is not transmitted;

when the fifth scheme is applied, the preset rule 5 comprises one or a combination of the following schemes:
  all the UCI carried on the uplink shared channel with the second TTI length for transmission is transferred to and transmitted on the uplink shared channel with the first TTI length for transmission;
  when the UCI carried on the uplink shared channel with the second TTI length for transmission is ACK/NACK and/or an SR, the UCI is transferred to and transmitted on the uplink shared channel with the first TTI length for transmission; and when the UCI carried on the uplink shared channel with the second TTI length for transmission comprises P-CSI, the P-CSI carried on the uplink shared channel with the second TTI length for transmission is dropped, or if P-CSI is carried on the uplink shared channel with the first TTI length for transmission, then the P-CSI carried on the uplink shared channel with the second TTI length for transmission is dropped, and if no P-CSI is carried on the uplink shared channel with the first TTI length for transmission, then the P-CSI carried on the uplink shared channel with the second TTI length for transmission is transferred to and transmitted on the uplink shared channel with the first TTI length for transmission; or
  when there are a plurality of uplink shared channels with the first TTI length for transmission, if there is an uplink shared channel with the first TTI length for transmission, on a PCC, then the uplink shared channel with the first TTI length for transmission, on the PCC is selected to carry UCI in the sPUSCH; if there is no uplink shared channel with the first TTI length for transmission, on the PCC, then an uplink shared channel with the first TTI length for transmission, on an SCC with the lowest carrier index among SCCs comprising the uplink shared channels with the first TTI length for transmission is selected to carry the UCI in the sPUSCH; and when the selected uplink shared channel with the first TTI length for transmission is an uplink shared channel corresponding to an RAR grant, the UCI is not transmitted;

when the sixth scheme is applied:
  when the selected uplink channel is the uplink shared channel with the second TTI length for transmission, and when there are a plurality of uplink shared channels with the second TTI length for transmission, in a transmission period of time of the uplink shared channel with the first TTI length for transmission, a channel to carry the UCI is selected as in the scheme as in the preset rule 4; and when the selected uplink channel is the uplink shared channel with the first TTI length for transmission, and when there are a plurality of uplink shared channels with the first TTI length for transmission, then a channel to carry the UCI is selected as in the scheme as in the preset rule 5;

when the seventh scheme is applied, the preset rule 6 comprises one or a combination of the following schemes:
  all the UCI carried on the uplink control channel with the first TTI length for transmission is transferred to and transmitted on the uplink shared channel with the second TTI length for transmission;
  when the UCI carried on the uplink control channel with the first TTI length for transmission is ACK/NACK and/or an SR, the UCI is transferred to and transmitted on the uplink shared channel with the second TTI length for transmission; when the UCI carried on the uplink control channel with the first TTI length for transmission comprises P-CSI, the P-CSI carried on the uplink control channel with the first TTI length for transmission is dropped, or if P-CSI is carried on the uplink shared channel with the second TTI length for transmission, then the P-CSI carried on the uplink control channel with the first TTI length for transmission is dropped; and if no P-CSI is carried on the uplink shared channel with the second TTI length for transmission, then the P-CSI carried on the uplink control channel with the first TTI length for transmission is transferred to and transmitted on the uplink shared channel with the second TTI length for transmission; or
  when there are a plurality of uplink shared channels with the second TTI length for transmission, in a transmission period of time of the uplink control channel with the first TTI length for transmission, the first or last one of the uplink shared channels with the second TTI length for transmission is selected to carry the UCI; or when a plurality of carriers are aggregated for the UE, if there is an uplink shared channel with the second TTI length for transmission, on a PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs comprising the uplink shared channels with the second TTI length for transmission is selected to carry the UCI, and if there are a plurality of uplink shared channels with the second TTI length for transmission, on the selected carrier, then the first or last one of the uplink shared channels with the second TTI length for transmission is selected to carry the UCI; and if the selected uplink shared channel with the second TTI length for transmission is an uplink shared channel corresponding to an RAR grant, then the UCI is not transmitted;

when the eighth scheme is applied, the preset rule 7 comprises one or a combination of the following schemes:
  all the UCI carried on the uplink shared channel with the second TTI length for transmission is transferred to and transmitted on the uplink control channel with the first TTI length for transmission; or
  when the UCI carried on the uplink shared channel with the second TTI length for transmission is ACK/NACK and/or an SR, the UCI is transferred to and transmitted on the uplink control channel with the first TTI length for transmission; and when the UCI carried on the uplink shared channel with the second TTI length for transmission comprises P-CSI, the P-CSI carried on the uplink shared channel with the second TTI length for transmission is dropped, or if P-CSI is carried on the uplink control channel with the first TTI length for transmission, then the P-CSI carried on the uplink shared channel with the second TTI length for transmission is dropped, and if no P-CSI is carried on the uplink control channel with the first TTI length for transmission, then the P-CSI carried on the uplink shared channel with the second TTI length for transmission is transferred to and transmitted on the uplink control channel with the first TTI length for transmission;

when the ninth scheme is applied:
  when the selected uplink channel is the uplink shared channel with the second TTI length for transmission, if there are a plurality of uplink shared channels with the second TTI length for transmission, in a transmission period of time of the uplink control channel with the first TTI length for transmission, then a channel to carry the UCI is selected as in the scheme in the preset rule 7;

when the preset rule 1 is applied, the preset rule 1 comprises one or a combination of the following schemes:
  UCI in the uplink channel which is not selected is transferred to and transmitted on the selected uplink channel;
  when the UCI in the uplink channel which is not selected is ACK/NACK and/or an SR, the UCI is transferred to and transmitted on the selected uplink channel; and when the UCI in the uplink channel which is not selected comprises P-CSI, the P-CSI in the uplink channel which is not selected is dropped, or if P-CSI is carried on the selected uplink channel, then the P-CSI in the uplink channel which is not selected is dropped, and if no P-CSI is carried on the selected uplink channel, then the P-CSI in the uplink channel which is not selected is transferred to and transmitted on the selected uplink channel;
  when the selected uplink channel is an uplink channel with the first TTI length for transmission, if there are both an uplink shared channel with the first TTI length for transmission, and an uplink control channel with the first TTI length for transmission, then one of the uplink shared channel with the first TTI length for transmission and the uplink control channel with the first TTI length for transmission is selected to carry the UCI, or a part of the UCI is carried on the uplink shared channel with the first TTI length for transmission, and the other part of the UCI is carried on the uplink control channel with the first TTI length for transmission; if there are a plurality of uplink shared channels with the first TTI length, then when there is an uplink shared channel with the first TTI length for transmission, on a PCC, the uplink shared channel with the first TTI length for transmission, on the PCC is selected to carry the UCI, and when there is no uplink shared channel with the first TTI length for transmission, on the PCC, an uplink shared channel with the first TTI length for transmission, on an SCC with the lowest carrier index among SCCs comprising the uplink shared channels with the first TTI length for transmission is selected to carry the UCI, wherein if the selected uplink shared channel is an uplink shared channel corresponding to an RAR grant, then the UCI is not transmitted;

when the selected uplink channel is the uplink control channel with the second TTI length for transmission, if there are a plurality of uplink control channels with the second TTI length for transmission, in the first TTI length, then the first or last uplink control channel with the second TTI length for transmission is selected to carry the UCI, or an uplink control channel with the second TTI length for transmission, which carries P-CSI is selected to carry P-CSI in the uplink channel which is not selected; if there is no uplink control channel with the second TTI length for transmission, which carries P-CSI, then the first or last uplink control channel with the second TTI length for transmission is selected to carry the P-CSI in the uplink channel which is not selected, and an uplink control channel with the second TTI length for transmission, which carries ACK/NACK and/or an SR is selected to carry ACK/NACK and/or an SR in the uplink channel which is not selected; if there is no uplink control channel with the second TTI length for transmission, which carries ACK/NACK and/or an SR, then the first or last uplink control channel with the second TTI length for transmission is selected to carry the ACK/NACK and/or the SR in the uplink channel which is not selected; and when there are a plurality of uplink control channels with the second TTI length for transmission, which carries P-CSI, the first or last one of the plurality of uplink control channels with the second TTI length for transmission is selected to carry the P-CSI in the uplink channel which is not selected; and when there are a plurality of uplink control channels with the second TTI length for transmission, which carries ACK/NACK and/or an SR, the first or last one of the plurality of uplink control channels with the second TTI length for transmission is selected to carry the ACK/NACK and/or an SR in the uplink channel which is not selected; or when the selected uplink channel is the uplink shared channel with the second TTI length for transmission, if there are a plurality of uplink shared channels with the second TTI length for transmission, in the first TTI length, then the first or last one of the uplink shared channels with the second TTI length for transmission is selected to carry the UCI; or when a plurality of carriers are aggregated for the UE, if there is an uplink shared channel with the second TTI length for transmission, on the PCC, then the uplink shared channel with the second TTI length for transmission, on the PCC is selected to carry the UCI; if there is no uplink shared channel with the second TTI length for transmission, on the PCC, then an uplink shared channel with the second TTI length for transmission, on an SCC with the lowest carrier index among SCCs comprising the uplink shared channels with the second TTI length for transmission is selected to carry the UCI, and if there are a plurality of uplink shared channels with the second TTI length for transmission, on the selected carrier, then the first or last one of the uplink shared channels with the second TTI length for transmission is selected to carry the UCI; and if the selected uplink shared channel with the second TTI length for transmission is an uplink shared channel corresponding to an RAR grant, then the UCI is not transmitted.

23. The apparatus according to claim 20, wherein the priorities of UCI are as follows: a priority of an SR is higher than or equal to that of ACK/NACK, and a priority of ACK/NACK is higher than that of P-CSI.

24. The apparatus according to claim 19, wherein the processor further determines that the UE operates in the following operations of:

determining whether a sum of transmission power of the uplink channel with the first TTI length for transmission, and transmission power of the uplink channel with the second TTI length for transmission exceeds a highest transmission power allowed for the UE, and when the sum of transmission powers exceeds the highest transmission power, determining whether the transmission period of time of the uplink channel with the first TTI length for transmission overlaps with the transmission period of time of the uplink channel with the second TTI length for transmission; and when the transmission period of time of the uplink channel with the first TTI length for transmission overlaps with the transmission period of time of the uplink channel with the second TTI length for transmission, selecting at least one uplink channel for transmission, under the preset method, and dropping the remaining uplink channel, or transmitting the remaining uplink channel using puncturing; and/or determining whether there is a support of simultaneous transmission of the uplink channel with the first TTI length for transmission, and the uplink channel with the second TTI length for transmission, and when there is no support, determining whether the transmission period of time of the uplink channel with the first TTI length for transmission overlaps with the transmission period of time of the uplink channel with the second TTI length for transmission; and when the transmission period of time of the uplink channel with the first TTI length for transmission overlaps with the transmission period of time of the uplink channel with the second TTI length for transmission, selecting at least one uplink channel for transmission, under the preset method, and dropping the remaining uplink channel, or transmitting the remaining uplink channel using puncturing; and/or determining whether there is a support of simultaneous transmission of an uplink control channel with the first TTI length for transmission, and an uplink shared channel with the second TTI length for transmission, and/or simultaneous transmission of an uplink shared channel with the first TTI length for transmission, and an uplink control channel with the second TTI length for transmission, and when there is no support, determining whether the transmission period of time of the uplink channel with the first TTI length for transmission overlaps with the transmission period of time of the uplink channel with the second TTI length for transmission; and when the transmission period of time of the uplink channel with the first TTI length for transmission overlaps with the transmission period of time of the uplink channel with the second TTI length for transmission, selecting at least one uplink channel for transmission, under the preset method, and dropping the remaining uplink channel, or transmitting the remaining uplink channel using puncturing.

* * * * *